(12) United States Patent
Liu et al.

(10) Patent No.: US 11,872,525 B2
(45) Date of Patent: Jan. 16, 2024

(54) POROUS MEDIUM WITH ADJUSTABLE FLUID PERMEABILITY AND ASSOCIATED SYSTEMS AND METHODS

(71) Applicant: Massachusetts Institute of Technology, Cambridge, MA (US)

(72) Inventors: Yayuan Liu, Cambridge, MA (US); Trevor Alan Hatton, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 235 days.

(21) Appl. No.: 17/217,726

(22) Filed: Mar. 30, 2021

(65) Prior Publication Data
US 2021/0299608 A1   Sep. 30, 2021

Related U.S. Application Data

(60) Provisional application No. 63/002,490, filed on Mar. 31, 2020.

(51) Int. Cl.
*B01D 53/32* (2006.01)
*B01D 71/02* (2006.01)
*B01D 67/00* (2006.01)
*B01D 53/22* (2006.01)

(52) U.S. Cl.
CPC ......... *B01D 53/326* (2013.01); *B01D 53/228* (2013.01); *B01D 67/0065* (2013.01); *B01D 71/025* (2013.01); *B01D 2257/504* (2013.01); *B01D 2325/02* (2013.01); *B01D 2325/20* (2013.01); *B01D 2325/26* (2013.01)

(58) Field of Classification Search
None
See application file for complete search history.

(56) References Cited

U.S. PATENT DOCUMENTS

| 4,354,857 A | * | 10/1982 | Reiss | B01D 53/22 96/5 |
| 10,464,018 B2 | | 11/2019 | Voskian et al. | |
| 2014/0326603 A1 | * | 11/2014 | Kamai | B01D 53/228 204/627 |

(Continued)

OTHER PUBLICATIONS

Voskian, Sahag et al., "Faradaic electro-swing reactive adsorption for CO2 capture", Energy and Environmental Science, 12, 2019, pp. 3530-3547. (Year: 2019).*

(Continued)

*Primary Examiner* — Jason M Greene
(74) *Attorney, Agent, or Firm* — Wolf, Greenfield & Sacks, P.C.

(57) ABSTRACT

The present disclosure is related to porous media with adjustable fluid permeabilities and related systems and methods. In certain cases, the fluid permeability of a porous medium can be adjusted by applying an electrical potential to the porous medium. In some such cases, the application of the electrical potential to the porous medium results in the deposition of material over or the removal of material from the porous medium. Also disclosed herein are systems and methods for capturing species (e.g., acid gases) in which porous media with adjustable fluid permeabilities are used, for example, to control the flow of fluid into and out of a medium used to capture the species.

34 Claims, 43 Drawing Sheets

(56) References Cited

U.S. PATENT DOCUMENTS

| | | |
|---|---|---|
| 2017/0113951 A1 | 4/2017 | Su et al. |
| 2020/0023307 A1 | 1/2020 | Voskian et al. |
| 2021/0060485 A1 | 3/2021 | Voskian et al. |
| 2021/0062351 A1 | 3/2021 | Voskian et al. |

OTHER PUBLICATIONS

Abdallah et al., Gas-liquid and gas-liquid-solid catalysis in a mesh microreactor. Chemical Communications. Jan. 2004;40:372-3.

Abolhasani et al., Oscillatory multiphase flow strategy for chemistry and biology. Lab on a Chip. Jul. 2016;16:2775-84.

Bazyar et al., On the Gating Mechanism of Slippery Liquid Infused Porous Membranes. Advanced Materials Interfaces. Jul. 22, 2016;3(14):1600025. 6 pages.

Fan et al., Visual Chemical Detection Mechanism by a Liquid Gating System with Dipole-Induced Interfacial Molecular Reconfiguration. Angew Chem Int Ed Engl. Mar. 18, 2019;58(12):3967-3971. Epub Feb. 7, 2019.

Figueroa et al., Membrane Gas Absorption Processes: Applications and Perspectives. Chapter 12 in Osmotically Driven Membrane Processes-Approach, Development and Current Status. Du, Thompson, Wang, Eds. IntechOpen. London, UK. Dec. 20, 2017:255-72.

Gao et al., Functionalized ionic liquid membranes for CO2 separation. Chemical Communications. 2018;54:12671-85. Epub Oct. 16, 2018.

Gittleson et al., Oxygen solubility and transport in Li-air battery electrolytes: establishing criteria and strategies for electrolyte design. Energ. Environ. Sci. Feb. 2017;10:1167-79.

Goldowsky et al., Gas penetration through pneumatically driven PDMS micro valves. RSC Advances. 2013;3:17968-76. Epub Aug. 23, 2013.

Gurkan et al., Quinone Reduction in Ionic Liquids for Electrochemical CO2 Separation. ACS Sustainable Chem. Eng. 2015;3(7):1394-405. Epub May 14, 2015.

Han et al., Origin of Electrochemical, Structural, and Transport Properties in Nonaqueous Zinc Electrolytes. ACS Appl. Mater. Interfaces. Jan. 2016;8(5):3021-31.

Hery et al., Ionic redox transistor from pore-spanning PPy(DBS) membranes. Energy & Environmental Science. Jun. 2016;9:2555-62.

Hou et al., Liquid gating membrane. National Science Review. Jan. 2020;7(1):9-11.

Hou et al., Liquid-based gating mechanism with tunable multiphase selectivity and antifouling behaviour. Nature. Mar. 5, 2015;519(7541):70-3.

Hou, Smart Gating Multi-Scale Pore/Channel-Based Membranes. Advanced Materials. Sep. 7, 2016;28(33):7049-64.

Jouny et al., Formation of carbon-nitrogen bonds in carbon monoxide electrolysis. Nat Chem. Sep. 2019;11(9):846-851. Epub Aug. 23, 2019.

Kang et al., Concentration of carbon dioxide by a high-temperature electrochemical membrane cell. Journal of Applied Electrochemistry. May 1985;15:431-9.

Kim et al., Metallic anodes for next generation secondary batteries. Chem Soc Rev. Dec. 7, 2013;42(23):9011-34. Epub Aug. 16, 2013.

Knox, Development of Carbon Dioxide Removal Systems for NASA's Deep Space Human Exploration Missions 2017-2018. 48th International Conference on Environmental Systems. Albuquerque, New Mexico. Jul. 2017:17 pages.

Lin et al., Reviving the lithium metal anode for high-energy batteries. Nat Nanotechnol. Mar. 7, 2017;12(3):194-206.

Liu et al., Mobile Liquid Gating Membrane System for Smart Piston and Valve Applications. Ind. Eng. Chem. Res. 2019;58(27):11976-84. Epub Jun. 7, 2019.

Liu et al., Stimuli-responsive smart gating membranes. Chem Soc Rev. Feb. 7, 2016;45(3):460-75.

Lourenço et al., Local environment structure and dynamics of CO2 in the 1-ethyl-3-methylimidazolium bis(trifluoromethanesulfonyl)imide and related ionic liquids. J Chem Phys. Mar. 14, 2017;146(10):104502. 13 pages.

Mainar et al., An overview of progress in electrolytes for secondary zinc-air batteries and other storage systems based on zinc. Journal of Energy Storage. Feb. 2018; 15:304-28. Epub Jan. 11, 2018.

Mantor et al., Solubility of carbon dioxide in propylene carbonate at elevated pressures and higher than ambient temperatures. J. Chem. Eng. Data. Jul. 1982;27(3):243-5.

Mizen et al., Reductive Addition of CO 2 to 9,10-Phenanthrenequinone. Journal of the Electrochemical Society. Apr. 1989;136:941-6.

Mura et al., Stimuli-responsive nanocarriers for drug delivery. Nat Mater. Nov. 2013;12(11):991-1003.

Navarro-Brull et al., Modeling Pore-Scale Two-Phase Flow: How to Avoid Gas-Channeling Phenomena in Micropacked-Bed Reactors via Catalyst Wettability Modification. Ind. Eng. Chem. Res. 2018;57(1):84-92. Epub Nov. 29, 2017.

Nitopi et al., Progress and Perspectives of Electrochemical CO2 Reduction on Copper in Aqueous Electrolyte. Chem. Rev. May 2019;119(12):7610-72.

Oh et al., A review of microvalves. Journal of Micromechanics and Microengineering. Mar. 2006;16:R13-39.

Pan et al., Functional membrane separators for next-generation high-energy rechargeable batteries. National Science Review. Apr. 2017;4:917-33.

Paven et al., Super liquid-repellent gas membranes for carbon dioxide capture and heart-lung machines. Nature Communications. Sep. 2013;4:6 pages.

Pei et al., Nanoscale Nucleation and Growth of Electrodeposited Lithium Metal. Nano Lett. Feb. 8, 2017;17(2):1132-1139. Epub Jan. 13, 2017.

Pohorecki et al., A new absorbent for carbon dioxide and hydrogen sulphide absorption process. Chemical Engineering and Processing: Process Intensification. Jan. 1998;37(1):69-78.

Priolo et al., Recent Advances in Gas Barrier Thin Films via Layer-by-Layer Assembly of Polymers and Platelets. Macromolecular Rapid Communications. May 2015;36(10):866-79.

Pritchard et al., Diffusion of coefficients of carbon dioxide, nitrous oxide, ethylene and ethane in air and their measurement. European Journal of Soil Science. Jun. 1982;33(2):175-84.

Rheinhardt et al., Electrochemical Capture and Release of Carbon Dioxide. ACS Energy Letters. 2017;2(2):454-61. Epub Jan. 18, 2017.

Romano et al., Application of Advanced Technologies for CO2 Capture From Industrial Sources. Energy Procedia. Aug. 2013;37:7176-85.

Scovazzo et al., Electrochemical Separation and Concentration of <1% Carbon Dioxide from Nitrogen. Journal of the Electrochemical Society. Apr. 3, 2003;150(5):D91-8.

Sheng et al., Liquid gating elastomeric porous system with dynamically controllable gas/liquid transport. Sci Adv. Feb. 9, 2018;4(2):eaao6724. 9 pages.

Song et al., Polyanthraquinone as a Reliable Organic Electrode for Stable and Fast Lithium Storage. Angew Chem Int Ed Engl. Nov. 16, 2015;54(47):13947-51. Epub Sep. 28, 2015. Pre-publication copy provided. 6 pages.

Stern et al., Post-combustion carbon dioxide capture using electro-chemically mediated amine regeneration. Energy & Environmental Science. 2013;6:2505-17. Epub Jun. 6, 2013.

Stuart et al., Emerging applications of stimuli-responsive polymer materials. Nat Mater. Feb. 2010;9(2):101-13. Epub Jan. 22, 2010.

Tao et al., Experimental study on electrochemical compression of ammonia and carbon dioxide for vapor compression refrigeration system. International Journal of Refrigeration. 2019;104:180-8. Epub May 10, 2019.

Tesler et al., Metallic Liquid Gating Membranes. ACS Nano. 2020;14(2):2465-74. Epub Jan. 29, 2020.

Voskian et al., Faradaic electro-swing reactive adsorption for CO2 capture. Energy & Environmental Science. 2019;12:3530-47. Epub Oct. 1, 2019.

(56) References Cited

OTHER PUBLICATIONS

Wang et al., Elucidating differences between carbon paper and carbon cloth in polymer electrolyte fuel cells. Electrochimica Acta. Mar. 10, 2007;52(12):3965-75.

Yamamoto et al., Poly(anthraquinone)s Having a .pi.-Conjugation System along the Main Chain. Synthesis by Organometallic Polycondensation, Redox Behavior, and Optical Properties. Macromolecules. 1995;28(9):3371-9. Epub Apr. 1, 1995.

Zhu et al., Ion/Molecule Transportation in Nanopores and Nanochannels: From Critical Principles to Diverse Functions. J Am Chem Soc. Jun. 5, 2019;141(22):8658-8669. Epub May 15, 2019.

Liu et al., "Electrochemically mediated gating membrane with dynamically controllable gas transport," *Sci. Adv.* vol. 6. Oct. 16, 2020. Includes supplemental material.

\* cited by examiner

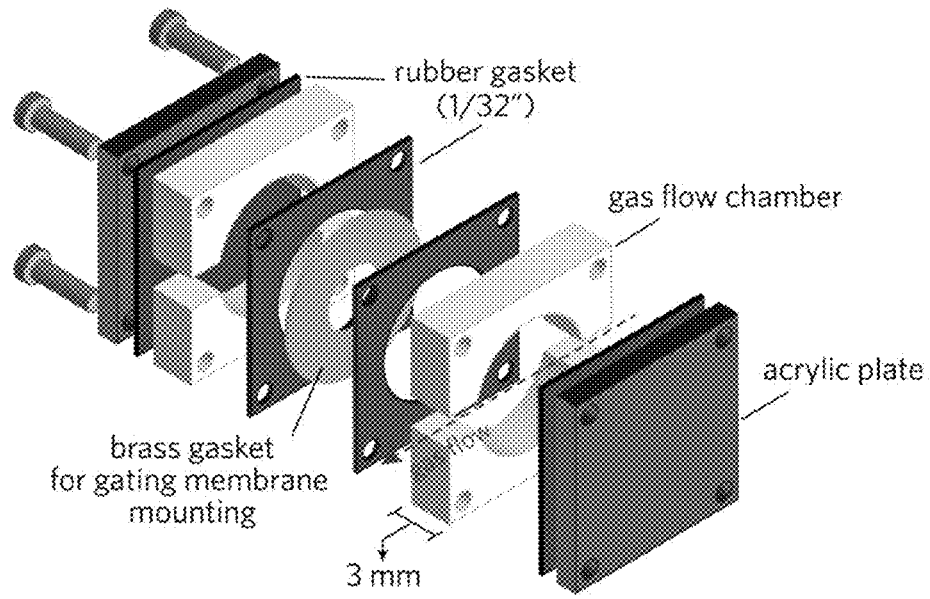
FIG. 21A
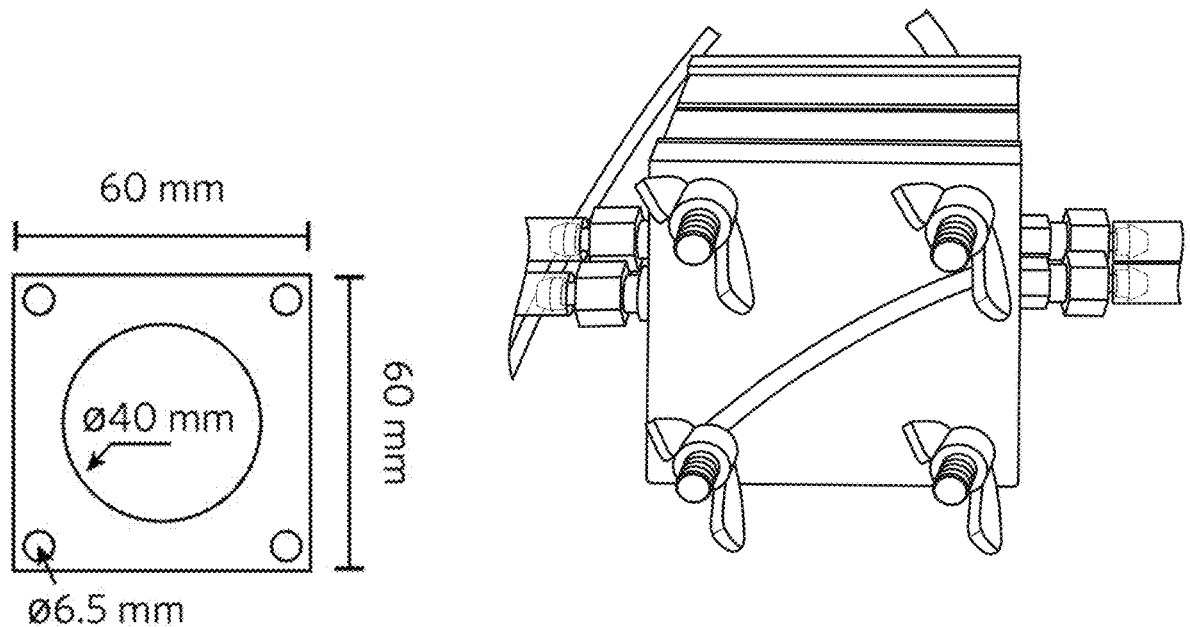
FIG. 21B
FIG. 21C

Zn deposited on stainless steel mesh

POROUS MEDIUM WITH ADJUSTABLE FLUID PERMEABILITY AND ASSOCIATED SYSTEMS AND METHODS

RELATED APPLICATIONS

This application claims priority under 35 U.S.C. § 119(e) to U.S. Provisional Patent Application No. 63/002,490, filed Mar. 31, 2020, and entitled "Porous Medium with Adjustable Fluid Permeability and Associated Systems and Methods," which is incorporated herein by reference in its entirety for all purposes.

TECHNICAL FIELD

Porous media having adjustable fluid permeabilities, and associated systems and methods, are generally described.

SUMMARY

The present disclosure is related to porous media with adjustable fluid permeabilities and related systems and methods. In certain cases, the fluid permeability of a porous medium can be adjusted by applying an electrical potential to the porous medium. In some such cases, the application of the electrical potential to the porous medium results in the deposition of material over or the removal of material from the porous medium. Also disclosed herein are systems and methods for capturing species (e.g., acid gases) in which porous media with adjustable fluid permeabilities are used, for example, to control the flow of fluid into and out of a medium used to capture the species. The subject matter of the present invention involves, in some cases, interrelated products, alternative solutions to a particular problem, and/or a plurality of different uses of one or more systems and/or articles.

In certain aspects, a method is provided.

In some embodiments, the method comprises transporting a fluid through a first electronically conductive porous solid such that a species from the fluid is captured by a medium adjacent to the first electronically conductive porous solid; altering an electrical potential applied between the first electronically conductive porous solid and a second electronically conductive porous solid such that the fluid permeability of the first electronically conductive porous solid is reduced and the fluid permeability of the second electronically conductive porous solid is increased; and releasing the species from the medium such that the species is transported through the second electronically conductive porous solid.

In certain embodiments, the method comprises applying an electrical potential to an electronically conductive porous solid to adjust a fluid permeability of the electronically conductive porous solid.

In some aspects, a device is provided.

In certain embodiments, the device comprises a first electronically conductive porous solid; a second electronically conductive porous solid electronically coupled to the first electronically conductive porous solid; and a medium between the first electronically conductive porous solid and the second electronically conductive porous solid; wherein the device is configured such that: when an electrical potential is applied to the first and second electronically conductive porous solids with a first polarity, a fluid permeability of the first electronically conductive porous solid is reduced, and when an electrical potential is applied to the first and second electronically conductive porous solids with a second polarity opposite the first polarity, the fluid permeability of the second electronically conductive porous solid is reduced.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 21A is, according to some embodiments, a schematic showing the configuration of a gas cell device;

FIG. 21B is, according to certain embodiments, a schematic showing the dimensions of the gas flow chamber of the device shown in FIG. 21A;

FIG. 21C is, according to certain embodiments, an image of the gas cell device shown in FIG. 21A;

DETAILED DESCRIPTION

Figure 1A:
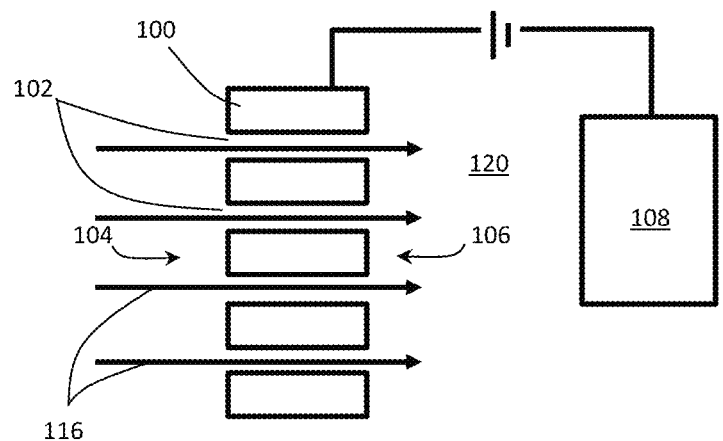
FIGS. 1A-1C are cross-sectional schematic illustrations showing the adjustment of the fluid permeability of a porous medium, according to certain embodiments.

Porous media with adjustable fluid permeabilities, and related systems and methods, are generally described. Certain embodiments are related to systems and methods in which the fluid permeability of a porous medium (e.g., a porous solid) can be adjusted by applying an electrical potential to the porous medium. For example, in some embodiments, the fluid permeability of a porous medium can be decreased by applying an electrical potential to the porous medium such that material is deposited over pores of the porous medium, thus blocking the transport of fluid through the thickness of the porous medium. As another example, in some embodiments, the fluid permeability of a porous medium can be increased by applying an electrical potential to the porous medium (e.g., having a polarity opposite of the polarity of the electrical potential used to reduce the permeability of the porous medium) such that material is removed from the porous medium, thus opening pores of the porous medium and allowing for increased transport of fluid through the thickness of the porous medium.

The ability to regulate mass transfer across a membrane and other types of porous media is important in a wide spectrum of engineering applications. Despite numerous examples on stimuli-responsive membranes for liquid-phase species, the ability to regulate mass transfer across porous media generally remains elusive for gaseous molecules. Certain embodiments described herein are related to a gas gating mechanism driven by reversible electrochemical deposition/dissolution of materials (e.g., metals) on electronically conductive porous media, which can modulate (e.g., continuously modulate) the interfacial fluid permeability (e.g., gas permeability). In certain embodiments, the interfacial fluid permeability can be modulated over two orders of magnitude. In accordance with certain embodiments, the interfacial fluid permeability can be modulated without involving moving parts and/or dead volume, therefore allowing one to design and implement processes that are otherwise difficult to realize.

Also disclosed herein are systems and methods for capturing species (e.g., acid gases) in which porous media with adjustable fluid permeabilities are used, for example, to control the flow of fluid into and out of a medium used to capture the species. For example, in some embodiments, a medium used to capture a species (e.g., a sorbent, an electrochemical capture medium, etc.) is positioned between two electronically conductive porous media. In some embodiments, one of the porous media can define a boundary between the capture medium and a fluid stream (e.g., gaseous stream) containing the species one desires to capture, and the other of the porous media can define a boundary between the capture medium and an environment into which one wishes to transfer the captured species. In some such embodiments, the two porous media can provide a gating mechanism which effectively prevents cross-talk between the stream containing the species to be captured and the product stream in which the captured species is released. For example, in some embodiments, during the capture phase, the first porous medium may be maintained in a fluid permeable (e.g., gas permeable) state while the second porous medium may be maintained in a fluid impermeable (e.g., gas impermeable) state, which can allow for exposure of the capture medium to the species that is to be captured. In some such embodiments, after a period of time (e.g., after the capture medium is saturated with the species that is being captured), the first porous medium may be switched to a fluid impermeable state while the second porous medium may be switched to a fluid permeable state, which can allow for removal of the captured species from the capture medium without further exposing the capture medium to the source of the captured species.

Several of the embodiments described herein are generally described as providing the ability to control the flow of fluids in general (e.g., liquids and/or gases), for example, by adjusting a fluid permeability of a porous medium. One advantage provided by certain of the embodiments described herein is the ability to adjust gas permeability. In general, adjusting and controlling the gas permeability of a porous medium is more challenging than adjusting and controlling the liquid permeability of a porous medium. The inventors have found, in the context of certain embodiments, that the systems and methods described herein can effectively allow for the adjustment and control of gas permeabilities to an unexpected degree. It should be appreciated that, wherever the adjustment and/or control of fluid permeability is described herein with respect to a particular embodiment, that embodiment can be used to adjust and/or control gas permeability.

Generally, the fluid permeability of a solid refers to the ability to transport a fluid (e.g., a liquid, a gas) from one boundary of the solid to another boundary of the solid. For example, in the case of a porous solid comprising pores that bridge a first side and a second side of the porous solid, the fluid permeability refers to the ability to transport fluid from the first side of the porous solid, through the pores of the porous solid, and out of the second side of the porous solid.

Figure 1B:
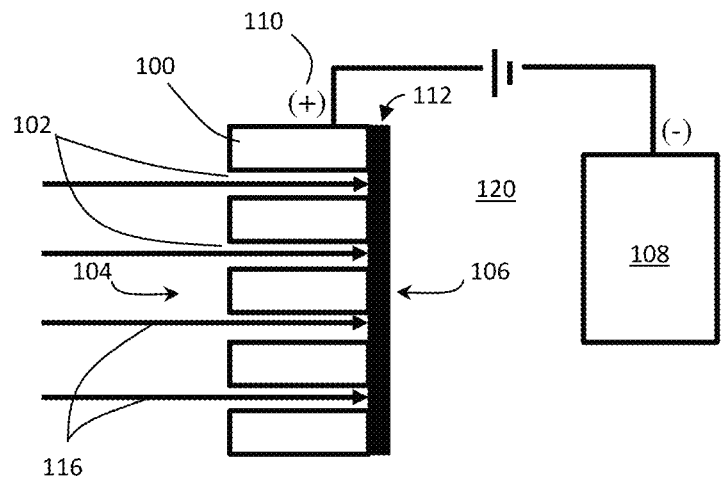
Figure 1C:
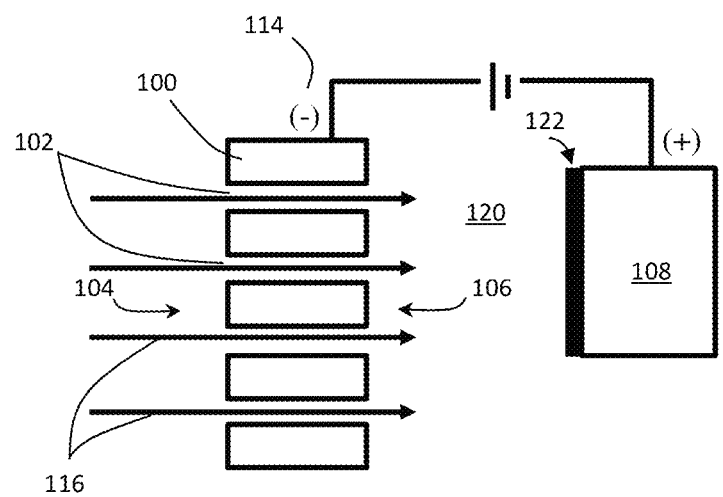
Figure 1D:
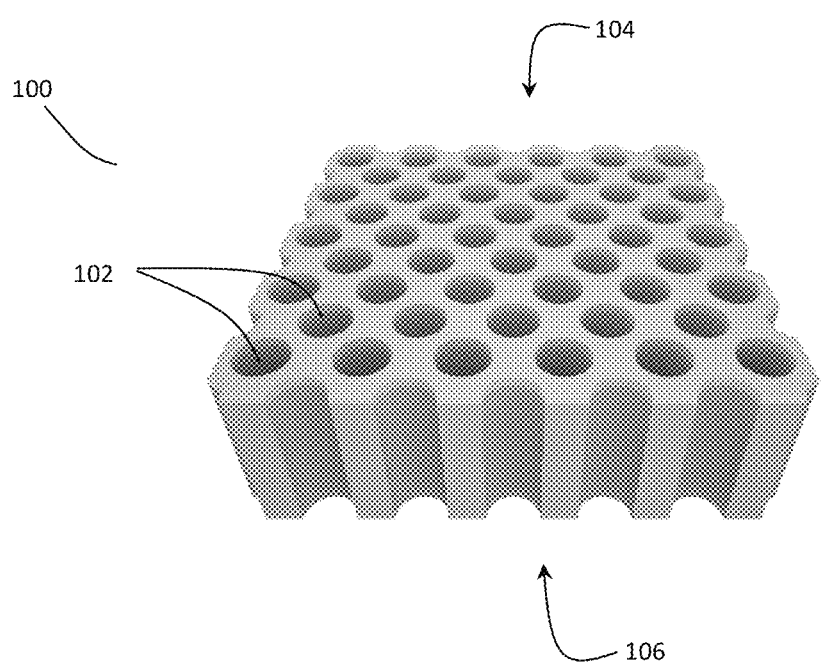
FIG. 1D is a perspective view schematic illustration of a porous medium, according to certain embodiments.

Certain aspects are related to devices and methods in which the permeability of an electronically conductive porous solid is altered. FIGS. 1A-1C are cross-sectional schematic diagrams showing electronically conductive porous solid 100 whose permeability can be altered using electrical potentials. FIG. 1D is a perspective view schematic illustration of electronically conductive porous solid 100.

The electronically conductive porous solid generally comprises pores that bridge one side of the solid material and a second side of the solid material. For example, in FIGS. 1A-1D, electronically conductive porous solid 100 comprises pores 102 that bridge first side 104 of electronically conductive porous solid 100 and second side 106 of electronically conductive porous solid 100.

The electronically conductive porous solid can be made of any of a variety of suitable materials. Generally, at least one surface of the electronically conductive porous solid will be sufficiently electronically conductive to allow electrical current to be transported across the at least one surface to a degree sufficient to allow for the adjustment of the permeability of the electronically conductive porous solid, as described elsewhere herein. In some embodiments, the bulk of the electronically conductive porous solid is electronically conductive. In other embodiments, the bulk of the electronically conductive porous solid is electronically insulating, but electronically conductive material is arranged over one or more surfaces of the solid (e.g., in the form of a coating) such that electronic conductivity is imparted to the electronically insulating porous solid. For example, in certain embodiments, to make an electronically insulating porous solid electrically conductive, a metal is coated on at least one of the first side and the second side of the electronically insulating porous solid. In some embodiments, the electronically conductive porous solid is at least partially made of a metal, an electronically conductive ceramic, and/or an electronically conductive polymer. In certain embodiments, it can be advantageous for the electronically conductive porous solid to comprise a metal (e.g., in the bulk and/or as an electronically conductive overlayer (e.g., coating)). Additional examples of electronically conductive porous solid materials are described in more detail below.

Certain embodiments comprise applying an electrical potential to the electronically conductive porous solid. Application of an electrical potential generally comprises applying a voltage difference between the electronically conductive porous solid and a counter electrode. For example, in FIGS. 1B-1C, a voltage difference has been applied between the electronically conductive porous solid 100 and a counter electrode 108 to generate an electrical potential. In FIG. 1B, an electrical potential, having a first polarity 110, has been applied to the electronically conductive porous solid 100. In FIG. 1C, an electrical potential, having a second polarity 114 opposite of the first polarity 110, has been applied to the electronically conductive porous solid 100.

Certain embodiments comprise adjusting the fluid permeability of the electronically conductive porous solid. The fluid permeability of the electronically conductive porous solid can be adjusted, in accordance with certain embodiments, by applying electrical potentials of different polarities to the electronically conductive porous solid. In some embodiments, the fluid permeability of the electronically conductive porous solid is reduced when an electrical potential, having a first polarity, is applied to the electronically conductive porous solid. For example, in FIG. 1B, the fluid permeability of the electronically conductive porous solid 100 is reduced when an electrical potential, having a first polarity 110, is applied to the electronically conductive porous solid 100. In some embodiments, the application of the electrical potential having the first polarity results in the deposition of a material on the electronically conductive porous solid. For example, in FIG. 1B, the application of the electrical potential, having the first polarity 110, results in the deposition of a material 112 on the second side 106 of the electronically conductive porous solid 100 such that the pores 102 of the electronically conductive porous solid are at least partially blocked. In certain embodiments, the pores of the electronically conductive porous solid are sized such that the material deposited over the pores is larger than the size of the pores to ensure the ability to adjust the permeability of the electronically conductive porous solid.

A variety of materials can be deposited over the pores of the electronically conductive porous solid to adjust the fluid permeability of the electronically conductive porous solid. In some embodiments, the material deposited on the electronically conductive porous solid comprises a colloidal particle. In some embodiments, the material deposited on the electronically conductive porous solid comprises a metal and/or a metal oxide. For example, in some embodiments, a medium adjacent to the electronically conductive porous solid comprises a metal salt dissolved in a solvent (e.g., an aqueous solvent or a non-aqueous solvent). In some embodiments, the solvent containing the dissolved metal salt functions as an electrolyte that can mediate the transport of charged species to and from the electrically conductive porous solid. In some embodiments, the dissolved metal salt comprises metal cations such that when an electrical potential is applied to the electrically conductively porous solid, the metal cations from the medium are reduced at the surface of the electrically conductively porous solid, resulting in the deposition of a metal layer at the surface of the electrically conductively porous solid. For example, referring to FIG. 1B, in accordance with some embodiments, a medium 120 adjacent to the electrically conductive porous solid 100 comprises a metal salt dissolved in a solvent. In some such embodiments, by applying an electrical potential 110 to the electrically conductive porous solid 100, the metal cations in the solvent near the surface of the electrically conductively solid 100 become reduced such that a material 112 is deposited on the second side 106 of the electrically conductive porous solid 100. It should be understood that the invention is not limited to the deposition of metal cations, and additional examples of materials that can be deposited over the pores of the electronically conductive porous solid are described in more detail below.

In certain embodiments, the fluid permeability of the electronically conductive porous solid is increased when an electrical potential, having a second polarity opposite of the first polarity, is applied to the electronically conductive porous solid. For example, referring to FIG. 1C, in some embodiments, the fluid permeability of the electronically conductive porous solid 100 is increased when an electrical potential, having a second polarity 114 opposite of the first polarity 110, is applied to the electronically conductive porous solid 100. In certain embodiments, when the electrical potential, having the second polarity, is applied to the electronically conductive porous solid, material is removed from the electronically conductive porous solid. For example, referring to FIG. 1C, in certain embodiments, when the electrical potential having the second polarity 114 is applied to the electronically conductive porous solid 100, material 112 is removed from the second side 106 of the electronically conductive porous solid 100. Optionally, in some embodiments, when the electrical potential having the second polarity is applied to the electronically conductive porous solid material is deposited on the counter electrode. For example, referring to FIG. 1C, in some embodiments, when the electrical potential having the second polarity 114 is applied to the electronically conductive porous solid 100, material 112 is removed from the second side 106 of the electronically conductive porous solid 100 and subsequently a material 122 is deposited on a counter electrode 108. In some embodiments, the two materials (material 112 and material 122) can comprise the same material. In some embodiments, the two materials (material 112 and material 122) can comprise different materials.

A variety of materials can be removed from the electronically conductive porous solid to increase the fluid permeability of the electronically conductive porous solid. In some embodiments, the material removed from the electronically conductive porous solid comprises a colloidal particle. In some embodiments, the material removed from the electronically conductive porous solid comprises a metal and/or a metal oxide. In some embodiments, application of the second electrical potential can cause oxidation and subsequent removal of the material from the electronically conductive porous solid. For example, in some embodiments, the material on the electronically conductive porous solid comprises a metal (e.g., zinc), and application of the second electrical potential causes oxidation of the metal to form metal cations (e.g., zinc cations). The metal cations can be subsequently carried away from the electronically conductive porous solid, for example, by a medium adjacent to the electronically conductive porous solid. For example, referring to FIGS. 1B-1C, in some embodiments, material 112 comprises a metal. In some such embodiments, by applying electrical potential 114 to electrically conductive porous solid 100, metal 112 can be oxidized to metal cations. In some such embodiments, medium 120 adjacent electronically conductive porous solid 100 can transport the metal cations away from the electronically conductive porous solid 100 such that the pores 102 of electronically conductive porous solid 100 become exposed. It should be understood that the invention is not limited to the removal of metal via the formation of metal cations, and additional examples of materials that can be removed from the electronically conductive porous solid are described in more detail below.

In some embodiments, the removal and deposition of a material from the second side of the electrically conductive porous solid are reversible processes such that the amount of a material removed from the electrically conductive porous solid constitutes a substantial portion of (e.g., at least 50 wt %, at least 75 wt %, at least 90 wt %, at least 95 wt %, or at least 99 wt % of) the amount of a material initially deposited on the electrically conductive porous solid.

In certain embodiments, the electronically conductive porous solid can function as a gate between a medium that is used to remove species from a gaseous stream (e.g., $CO_2$ or other acid gases from an exhaust stream). In some such embodiments, the permeability of the electronically conductive porous solid can be adjusted such that the medium used to remove species from the gaseous stream is only exposed to the gaseous stream at certain times (e.g., when the medium is not saturated and remains able to capture the species from the gaseous stream).

Accordingly, certain embodiments comprise removal of one or more species from gaseous stream. A species of interest in the gaseous stream can be selectively removed, in accordance with some embodiments, by sequestering the species from the gas stream using a sequestration material. In some embodiments, the electronically conductive porous solid has a first side and a second side, and at least one of the first side and the second side is in fluid communication with a gaseous stream. For example, referring to FIG. 1A, in accordance with some embodiments, the electronically conductive porous solid 100 has a first side 104 and a second side 106, and both of the first side 104 and the second side 106 are in fluid communication with a gaseous stream 116 such that at least a portion of the gaseous stream 116 can pass through the pores 102 of the electronically conductive porous solid 100. In certain embodiments, to sequester the species of interest from the gaseous stream, a sequestration material is disposed adjacent to the electronically conductive porous solid. For example, referring to FIG. 1A, in some embodiments, a sequestration material is disposed adjacent to the electronically conductive porous solid 100 within medium 120 such that when a gaseous stream passes through the electronically conductive solid 100 from the first side 104 to the second side 106, a species from the gaseous stream 116 can be selectively sequestered by the sequestration material. Examples of mechanisms by which the species may be captured by a medium (e.g., electrochemical capture, non-electrochemical capture) are provided in more detail below.

In some embodiments, to prevent the sequestered species from back flowing into the gaseous stream (e.g., as a result of convective mass transfer), the fluid permeability of the electronically conductive porous solid can be reduced by applying an electrical potential such that the second side of the electrically conductive porous solid is no longer in fluidic communication with the gaseous stream. For example, referring to FIG. 1B, in some embodiments, the fluid permeability of the electronically conductive porous solid 100 is reduced when the electrical potential, having a first polarity 110, is applied to the electronically conductive porous solid 100. The application of the electrical potential can result in the deposition of a material on the electronically conductive porous solid 100 such that the second side 106 of the electrically conductive porous solid 100 is no longer in fluidic communication with the gaseous stream 116. In some embodiments, after the permeability of the electronically conductive porous solid 100 has been reduced, captured species within medium 120 can be released. Examples of mechanisms by which captured species may be released by a medium (e.g., electrochemical release, non-electrochemical release) are provided in more detail below.

In certain embodiments, the degree of fluid permeability of the electronically conductive porous solid can be controlled by modulating the strength of an applied electrical potential, and/or the deposition capacity of the material deposited on the electronically conductive porous solid. For example, in accordance with certain embodiments, by increasing the deposition capacity of a material deposited on the electronically conductive porous solid, a denser material layer will be formed on the electronically conductive porous solid, resulting in a higher blockage of the pores that leads to a higher reduction in fluid permeability of the electronically conductive porous solid.

In some embodiments, the inventive systems and methods described herein make use of multiple electronically conductive porous solids. The electronically conductive porous solids can be used as gates to control the flow of fluid (e.g., gaseous streams) into and out of a region between the electronically conductive porous solids. Examples of such systems are shown in FIGS. 2A-2C and 3A-3C, exemplary operations of which are described in more detail below.

Figure 2A:
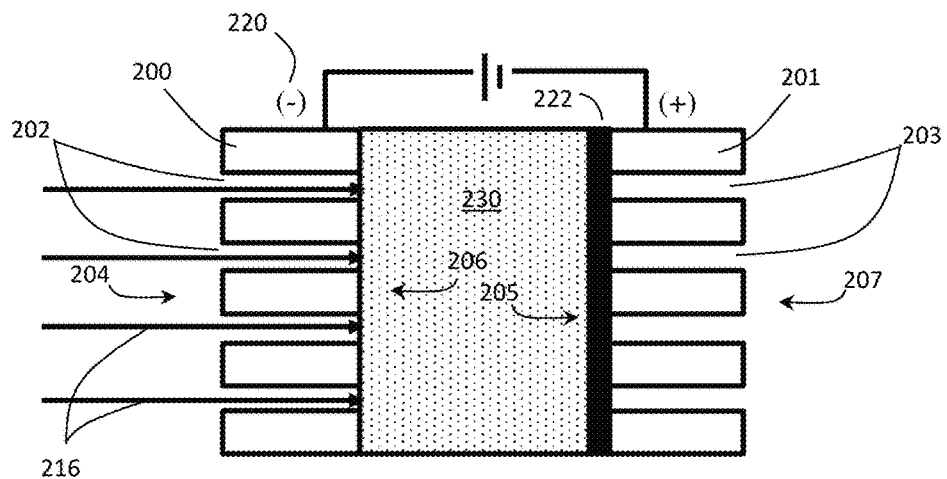
FIGS. 2A-2C are cross-sectional schematic illustrations showing the adjustment of fluid permeabilities of two porous media between which a medium for the capture of species is located, according to certain embodiments.
Figure 2B:
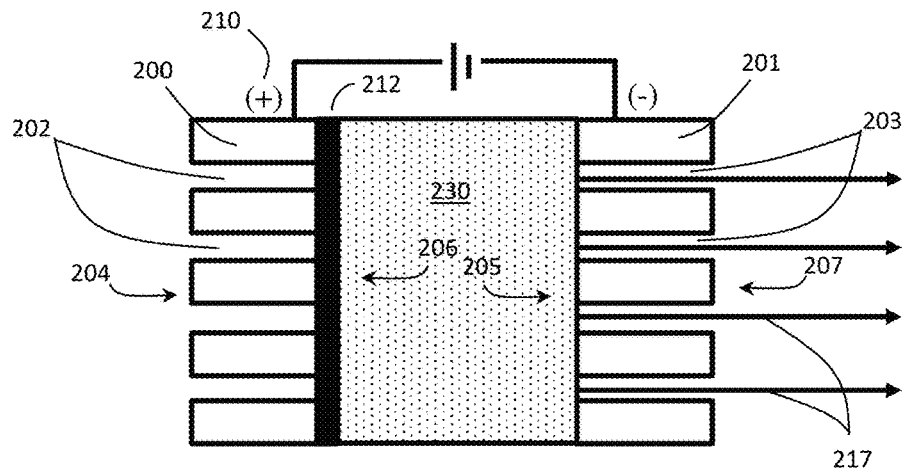
Figure 2C:
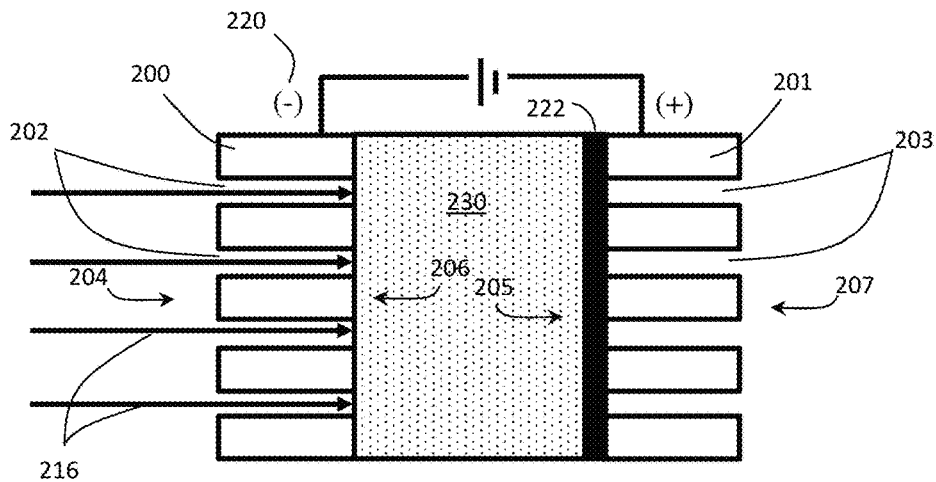

FIGS. 2A-2C are cross-sectional schematic diagrams showing a first electronically conductive porous solid 200 and a second electronically conductive porous solid 201 that is electronically coupled to the first electronically conductive porous solid 200. The two electronically conductive porous solids can be electronically coupled such that when an electrical potential is applied, electrical current travels from one electronically conductive porous solid to the other electronically conductive porous solid and results in a change in fluid permeability in both electronically conductive porous solids such that the change in fluid permeability of the first electrically conductive porous solid is opposite to the change in fluid permeability of the second electrically conductive porous solid. For example, in some cases, application of an electrical potential can cause an increase in the fluid permeability of the first electronically conductive porous solid while simultaneously causing a decrease in the fluid permeability of the second electronically conductive porous solid. In certain cases, application of an electrical potential can cause a decrease in the fluid permeability of the first electronically conductive porous solid while simultaneously causing an increase in the fluid permeability of the second electronically conductive porous solid.

In some embodiments, the polarity of the applied electrical potential controls whether the fluid permeability of each electronically conductive porous solid increases or decreases. For example, in some embodiments, when an electrical potential having a first polarity with respect to the first electronically conductive porous solid is applied, the fluid permeability of the first electronically conductive porous solid decreases while the fluid permeability of the second electronically conductive porous solid increases and, when an electrical potential having a second polarity with respect to the first electronically conductive porous solid is applied (the second polarity being opposite the first polarity), the fluid permeability of the first electronically conductive porous solid increases while the fluid permeability of the second electronically conductive porous solid decreases.

The permeability of both the first electronically conductive porous solid and the second electronically conductive solid can be altered using electrical potentials, for example, in a manner similar to the alteration of the fluid permeability of the electronically conductive porous solid 100 described above with relation to FIGS. 1A-1C. In fact, electronically conductive porous solid 100 may be used as one or both of electronically conductive porous solids 200 and 201 in FIGS. 2A-2C, and/or as one or both of electronically conductive porous solids 300 and 301 in FIGS. 3A-3C. In this way, electrical potentials can be used to switch the system illustrated in FIGS. 2A-2C between two states: a first state in which the first electronically conductive porous solid is permeable to fluid while the second electronically conductive porous solid is impermeable to fluid (as shown in FIGS. 2A and 2C) and a second state in which the first electronically conductive porous solid is impermeable to fluid while the second electronically conductive porous solid is permeable to fluid (as shown in FIG. 2B).

In certain embodiments, both the first electronically conductive porous solid and the second electronically conductive porous solid comprise pores that bridge one side of the solid material and a second side of the solid material. For example, in FIGS. 2A-2C, in accordance with certain embodiments, the first electronically conductive porous solid 200 comprises pores 202 that bridge first side 204 of electronically conductive porous solid 200 and second side 206 of electronically conductive porous solid 200. Furthermore, the second electronically conductive porous solid 201 comprises pores 203 that bridge first side 205 of electronically conductive porous solid 201 and second side 207 of electronically conductive porous solid 201.

The first electronically conductive porous solid and the second electronically conductive porous solid can be made of any of a variety of suitable materials. Generally, for each of the first electronically conductive porous solid and the second electronically conductive porous solid, at least one surface of the electronically conductive porous solid will be sufficiently electronically conductive to allow electrical current to be transported across at least one surface to a degree sufficient to allow for the adjustment of the fluid permeability of the electronically conductive porous solid, as described elsewhere herein. In some embodiments, the bulk of each of the first electronically conductive porous solid and the second electronically conductive porous solid is electronically conductive. In other embodiments, the bulk of each of the first electronically conductive porous solid and the second electronically conductive porous solid is electronically insulating, but one or more surfaces of each solid is coated with an electronically conductive material that imparts conductivity to the electronically insulating porous solid. For example, in certain embodiments, to make an electronically insulating porous solid electrically conductive, a metal is coated on at least one of the first side and the second side of the electronically insulating porous solid. In some embodiments, each electronically conductive porous solid is at least partially made of a metal, an electronically conductive ceramic, and/or an electronically conductive polymer. In certain embodiments, it can be advantageous for at least one of the first electronically conductive porous solid and the second electronically conductive porous solid to comprise a metal (e.g., in the bulk and/or as an electronically conductive coating). In some embodiments, the first electronically conductive porous solid and the second electronically conductive porous solid comprise the same metal. In some embodiments, the first electronically conductive porous solid and the second electronically conductive porous solid comprise different metals.

In some embodiments, a material can be deposited on a first side of the second electronically conductive porous solid. The material can, in some embodiments, be deposited over pores of the second electronically conductive porous solid such that its fluid permeability is reduced. For example, referring to FIG. 2A, in accordance with some embodiments, the fluid permeability of the second electronically conductive porous solid 201 is reduced when an electrical potential 220 is applied to the first and the second electronically conductive porous solids 200 and 201. The application of the electrical potential 220 can result in the deposition of a material 222 on the second electronically conductive porous solid 201 (e.g., over pores of the second electronically conductive porous solid) such that the second side 207 of the second electrically conductive porous solid 201 is no longer in fluidic communication with the medium 230.

Certain embodiments comprise altering an electrical potential applied between the first electronically conductive porous solid and the second electronically conductive porous solid. In some embodiments, altering the electrical potential applied between the first electronically conductive porous solid and the second electronically conductive porous solid (e.g., by changing the polarity of the applied electrical potential) results in the simultaneous alteration of the fluid permeabilities of the first electronically conductive porous solid and the second electronically conductive porous solid. Simultaneous, in this context, means that over at least a portion of the time during which the electrical potential is applied, material is being removed from one of the electronically conductive porous solids while also being deposited on the other of the electronically conductive porous solids. In some embodiments, when an electrical potential is applied to the first and second electronically conductive porous solids with a first polarity, a fluid permeability of the first electronically conductive porous solid is reduced and a fluid permeability of the second electronically conductive porous solid is increased. In certain embodiments, when an electrical potential is applied to the first and second electronically conductive porous solids with a second polarity opposite the first polarity, the fluid permeability of the first electronically conductive porous solid is increased and the fluid permeability of the second electronically conductive porous solid is reduced.

For example, referring to FIG. 2B, in accordance with some embodiments, when an electrical potential is applied to the first electronically conductive solid 200 and the second electronically conductive porous solid 201 with a first polarity 210, a fluid permeability of the first electronically conductive porous solid 200 is reduced and a fluid permeability of the second electronically conductive porous solid 201 is increased. In some embodiments, by altering the electrical potential (e.g., by changing its polarity), a material is deposited over pores of the first electronically conductive porous solid such that the fluid permeability of the first electronically conductive porous solid is reduced, and simultaneously a material is removed from pores of the second electronically conductive porous solid such that the fluid permeability of the second electronically conductive porous solid is increased. For example, in some embodiments, before applying an electrical potential with a first polarity 210 to the first and second electrically conductive solids 200 and 201, the pores 202 of the first electrically conductive porous solid 200 are initially unblocked, whereas the pores 203 of the second electrically conductive porous solid 201 are initially at least partially blocked by a material 222 deposited at an interface between the medium 230 and the second electronically conductive porous solid 201. One such example of this arrangement is shown in FIG. 2A. Referring to FIG. 2B, in accordance with some embodiments, by applying an electrical potential with a first polarity 210 to the first and the second electrically conductive porous solids, a material 212 is deposited at an interface between the medium 230 and the first electronically conductive porous solid 200 over the pores 202. In some such embodiments, at the same time that a material 212 is deposited over the pores 202 of the first electronically conductive porous solid 200, a material 222 is removed from an interface between the medium 230 and the second electronically conductive porous solid 201. In some embodiments, when a material is deposited at an interface between the medium and the first electronically conductive porous solid, the pores of the first electronically conductive porous solid are at least partially blocked. In some embodiments, the two materials (material 212 deposited on the first electronically conductive porous solid 200 and material 222 deposited on the second electronically porous solid 201) can comprise the same material. In some embodiments, the two materials (material 212 deposited on the first electronically conductive porous solid 200 and material 222 deposited on the second electronically porous solid 201) can comprise different materials.

Any of a variety of materials can be deposited over the pores of and/or removed from the first and second electronically conductive porous solids. For example, any of the materials described above with respect to electronically conductive porous solid 100 of FIGS. 1A-1C can be deposited on and/or removed from either or both of first electronically conductive porous solid 200 and/or second electronically conductive porous solid 201 to adjust their fluid permeabilities. In some embodiments, the deposition of material over pores of the first electronically conductive porous solid comprises deposition of colloidal particles over pores of the first electronically conductive porous solid. In some embodiments, the deposition of material over pores of the first electronically conductive porous solid comprises precipitation of the material over pores of the first electronically conductive porous solid. In some embodiments, the material deposited at the interface between the medium and the first electronically conductive porous solid and over the pores of the first electronically conductive porous solid comprises a metal and/or a metal oxide. For example, in some embodiments, a medium positioned between the first and the second electrically conductive porous solid comprises a metal salt dissolved in a solvent (e.g., an aqueous solvent or a non-aqueous solvent). In some embodiments, the metal salt is an electrolyte that can mediate the transport of charged species between the first and the second electronically conductive porous solids. In some embodiments, the dissolved metal salt comprises metal cations such that when an electrical potential with a first polarity is applied to the first and the second electrically conductively porous solids, the positive metal ions from the medium are reduced at the surface of the first electrically conductively porous solid, resulting in the deposition of a metal layer at the surface of the first electrically conductively porous solid, while the existing metal layer at the surface of the second electrically conductively porous solid is simultaneously oxidized into positive metal ions, resulting in the removal of the metal layer as the positive metal ions dissolve back into the medium. In certain embodiments, it can be advantageous to select a material that has a fast deposition and dissolution response under an applied electrical potential. Additional examples of materials that can be deposited over the pores of the electronically conductive porous solid are described in more detail below.

In certain embodiments, when an electrical potential is applied to the first and second electronically conductive porous solids with a second polarity opposite the first polarity, the fluid permeability of the first electronically conductive porous solid is increased and the fluid permeability of the second electronically conductive porous solid is reduced. For example, in FIG. 2C, when an electrical potential having a second polarity 220 opposite the first polarity 210 is applied to the first electronically conductive solid 200 and the second electronically conductive porous solid 201, the fluid permeability of the first electronically conductive porous solid 200 is increased and the fluid permeability of the second electronically conductive porous solid 201 is reduced. In some embodiments, by altering the electrical potential, a material is removed from pores of the first electronically conductive porous solid such that the fluid permeability of the first electronically conductive porous solid is increased, and simultaneously a material is deposited over pores of the second electronically conductive porous solid such that the fluid permeability of the second electronically conductive porous solid is reduced. For example, in certain embodiments, before applying an electrical potential with a second polarity 220 opposite the first polarity 210 to the first and second electrically conductive solids 200 and 201, the pores 202 of the first electrically conductive porous solid 200 are initially at least partially blocked by a material 212 deposited at an interface between the medium 230 and the first electronically conductive porous solid 200, whereas the pores 203 of the second electrically conductive porous solid 201 are initially unblocked. One such example of this arrangement is shown in FIG. 2B. Referring to FIG. 2C, in accordance with certain embodiments, by applying an electrical potential with a second polarity 220 opposite the first polarity 210 to the first and the second electrically conductive porous solids 200 and 201, a material 222 is deposited at an interface between the medium 230 and the second electronically conductive porous solid 201 and a material 212 is removed from an interface between the medium 230 and the first electronically conductive porous solid 200. In some embodiments, when a material is deposited at an interface between the medium and the second electronically conductive porous solid, the pores of the second electronically conductive porous solid are at least partially blocked. In some embodiments, the material deposited at the interface between the medium and the second electronically conductive porous solid and over the pores of the second electronically conductive porous solid comprises a metal and/or a metal oxide. In some embodiments, the deposition of material at the interface between the medium and the second electronically conductive porous solid and over pores of the second electronically conductive porous solid comprises deposition of colloidal particles over pores of the second electronically conductive porous solid. In some embodiments, the deposition of material at the interface between the medium and the second electronically conductive porous solid and over pores of the second electronically conductive porous solid comprises precipitation of the material over pores of the second electronically conductive porous solid.

In certain embodiments, the mechanisms associated with the deposition of a material at an interface between a medium and an electronically conductive porous solid can be the same for both of the first and the second electronically conductive porous solids. In certain embodiments, the mechanisms associated with the removal of a material from an interface between a medium and an electronically conductive porous solid can be the same for both of the first and the second electronically conductive porous solids.

As noted above, certain aspects are related to devices and methods in which a species of interest from a fluid (e.g., gas) stream is captured and subsequently released by altering the permeability of an electrochemical device comprising two electronically conductive porous solids coupled to each other. The systems and methods described herein can be used to capture any of a variety of suitable species including, but not limited to, acid gases and/or hydrocarbon gases. In addition, any of a variety of mechanisms for capturing the species can be used, including electrochemical mechanisms and non-electrochemical mechanisms. Additional examples of species that can be captured and released by the medium and additional examples of mechanisms by which species capture and release can be achieved are described in more detail below. Examples of systems and methods comprising multiple electronically conductive porous solids that can be used to capture species of interest are now described, with reference to FIGS. 2A-2C and FIGS. 3A-3C.

In some embodiments, the first electronically conductive porous solid has a first side and a second side, and at least one of the first side and the second side is in fluid communication with a fluid stream. For example, in FIG. 2A, the first electronically conductive porous solid 200 has a first side 204 and a second side 206, and both of the first side 204 and the second side 206 are in fluid communication with a fluid stream 216 adjacent to the first side 204 such that at least a portion of the fluid stream 216 can pass through the pores 202 of the first electronically conductive porous solid 200.

Certain embodiments comprise transporting a fluid through pores of the first electronically conductive porous solid. For example, in FIG. 2A, fluid 216 is transported through pores 202 of first electronically conductive porous solid 200. The fluid that is transported through the pores of the first electronically conductive porous solid may be in the form of a liquid and/or a gas. The fluid may be in the form of a pure fluid or a fluid containing one or more other components (e.g., ions, solids, other fluids of a different chemical composition, combinations of these, and the like). In certain embodiments, it can be particularly advantageous to use the systems and methods described herein to capture species of interest from fluids containing one or more gases. It has been found that certain of the systems and methods described herein can be used to achieve species capture from gaseous streams while substantially reducing (or eliminating) crosstalk between the inlet stream from which the species is captured and an outlet stream containing the released species.

In certain embodiments, to capture a species of interest from the fluid stream, a medium is positioned adjacent to the first electronically conductive porous solid. The medium can be positioned, for example, between the first electronically conductive porous solid and the second electronically conductive porous solid. For example, referring to FIG. 2A, in some embodiments, a medium 230 is disposed between the first electronically conductive porous solid 200 and the second electronically conductive porous solid 201 such that when a fluid stream 216 passes through the first electronically conductive solid 200 (from the first side 204 to the second side 206), a species from the fluid stream can be selectively captured by the medium 230.

Certain embodiments comprise releasing the species from the medium such that the species is transported through the second electronically conductive porous solid. As described elsewhere herein, the fluid permeability of the first and the second electrically conductive porous solids can be adjusted (in certain cases, simultaneously) by applying an electric potential to the first and the second electrically conductive porous solids such that a material is deposited at an interface between the medium and either the first or the second electrically conductive porous solid to at least partially block the pores of either electronically conductive porous solid. For example, referring to FIG. 2A, in certain embodiments, the pores 203 on the second electrically conductive porous solid 201 are, initially, at least partially blocked by a material 222 deposited at an interface between the medium 230 and the second electrically conductive porous solid 201 such that the species captured by the medium 230 cannot be transported through the second electronically conductive porous solid. In some embodiments, referring to FIG. 2B, by applying an electrical potential 210 (which has a different polarity than electrical potential 220 applied in FIG. 2A), the material 222 deposited at an interface between the medium 230 and the second electrically conductive porous solid 201 is removed such that the pores 203 on the second electrically conductive porous solid 201 are no longer blocked and such that a the species captured by the medium 230 can be released through the second electronically conductive porous solid 201.

In certain embodiments, the first and the second electronically conductive porous solids can function as gates to the medium during the capture of a species from a fluid (e.g., gas such as $CO_2$ or other acid gases from an exhaust stream) and the release of a species (e.g., into a product stream). For example, certain embodiments comprise applying an electrical potential to the electronically conductive porous solids such that a species from a fluid can enter through the first electronically conductive porous solid and can be subsequently captured by the medium. In FIG. 2A, for example, an electrical potential 220 has been applied to electronically conductive porous solids 200 and 201 such that a species from fluid stream 216 can enter through the first electronically conductive porous solid 200 and can be subsequently captured by medium 230.

In some embodiments, once the medium has captured the desired amount of species from the fluid (e.g. when the medium is saturated with the species), an electrical potential with a different polarity is applied such that the pores of the first electronically conductive porous solid become blocked (thus cutting off fluid communication between an inlet stream and the medium) and such that the pores of the second electronically conductive porous become unblocked (allowing for the release of species from the medium to an outlet stream). In some such embodiments, the fluid permeability of the first and the second electronically conductive porous solids can be adjusted such that the medium used to capture and release the species is in fluidic communication with a product stream separate from the input stream that originally contained the captured species without also being in fluidic communication with the input stream. For example, in FIG. 2B, the fluid permeabilities of the first and the second electronically conductive porous solids 200 and 201 have been adjusted relative to the fluid permeabilities of the first and the second electronically conductive porous solids 200 and 201 in FIG. 2A, such that, in FIG. 2B, medium 230 used to capture and release the species from stream 216 is in fluidic communication with product stream 217 (which is separate from the input fluid stream 216) and is also not in fluidic communication with the input fluid stream 216. To illustrate one exemplary mode of operation with reference to FIGS. 2A-2B, in some embodiments, once medium 230 has captured a desired amount of species from fluid stream 216, an electrical potential having a different polarity 210 can be applied to electronically conductive porous solids 200 and 201. Application of the electrical potential having a different polarity 210 can result in the pores of first electronically conductive porous solid 200 becoming blocked, thus cutting off fluid communication between inlet stream 216 and medium 230. In addition, application of the electrical potential having a different polarity 210 can result in the pores of the second electronically conductive porous become unblocked, allowing for the release of species from medium 230 to outlet stream 217.

Figure 3A:
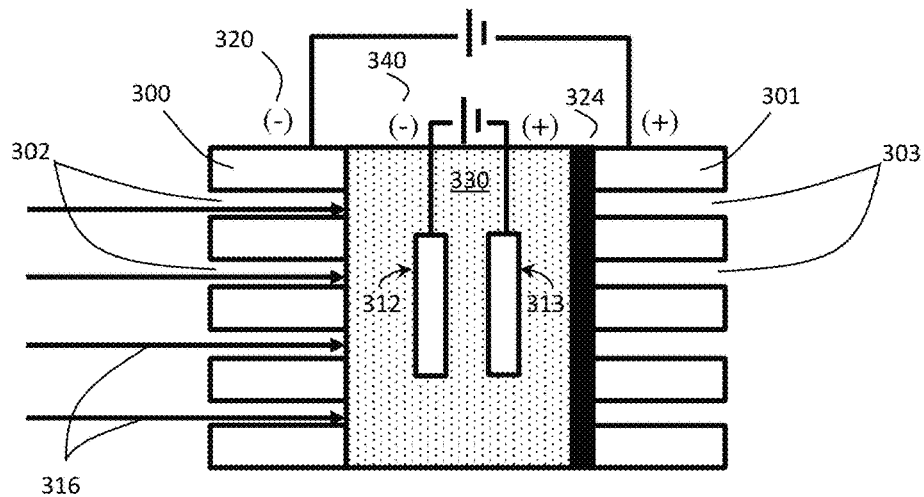
FIGS. 3A-3C are cross-sectional schematic illustrations showing the adjustment of fluid permeabilities of two porous media between which a medium for the electrochemical capture of species is located, according to certain embodiments.
Figure 3B:
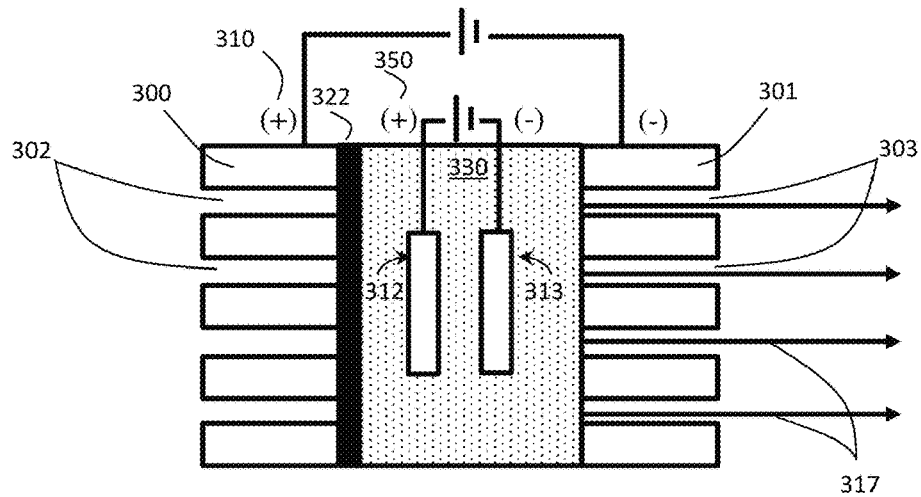
Figure 3C:
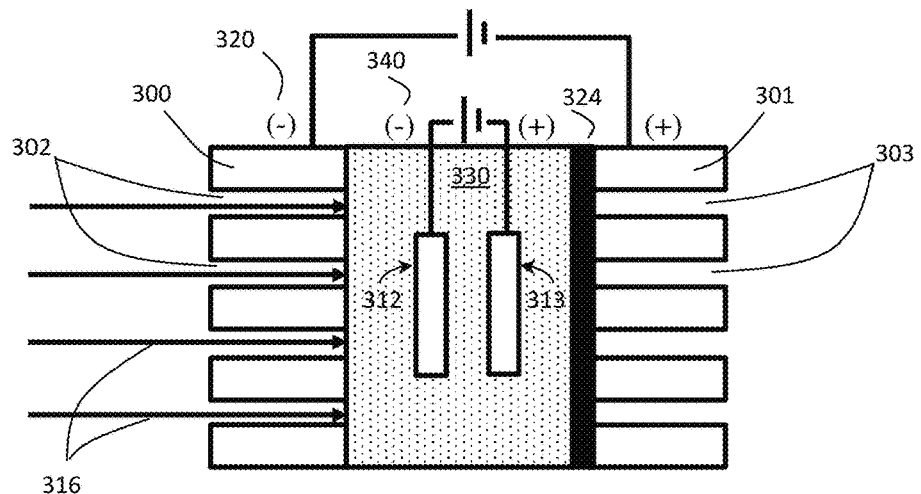

As noted above, certain embodiments comprise the use of a medium to capture and/or release species from a fluid (e.g., gaseous) stream. For example, referring back to FIGS. 1A-1C, in certain embodiments, medium 120 can be used to capture and/or release one or more species from stream 116. Also, referring to FIGS. 2A-2C, in some embodiments medium 230 can be used to capture and/or release one or more species from stream 216. Referring to FIGS. 3A-3C, in certain embodiments, medium 330 can be used to capture and/or release one or more species from stream 316.

Capture and release of species can be achieved using any of a variety of mechanisms. In certain embodiments, the medium comprises a sequestration material. In some embodiments, the sequestration material can capture species via a non-electrochemical mechanism. Examples of suitable non-electrochemical mechanisms include, but are not limited to, adsorption, absorption, and/or a non-electrochemical chemical reaction. Electrochemical capture mechanisms, described in more detail below, can also be used.

In some embodiments, the sequestration material comprises a zeolite, a metal-organic framework, a resin, and/or an electrolyte. Additional examples of sequestration material capture medium are described in more detail below.

In some embodiments, the sequestration material is in the medium positioned between the first and second electrically conductive porous solid. The sequestration material can be disposed in the medium by any known physical and/or chemical means. For example, the sequestration material can be disposed in the medium via any physical and chemical interactions with the medium (e.g., embedding, adsorbing, reacting). For example, referring to FIGS. 2A-2C, in some embodiments, a sequestration material is in the medium 230 positioned between the first and the second electrically conductive porous solids 200 and 201. In some such embodiments, when a fluid stream 216 (e.g., a gaseous stream) passes through the pores 202 of the first electrically conductive porous solid 200, the sequestration material selectively captures a species from the fluid stream 216 via non-electrochemical mechanism, such as adsorption, absorption, and/or a non-electrochemical chemical reaction.

Certain embodiments comprise releasing a species from the sequestration material by exposing the medium to a stimulus such as a change in chemical and/or physical conditions. In some embodiments, the stimulus comprises a change in temperature and/or pressure. For example, in certain embodiments, a species could be absorbed to the sequestration material at an initial temperature that is associated with a high capture affinity (e.g., a high adsorption affinity, a high absorption affinity, a high rate of chemical reaction that results in the capture of the species, and the like) between the sequestration material and the species, and subsequently released from the sequestration material at a second temperature that that is associated with a low capture affinity (e.g., a low adsorption affinity, a low absorption affinity, a high rate of chemical reaction that results in the release of the species, and the like) between the sequestration material and the species. In certain embodiments, a species can be captured by the sequestration material at a first partial pressure that favors the capture of the species by the sequestration material, and then released at a second partial pressure (e.g., by applying a vacuum) that favors the release of the species from the sequestration material. Other mechanisms of non-electrochemical capture and release are also possible.

The present disclosure is not limited to embodiments in which the medium captures species non-electrochemically, and in some embodiments, the medium can electrochemically capture one or more species. For example, in some embodiments, the medium comprises a first electrode and a second electrode such that the medium can capture the species of interest from a fluid via an electrochemical mechanism (e.g., an electrochemical reaction between the species one wishes to capture and/or release and an electrochemically active material). For example, in FIGS. 3A-3C, a first electrode 312 and a second electrode 313 coupled to the first electrode 312 are positioned in the medium 330 between a first electrically conductive porous solid 300 and second electrically conductive porous solid 301. The properties of the first and the second electrically conductive porous solids 300 and 301 can be the same as those described elsewhere herein with respect to FIGS. 2A-2C. In some embodiments, by applying a first electrical potential between the first electrode and the second electrode of the medium (also described herein as the "medium electrical potential"), the species from the fluid is electrochemically captured by the medium. For example, in FIG. 3A, by applying a first medium electrical potential 340 between a first electrode 312 and a second electrode 313, a species from a fluid stream 316 (e.g., a gas) that passes through the pores of the first electrically conductive porous solid 300 can be electrochemically captured by the medium 330. While the first and the second electrodes 312 and 313 are illustrated as being in the same material used to facilitate the adjustment of the permeability of porous solids 300 and 301 in FIGS. 3A-3C, in other embodiments, the first and the second electrodes 312 and 313 can be in a material that is different from the material used to facilitate the adjustment of the permeability of porous solids 300 and 301 in FIGS. 3A-3C (e.g., such as a second liquid material located within a first liquid material, all of which may be part of medium 330). In certain embodiments, the medium further contains a material that is electrochemically activated such that a species of interest can bind to the electrochemically activated form of the material. In certain embodiments, by applying an electrical potential having a first polarity to the first medium electrode and the second medium electrode, the electrochemically active material in the medium undergoes oxidation or reduction and such that it forms a complex with the species of interest, thus capturing the species of interest. Additional examples of materials that can electrochemically capture the species are described in more detail below.

In certain embodiments, by applying a second medium electrical potential between the first electrode and the second electrode of the medium, the second medium electrical potential having a polarity that is the opposite of the polarity of the first medium electrical potential, the species captured by the medium can be released by the medium. For example, in FIG. 3B, by applying a second medium electrical potential 350 between a first electrode 312 and a second electrode 313, a species captured by the medium 330 can be electrochemically released by the medium 330. In certain embodiments, with the application of a second medium electrical potential, the material in the medium undergoes either oxidation or reduction, thus resulting in release (e.g., via dissociation) of the species of interest.

In some embodiments, the medium used to capture the species is in fluid communication with the outside environment via only one of the first electronically conductive porous solid and the second electronically conductive porous solid during species capture and during species release. For example, in certain embodiments, during the process of capturing the species from the input stream (e.g., input fluid stream 216 in FIGS. 2A and 2C, input fluid stream 316 as shown in FIG. 3A and FIG. 3C), the medium is in fluid communication with the outside environment only via first electronically conductive medium. Examples of such operation are shown, for example, in FIGS. 2A, 2C, 3A, and 3C. In some embodiments, during the process of releasing the species from the medium into an outlet stream (e.g., stream 217 in FIG. 2B, stream 317 in FIG. 3B), the medium is in fluid communication with the outside environment only via second electronically conductive medium. Examples of such operation are shown, for example, in FIGS. 2B and 3B.

In certain embodiments in which electrochemical capture and release of a targeted species is employed, the operation of the electrodes within the medium (used to electrochemically capture the species) and the operation of the first and the second electronically conductive solids (used to control which external fluid is in fluidic communication with the medium) are coupled, for example to allow for continuous capture and release of a species from a fluid being transported into the medium. For example, in some embodiments, the system can be operated in a "capture mode," during which an electrical potential can be applied to the first and second electronically conductive porous solids such that the first electronically conductive porous solid remains fluid permeable (thus establishing or maintaining fluidic communication between the capture medium and the input fluid stream containing the species of interest) and the second electronically conductive porous solid remains fluid impermeable. Also, in "capture mode," a first medium electrical potential can be applied to the first and the second electrodes within the medium such that a material in the medium is electrochemically activated to capture the species that is transported into the medium. To illustrate, referring to FIG. 3A, in certain embodiments, an electrical potential 320 can be applied to the first and second electronically conductive porous solid 300 and 301 such that first electronically conductive porous solid 300 remains fluid permeable (thus establishing or maintaining fluidic communication between medium 330 and input stream 316 containing the species of interest) and the second electronically conductive porous solid 301 remains fluid impermeable. Also, a first medium electrical potential 340 can be applied to the first and the second electrodes 312 and 313 within medium 330 such that a material in medium 330 is electrochemically activated to capture the species that is transported into the medium via stream 316.

In some embodiments, once the medium captures a certain amount of species (e.g., when the medium is saturated with the species, or when the medium otherwise captures a desired amount of the species), the polarities of the applied electrical potentials can be altered such that the system is operated in "release mode." During release mode, an electrical potential can be applied to the first and second electronically conductive porous solids such that the first electronically conductive porous solid is rendered fluid impermeable (thus cutting off fluidic communication between the capture medium and the input fluid stream containing the species of interest) and the second electronically conductive porous solid can be rendered fluid permeable (thus establishing fluidic communication between the medium and an outlet stream). Also, in "release mode" a medium electrical potential can be applied to the first and the second electrodes within the medium such that a material in the medium is electrochemically activated to release the species that was captured during capture mode. To illustrate, referring to FIG. 3B, in certain embodiments, an electrical potential 310 can be applied to the first and second electronically conductive porous solids 300 and 301 such that first electronically conductive porous solid 300 is rendered fluid impermeable (thus cutting off fluidic communication between medium 330 and input stream 316 containing the species of interest) and the second electronically conductive porous solid 301 is rendered fluid permeable (thus establishing fluidic communication between the medium and an outlet stream). Also, in FIG. 3B, medium electrical potential 350 can be applied to the first and the second electrodes 312 and 313 within medium 330 such that a material in medium 330 is electrochemically activated to release the species that was capture by the medium 330 during capture mode, which can be subsequently transported out of medium 330 via stream 317.

In some embodiments, the process of species capture and release can be repeated. Referring to FIG. 3C, in accordance with certain embodiments, the electrical potentials of the both the electronically conductive porous solid and the electrodes within the medium can be adjusted to repeat "capture mode" operation. For example, referring to FIG. 3C, in accordance with certain embodiments, with the application of electrical potential 320, an alternation of fluid permeability occurs such that the pores 302 of the first electronically conductive porous solid are open to fluid stream 316 (e.g., a gas), in a manner similar to that illustrated in FIG. 3A. Similarly, referring to FIG. 3C, a material in the medium 330 can be electrochemically activated to capture the species that is transported through the first electronically conductive porous solid 301.

In some embodiments, the electrodes within the medium can be coupled to the electronically conductive porous solids in a way that allows an automated adjustment of fluid permeability of the electronically conductive porous solids during species capture and release.

In some embodiments, the medium comprises an electrolyte that can facilitate the transfer of a species to an electrochemically activated material (e.g., a material that can undergo redox reaction) in the medium to participate in the capture and release of the species. In some embodiments, the same electrolyte can be shared between the electrodes in the medium and the electronically conductive porous solids such that the electrolyte can facilitate both the transfer of charged species to the electronically conductive porous solids to modulate fluid permeability (e.g. via deposition/removal of a material under an applied electrical potential as described elsewhere herein) and the transfer of the species to the electrodes in the medium to facilitate the capture and release of the species (e.g., via electrochemical processes such as redox reactions). For example, in accordance with certain embodiments, the electrolyte permits the diffusion of a species (e.g., $CO_2$) from a fluid (e.g., a gas) through the medium to and away from the electrochemically activated material in the medium during the species capture and release process.

In some embodiments, a first redox potential is associated with the electrochemical capture and release of a species by a material that can be electrochemically activated to bind and unbind a species of interest. In some embodiments, a second redox potential is associated with the electrochemical deposition and removal of a material from the electronically conductive porous solid as described elsewhere herein. In some embodiments, the first redox potential of the species capture/release process is energetically more favorable than second redox potential of a material deposited/removed from the electronically conductive porous solid.

Certain embodiments comprises electrochemically capturing and releasing a species (e.g., $CO_2$) from a fluid (e.g., gas) using a material that can reversibly bind and unbind the species via an electrochemical process (e.g., redox reaction). For example, a species of interest (e.g., $CO_2$) can be carried by an electrolyte through the medium to bind electrochemically to material in the medium. The material (e.g., quinones) can subsequently selectively bind to the species (e.g., $CO_2$) to form stable adducts as the material (e.g., quinones) undergoes reduction by a first medium electrical potential. In certain embodiments, once a certain binding capacity has been reached (e.g., quinones are saturated by $CO_2$), a second electric potential can be applied to oxidize the material (e.g., quinones) such that the species (e.g., $CO_2$) can dissociate from the material (e.g., quinones) and subsequently diffuse through the electrolyte to be released to an outlet stream.

In some embodiments, the material (e.g., quinones) that can reversibly bind and unbind a species of interest (e.g., $CO_2$) is deposited on a first electrode to form a composite electrode. For example, the composite electrode can comprise a porous structure such that an electrolyte in the medium can permeate through the pores to facilitate the diffusion of a dissolved species (e.g., $CO_2$) both to and away from the composite electrode. With the application of electric potentials of different polarities, the dissolved species (e.g., $CO_2$) in the electrolyte can either bind or unbind from the material (e.g., quinones) on the composite electrode. For example, referring to FIG. 3A, in accordance with certain embodiments, the medium comprises a first electrode 312 (e.g., a composite comprising poly(1,4-anthraquinone) casted or otherwise deposited on carbon nanotubes) and a second electrode 313 (e.g., an $LiFePO_4$ counter electrode). In some embodiments, when a first medium potential 340 has been applied to the first and the second electrodes 312 and 313, the material (e.g., quinones) on the first electrode 312 becomes reduced and binds to the species (e.g., $CO_2$) dissolved in the electrolyte in the medium 330. Now referring to FIG. 3B, once the material (e.g., quinones) is saturated with the species (e.g. $CO_2$), a second medium potential (350) can be applied to the first and second electrodes to dissociate $CO_2$ from the material (e.g., quinones) on the composite electrode 312.

In accordance with certain embodiments, electronically conductive porous solids can be coupled to the first and second electrodes to gate the species capture and release process that occurs within the medium. In some embodiments, the medium comprises metal ions (e.g. $Zn^{+2}$) that participate in the deposition and removal of a metal layer (e.g. Zn) on the electronically conductive solids as described elsewhere herein. For example, referring to FIG. 3A, in accordance with certain embodiments, during the species (e.g., $CO_2$) capturing process, a material 324 (e.g., a metal layer comprising Zn) can be deposited on a second electronically conductive porous solid 301 to prevent diffusion of the species (e.g., $CO_2$) out of the medium 303 through the second electronically conductive porous solid 303. During the species release process as shown in FIG. 3B, the material 324 (e.g., a metal layer comprising Zn) can be removed from the second electronically conductive solid 301 while a material 322 (e.g., metal layer comprising Zn) can be deposited on the first electronically conductive solid 300 such that the species (e.g. $CO_2$) dissociated from the material (e.g., quinones) can be released into the outlet stream 317. In some embodiments, the two materials (material 322 deposited on the first electronically conductive porous solid 300 and material 324 deposited on the second electronically porous solid 301) can comprise the same material. In some embodiments, the two materials (material 322 deposited on the first electronically conductive porous solid 300 and material 324 deposited on the second electronically porous solid 301) can comprise different materials.

Examples of electrochemically-induced $CO_2$ capture and release processes are described, for example, in U.S. Pat. No. 10,464,018; issued on Nov. 5, 2019; and entitled "Electrochemical Process for Gas Separation," which is incorporated herein by reference in its entirety for all purposes.

As noted above, in certain of the systems and methods described herein, material can be deposited over pores of an electrically conductive solid and/or removed from over pores of an electronically conductive solid material to alter its fluid permeability. Those of ordinary skill in the art, given the guidance provided by this specification, would be capable of selecting materials that could be used to adjust the permeability of an electronically conductive porous solid. In some embodiments, the material comprises colloidal particles. Non-limiting examples of such colloidal particles include but are not limited to inorganic colloidal particles such as metallic particles (e.g., Au, Ag, etc.), metal oxide particles (e.g., silica, iron oxide, etc.), carbon-based particles, insoluble salt particles, metal hydroxides, metal sulfides, and polymeric particles (e.g., polystyrene, latex, etc.). Non-limiting examples of electrolytes that could be used to facilitate the transport of the colloidal particles between electronically conductive porous solids include but are not limited to any aqueous and non-aqueous electrolytes with supporting ionic species.

In some embodiments, the material comprises a metal. For example, in some embodiments, a metal can be plated and deplated from an electronically conductive solid material to adjust the fluid permeability of the electronically conductive solid material. Non-limiting examples of metals that can be deposited include but are not limited to Zn, Mg, Na, and Li. In some embodiments, the material comprises a metal oxide. Non-limiting examples of metal oxides that can be deposited include but are not limited to zinc oxide, aluminum oxide, iron oxide, nickel oxide, manganese oxide, copper oxide, and/or other transition metal oxides. In some embodiments, the material comprises a metal hydroxide (e.g., zinc hydroxide, aluminum hydroxide, etc.). Non-limiting examples of electrolytes that could be used to facilitate the transport of metal/metal oxides between electronically conductive porous solids include but are not limited to any aqueous and non-aqueous electrolytes comprising precursors of the metal/metal oxide/metal hydroxide.

As noted above, certain of the systems and methods described comprise a medium that comprises metal salt dissolved in a solvent (e.g., an aqueous solvent or a non-aqueous solvent). Examples of metal salts that can be used for this purpose include, but are not limited to, metal salts comprising metal cations (e.g., Zn, Na, Mg, etc.) complexed with anions (e.g., fluoride, chloride, bromide, iodide, hydroxide, nitrate, nitrite, sulfate, sulfite, phosphate, perchlorate, carbonate, acetate, hexafluorophosphate, triflate, bis(trifluoromethanesulfonyl)imide, etc.). The medium can also comprise non-metal salts. Non-metal salts that can be used for this purpose include, but are not limited to, non-metal salts comprising non-metal cations (e.g., ammonium cations, etc.) and anions (e.g., fluoride, chloride, bromide, iodide, hydroxide, nitrate, nitrite, sulfate, sulfite, phosphate, perchlorate, carbonate, acetate, hexafluorophosphate, triflate, bis(trifluoromethanesulfonyl)imide, etc.). In some embodiments, the solvent is a non-aqueous solvent. Examples of non-aqueous solvents that can be used include, but are not limited to, alcohols (e.g., ethanol, propanol, etc.), carbonates (e.g., propylene carbonate, dimethyl carbonate, diethyl carbonate, ethylene carbonate, etc.), ethers (e.g., dimethoxyethane, dioxolane, etc.), acetonitrile, dimethylformamide, dimethyl sulfoxide, ethylene glycol, glycerol, and ionic liquids.

Some embodiment comprises adjusting the permeability of the electronically conductive porous solids via the deposition and dissolution of a metal (e.g., Zn) deposited on top of the electronically conductive porous solid. In some embodiments, a medium comprises a metal salt (e.g., zinc bis(trifluoromethane sulfonyl) imide) dissolved in a non-aqueous solvent (e.g., propylene carbonate).

Those of ordinary skill in the art, given the guidance provided by the present disclosure, would be capable of selecting combinations of solvents, deposited and removed species, and dissolved salts that would allow for the permeability adjustments of the electronically conductive porous solids described herein. For example, in certain embodiments in which Zn is deposited and removed from the electronically conductive porous solid to adjust the fluid permeability, a zinc-containing salt (e.g., zinc bis(trifluoromethane sulfonyl) imide, zinc chloride, zinc nitrate, zinc sulfate, zinc triflate, etc.) can be dissolved in a solvent capable of dissolving the salt (e.g., water and non-aqueous solvents such as alcohols (e.g., ethanol, propanol, etc.), carbonates (e.g., propylene carbonate, dimethyl carbonate, diethyl carbonate, ethylene carbonate, etc.), ethers (e.g., dimethoxyethane, dioxolane, etc.), acetonitrile, dimethylformamide, dimethyl sulfoxide, ethylene glycol, glycerol, etc.). Similarly, in certain embodiments in which Na is deposited and removed from the electronically conductive porous solid to adjust the fluid permeability, a sodium-containing salt (e.g., sodium bis(trifluoromethanesulfonyl) imide, sodium chloride, sodium nitrate, sodium sulfate, sodium triflate) can be dissolved in a solvent capable of dissolving the salt (e.g., water and non-aqueous solvents such as alcohols (e.g., ethanol, propanol, etc.), carbonates (propylene carbonate, dimethyl carbonate, diethyl carbonate, ethylene carbonate, etc.), ethers (dimethoxyethane, dioxolane, etc.), acetonitrile, dimethylformamide, dimethyl sulfoxide, ethylene glycol, glycerol, etc.). Similar combinations can be used for other embodiments in which other metal materials (e.g., Mg, Li, etc.) are being deposited on and removed from the electronically conductive porous solids. For example, in order to deposit and remove a metal oxide (e.g., manganese oxide) on and from the electronically conductive porous solid, a manganese-containing salt (e.g., manganese chloride, nitrate, sulfate, permanganate, etc.) can be dissolved in a solvent capable of dissolving the salt (e.g., water, alcohols (ethanol, propanol, etc.), carbonates (propylene carbonate, dimethyl carbonate, diethyl carbonate, ethylene carbonate, etc.), ethers (dimethoxyethane, dioxolane, etc.), acetonitrile, dimethylformamide, dimethyl sulfoxide, ethylene glycol, glycerol, etc.). Similar combinations of metal oxide/metal salt/solvent can be used for the deposition of other metal oxides. In some embodiments, the deposition and removal of colloidal particles on and from the electronically conductive porous solid can be facilitated by combinations of solvents, colloidal species, and dissolved salts. For example, charged silica particles can be dispersed in a solvent capable of forming stable dispersion of the particle (e.g., water, alcohols (etc., ethanol, propanol, etc.), carbonates (e.g., propylene carbonate, dimethyl carbonate, diethyl carbonate, ethylene carbonate, etc.), ethers (e.g., dimethoxyethane, dioxolane, etc.), acetonitrile, dimethylformamide, dimethyl sulfoxide, ethylene glycol, glycerol, etc.) together with supporting salt species (e.g., metal or ammonium as cations with fluoride, chloride, bromide, iodide, hydroxide, nitrate, nitrite, sulfate, sulfite, phosphate, perchlorate, carbonate, acetate, hexafluorophosphate, triflate, bis(trifluoromethanesulfonyl)imide, etc. as anions) to render the solvent ionically conductive. Similar combinations of colloidal species/salts/solvent can be used for the deposition of other colloidal particles.

As noted above, certain of the systems and methods described herein can be used to capture one or more species from a fluid (e.g., gas) stream. In some embodiments, the species comprises an acid gas. Examples of acid gases that can be captured, in accordance with certain embodiments, include but are not limited to carbon dioxide ($CO_2$), sulfur monoxide (SO), sulfur dioxide ($SO_2$), nitrogen dioxide ($NO_2$), hydrogen sulfide ($H_2S$), sulfur trioxide ($SO_3$), nitric oxide (NO), nitrous oxide ($N_2O$), dinitrogen trioxide ($N_2O_3$), dinitrogen tetroxide ($N_2O_4$), dinitrogen pentoxide ($N_2O_5$), and/or carbonyl sulfide (COS). In some embodiments, the acid gas comprises at least $CO_2$. In some embodiments, the species comprises a hydrocarbon gas. Examples of hydrocarbon gases that can be captured, in accordance with certain embodiments, include but are not limited to alkanes, alkenes, alkynes, and the like.

As noted above, certain of the systems and methods described herein can be used to capture one or more species from a fluid (e.g., gas) stream via a non-electrochemical process. In some embodiments, the sequestration material comprises a zeolite, a metal-organic framework, a resin, and/or an electrolyte. In embodiments in which the sequestration material captures the species of interest via a non-electrochemical mechanism, the non-electrochemical mechanism can involve absorption, adsorption, and/or a non-electrochemical chemical reaction. Those of ordinary skill in the art, given the guidance provided by the present disclosure, would be capable of selecting sequestration materials that could be used to capture specific species of interest. For example, for reversibly capturing and releasing carbon dioxide, alkali metal borates, zeolites, metal-organic frameworks, covalent-organic frameworks, amines, organic solvents, and/or ionic liquids could be used. As another example, for reversibly capturing and releasing various hydrocarbons (e.g., methane, ethane, butane, etc.), zeolites, metal-organic frameworks, covalent-organic frameworks, organic solvents, and/or ionic liquids could be used.

As noted above, certain of the systems and methods described herein can be used to electrochemically capture one or more species from a fluid (e.g., gas) stream. Those of ordinary skill in the art, given the guidance provided by the present disclosure, would be capable of selecting electrochemically activated capture media materials that could be used to capture specific species of interest. For example, for reversibly capturing and releasing carbon dioxide and/or other acid gases, poly(1,4-anthraquinone), benzoquinone, naphthoquinone, anthraquinone, phenanthrenequinone, organic disulfides, bipyridines, imides, quinoxalines, and/or their derivatives could be used. For reversibly capturing and releasing sulfur dioxide, poly(1,4-anthraquinone), benzoquinone, naphthoquinone, anthraquinone, phenanthrenequinone, organic disulfides, bipyridines, imides, quinoxalines, and/or their derivatives could be used.

As noted above, certain of the systems and methods described herein can make use of one or more electronically conductive porous solids (e.g., electronically conductive porous solid 100 in FIGS. 1A-1D; electronically conductive porous solids 200 and 201 in FIGS. 2A-2C; and/or electronically conductive porous solids 300 and 301 in FIGS. 3A-3C). Examples of materials that can be used to form all or part of the electronically conductive solid include but are not limited to metal (e.g., gold, copper, platinum, silver, chromium, titanium, aluminum, nickel, stainless steel), electronically conductive ceramic (e.g., indium tin oxide, fluorine doped tin oxide, etc.), and/or electronically conductive polymer (e.g., polypyrrole, polyaniline, polyacetylene, polythiophene, etc.). The electronically porous solid porous solid can comprise, in some embodiments, non-conductive porous solid at least partially coated with an electronically conductive material (e.g., any of the electronically conductive materials noted above). Examples of non-conductive porous solids include but are not limited to metal and/or metalloid oxides (e.g., anodic aluminum oxide (AAO), silicon dioxide, zinc oxide, zirconium oxide, etc.), electronically insulating polymers, and the like.

In some embodiments, at least one surface of the electronically conductive porous solid(s) can have relatively low sheet resistance. The surface with the relatively low sheet resistance can span a face of the electronically conductive porous solid such that application of a voltage to the surface alters (e.g., increases or decreases, as described elsewhere herein) the through-thickness fluid permeability of the electronically conductive porous solid. The sheet resistance of a surface of an electronically conductive porous solid is generally measured using a four-point probe, where current is applied between two of the probes (one positioned on either side of the thickness of the electronically conductive porous solid) and voltage is measured between the other two probes using a voltmeter. In some embodiments, at least one surface of the electronically conductive porous solid(s) has a sheet resistance of less than 1000 mOhm/sq, less than 100 mOhm/sq, less than 10 mOhm/sq, less than 1 mOhm/sq, less than 0.1 mOhm/sq, less than 0.01 mOhm/sq, less than 0.001 mOhm/sq, or less than 0.0001 mOhm/sq. Other ranges are also possible.

Figure 4A:
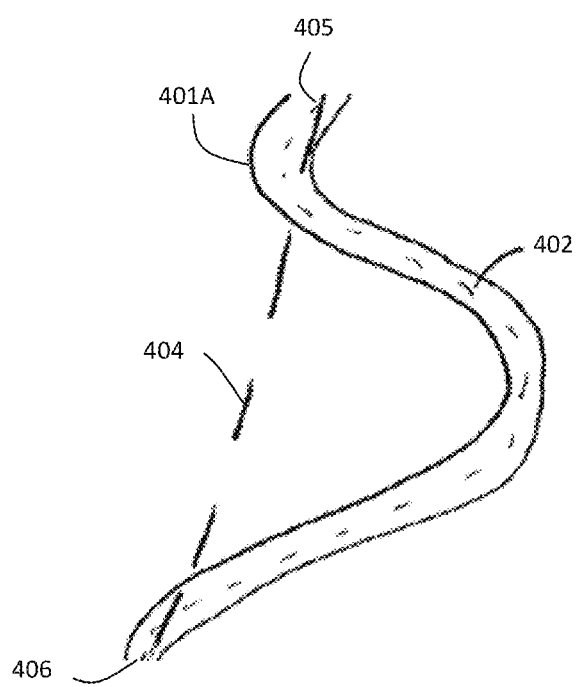
FIGS. 4A-4C are cross-sectional schematic illustrations showing the tortuosities of pores of a porous medium, according to certain embodiments.
Figure 4B:
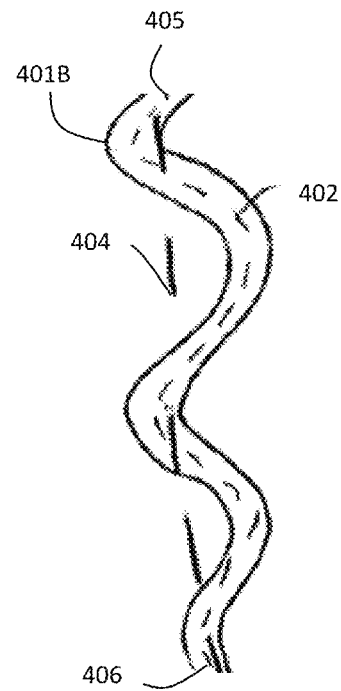
Figure 4C:
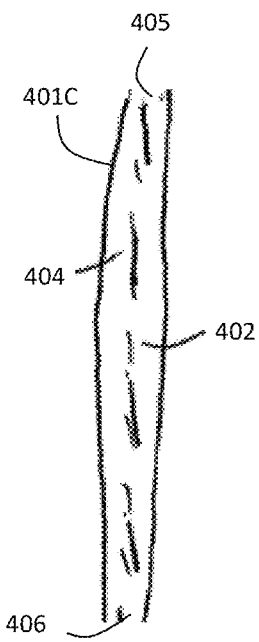

In some embodiments, the pores of the electronically conductive porous solid(s) can have relatively low tortuosities. The tortuosity (or $\tau$) of a pore is generally defined as the ratio of the true length of the pore ($L_{pore}$) to the length of the line segment connecting ore, one end of the pore to the other end of the pore (H); or, $\tau = L_{pore}/H$. For example, FIG. 4A shows a relatively highly tortuous pore 401A within an electronically conductive porous solid; FIG. 4B shows a moderately tortuous pore 401B within an electronically conductive porous solid; and FIG. 4C shows a perfectly straight pore 401C within an electronically conductive porous solid with a tortuosity of exactly 1. In FIGS. 4A, 4B, and 4C, $L_{pore}$ is indicated by 402 and H is indicated by 404. In some embodiments, the electronically conductive porous solid comprises pores having a tortuosity of less than or equal to 3.0, less than or equal to 2.5, less than or equal to 2.0, less than or equal to 1.75, less than or equal to 1.5, less than or equal to 1.4, less than or equal to 1.3, less than or equal to 1.2, or less than or equal to 1.1. Other ranges are also possible.

U.S. Provisional Patent Application No. 63/002,490, filed Mar. 31, 2020, and entitled "Porous Medium with Adjustable Fluid Permeability and Associated Systems and Methods," is incorporated herein by reference in its entirety for all purposes. Yayuan Liu, et al., "Electrochemically mediated gating membrane with dynamically controllable gas transport," Sci. Adv. 2020, Vol. 6 (DOI: 10.1126/sciadv.abc1741) is also incorporated herein by reference in its entirety for all purposes.

The following example is intended to illustrate certain embodiments of the present invention, but does not exemplify the full scope of the invention.

EXAMPLE

This example describes an electrochemically-mediated carbon dioxide concentrator in which gating membranes are integrated with redox-active carbon dioxide sorbents. In this example, the gating mechanism effectively prevented crosstalk between feed and product gas streams for high-efficiency, directional carbon dioxide pumping. This concept of dynamically regulating transport at gas-liquid interfaces can be generally applied to a number of systems, including those in the fields of gas separations, miniaturized devices, multiphase reactors, and the like.

The design of stimuli-responsive gating membranes capable of regulating substance transport at the nanoscale is a subject of intense research, motivated by the broad potential impact on science and technology. To date, a wide variety of functional membranes have been investigated with tunable permeability/selectivity of species in liquid phase (solvents, ions, and dissolved organic molecules). However, the control of gas molecule transport at gas-liquid interfaces remains largely unexplored, mainly due to the smaller sizes and greater diffusivities of both free and dissolved gas molecules, as well as the spontaneous interfacial mass transfer to establish the corresponding equilibrium state. Nevertheless, the capability of dynamically modulating the transport behavior at gas-liquid interface is important for a wide spectrum of emerging energy, biomedical, and chemical engineering applications, including fluidic control in miniaturized devices, gas-involved chemical reactions, controlled gas exchange, directional gas pumping, etc.

Nearly all the reported micro/nanoscale gas gating mechanisms are confined to the field of microelectromechanical systems (MEMS), which usually involve mechanical moving parts coupled to magnetic, electric, pneumatic, or thermal actuation methods. However, such designs often inevitably introduce dead volume to the system and are challenging to realize while maintaining low leakage rates, which can severely compromise the effectiveness of gas gating. Moreover, MEMS-based gas valves may also suffer from laborious and expensive fabrication, mechanical instability, and high energy consumption, hindering their compatibility with large-scale applications. On the other hand, membrane-based systems for controllable gas transport have only been demonstrated very recently using liquid-infused microporous membranes, where gases can only permeate through the membrane by deforming the pore-filling gating liquid above a specific pressure threshold. Despite being a breakthrough, the liquid-infused membranes are only capable of binary switching (open/closed) instead of continuous permeability adjustment, and the switching requires an appreciable pressure trigger.

Therefore, the development of smart gating membranes with dynamic and reversible control over gas transport behavior is still very much in its infancy, making research effort along this direction critically needed.

Herein, a new strategy was used to continuously and dynamically modulate gas transfer at a gas-liquid interface, based upon reversible electrochemical metal deposition/dissolution (zinc, Zn) on conductive porous membranes.

Figure 5A:
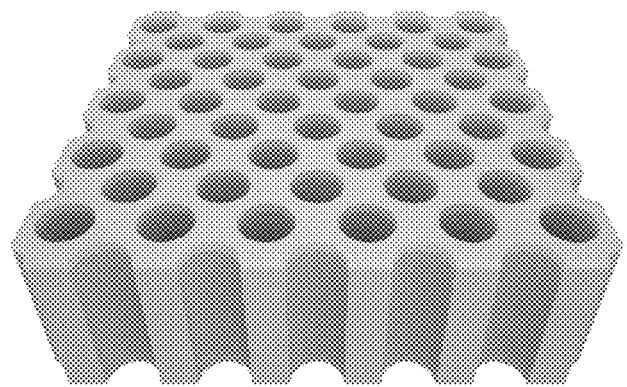
FIG. 5A is a perspective view schematic illustration of a porous medium in an open state, according to certain embodiments.
Figure 5B:
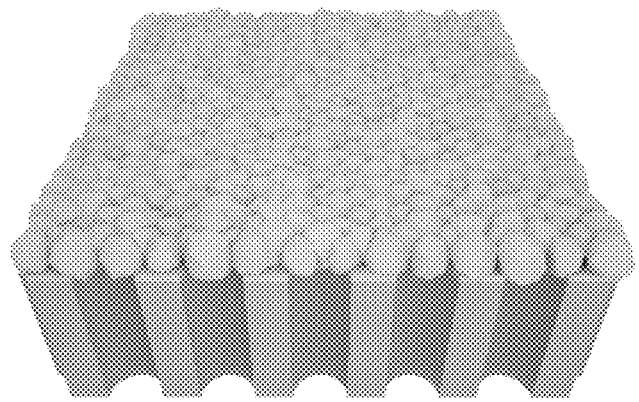
FIG. 5B is a perspective view schematic illustration of a porous medium in a closed state, according to certain embodiments.

The high-porosity, low-tortuosity membrane ensured rapid gas transport at gas-electrolyte interface at open state (FIG. 5A). In the schematic illustration of FIG. 5A, the gating membrane is shown in its open state, where the anodic aluminum oxide membrane with ordered one-directional pores allows for rapid mass transfer at the gas-liquid interface. The top surface of the membrane was rendered electrically conductive via physical deposition of a gold thin film. Through detailed study on the relationship between electrolyte formulation and the electrochemical nucleation behavior, highly reversible cycling of metallic Zn (>99% Coulombic efficiency) was realized with excellent kinetics. As a result, a compact and uniform layer of Zn nanocrystals was formed on the membrane with minimum deposition capacity, affording an effective gas barrier within at most a few minutes (FIG. 5B). In the schematic illustration of FIG. 5B, the gating membrane is shown in its closed state. Electrodeposition of a dense metallic nanocrystal layer on the conductive membrane surface afforded an effective gas barrier to reduce the membrane permeability. By simply adjusting the amount of electrodeposited metal, a continuous-state tuning on gas permeability was achieved, with values spanning over two orders of magnitude. Moreover, this electrochemically-mediated gas gating approach neither involved mechanical moving parts nor introduced any dead volume when switching between open and closed states. Such configurational advantages are particularly desirable in processes such as membrane-based gas absorption, which can offer higher efficiency and easier operation compared to conventional dispersive gas-liquid contactors via obviating the energy-consuming blown-down step between capture and release caused by headspace gas.

Figure 5C:
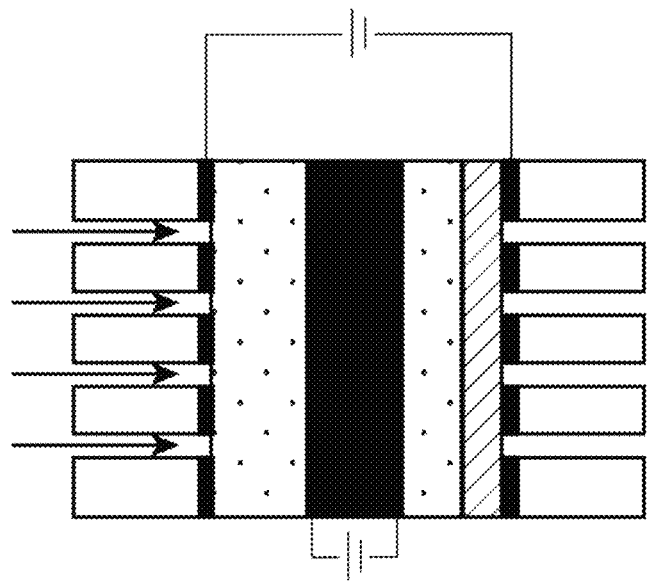
FIG. 5C is, according to certain embodiments, a cross-sectional schematic illustration of a system comprising multiple porous media, in which the left-hand side medium is permeable to a gaseous stream and the right-hand side medium is not permeable to a gaseous stream.
Figure 5D:
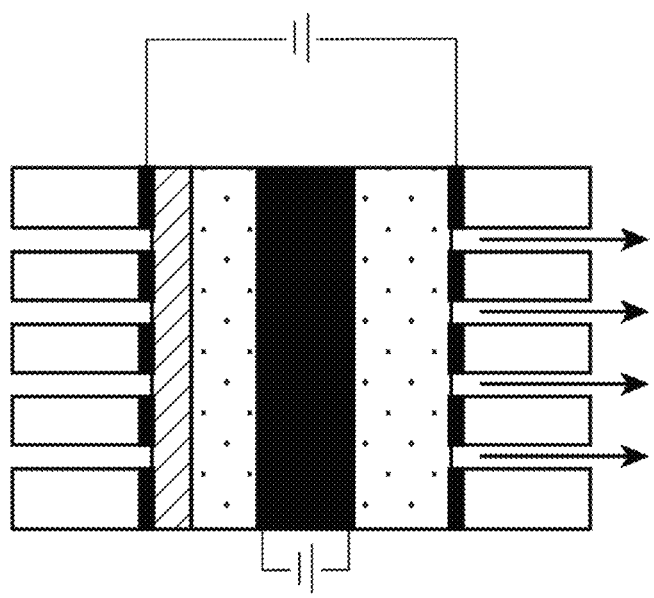
FIG. 5D is, according to certain embodiments, a cross-sectional schematic illustration of a system comprising multiple porous media, in which the left-hand side medium is not permeable to a gaseous stream and the right-hand side medium is permeable to a gaseous stream.

To highlight the versatility of the gating approach, a high-efficiency electrochemical carbon dioxide ($CO_2$) concentrator was demonstrated by sandwiching a redox-active $CO_2$ sorbent electrode between two gating membranes, with the two electrochemical circuits (gating and $CO_2$ capture/release) sharing the same electrolyte. FIGS. 5C-5D show the operational modes of the electrochemically-mediated $CO_2$ concentrator, which is constructed by integrating an electrochemical $CO_2$ capture cell with two gating membranes. In this setup, Zn shuttling between the gating membranes opened one gate while simultaneously closing the other; and quinone-based $CO_2$ carriers, which were immobilized on a conductive porous substrate, were able to reversibly bind/release $CO_2$ at reduced/oxidized form, respectively. The quinone molecules serve as redox-active sorbents for $CO_2$ capture and release, which can form stable $CO_2$ adducts when being reduced and release $CO_2$ when being oxidized. During capture, the system opened toward a dilute feed stream to continuously absorb $CO_2$ by the reduced sorbent, with the product-side gate closed (FIG. 5C). Once the sorbent capacity was reached, the gate polarity switched to close the feed-side gate and open the product-side gate, releasing pure $CO_2$ into the product stream via electrochemical sorbent oxidization (FIG. 5D). Thanks to the gating mechanism, the system could only access one gas stream at a time during operation, which greatly improved the separation efficiency by avoiding cross-talk between feed and product. As a result, the device can directionally pump low-concentration $CO_2$ against a chemical potential gradient to near purity at atmospheric pressure using electricity as the sole driving force, with no upstream compressor or downstream vacuum needed. Integrating multiple such units operating at opposite polarities would allow for an effectively continuous $CO_2$ capture-release process, which can break new ground for niche gas separation applications.

Results and Discussion

Design Rationales of the Electrochemically-Mediated Gas Gating Membrane

A number of important design criteria were considered when designing the electrochemically-mediated gas gating system.

Figure 6A:
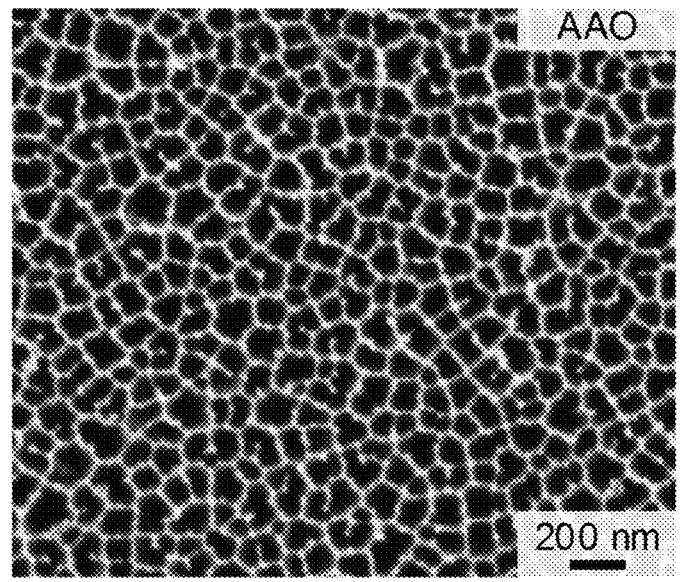
FIG. 6A is, according to some embodiments, a scanning electron microscope (SEM) image of a pristine anodic aluminum oxide (AAO) membrane.
Figure 6B:
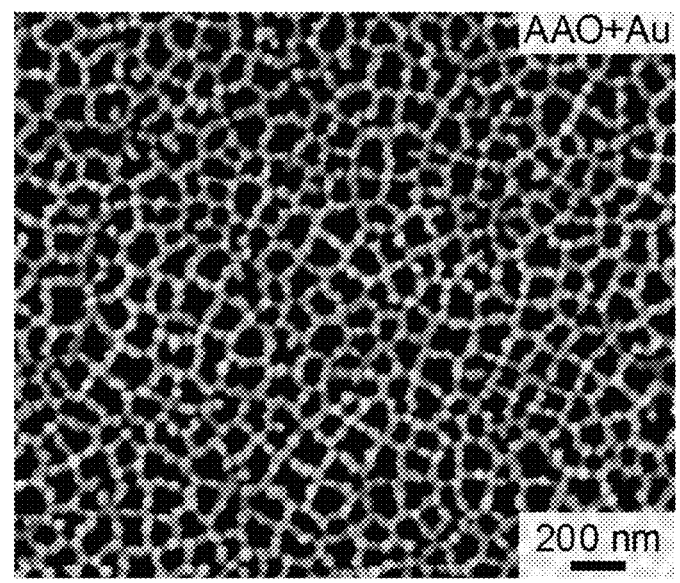
FIG. 6B is, according to certain embodiments, an SEM image of an Au-coated AAO membrane.
Figure 6C:
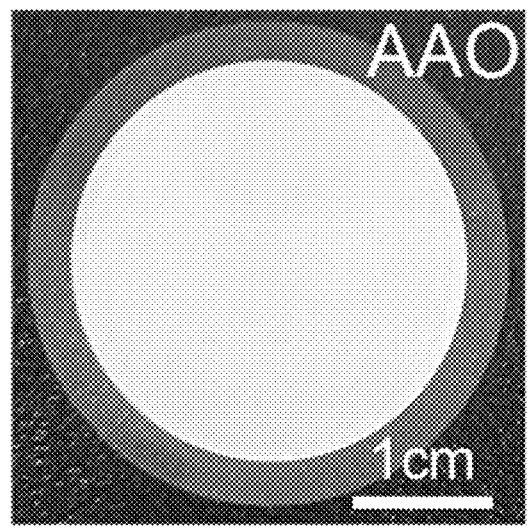
FIG. 6C is, according to some embodiments, a photo image of a pristine anodic aluminum oxide (AAO) membrane.
Figure 6D:
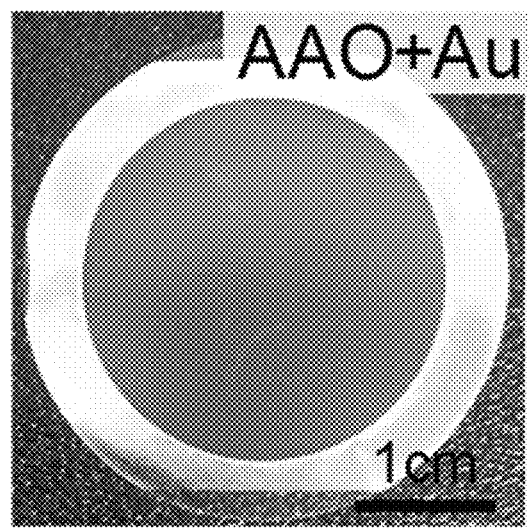
FIG. 6D is, according to certain embodiments, a photo image of an Au-coated AAO membrane.

First, a high-porosity membrane was desirable for rapid gas transport in an open state, yet it was desired to make the pore size small enough to reduce the amount of metal plating needed to achieve full pore blockage. Such material requirements made anodic aluminum oxide (AAO) an ideal candidate, which exhibits well-defined one-directional channels with high pore density, and a narrow pore size distribution of about 100 nm in this case (FIGS. 6A and 6C). A gold (Au) thin film (100 nm) was thermally evaporated on one side of the AAO to render it electrically conductive for gating metal deposition, as shown in the pictures, SEM images, and energy-dispersive X-ray elemental mapping in FIGS. 6B, 6D and 11A-11B. The AAO was peripherally bonded to an annular polypropylene supporting ring for ease of handling.

Figure 12B:
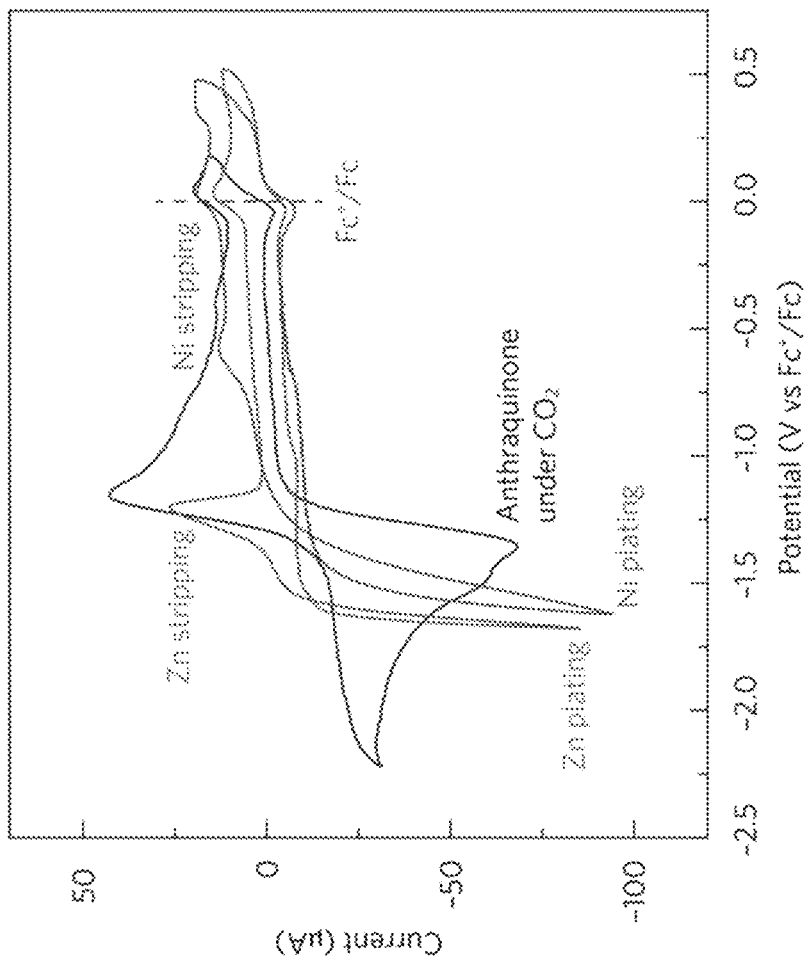
FIG. 12B is, according to certain embodiments, a plot of current as a function of potential for 1.0 M $Zn(NO_3)_2$ in dimethyl sulfoxide, 1.0 M $Ni(NO_3)_2$ in dimethyl sulfoxide, and 5 mM anthraquinone in dimethyl sulfoxide with 0.1 M tetrabutylammonium hexafluorophosphate supporting salt under $CO_2$ atmosphere.
Figure 12A:
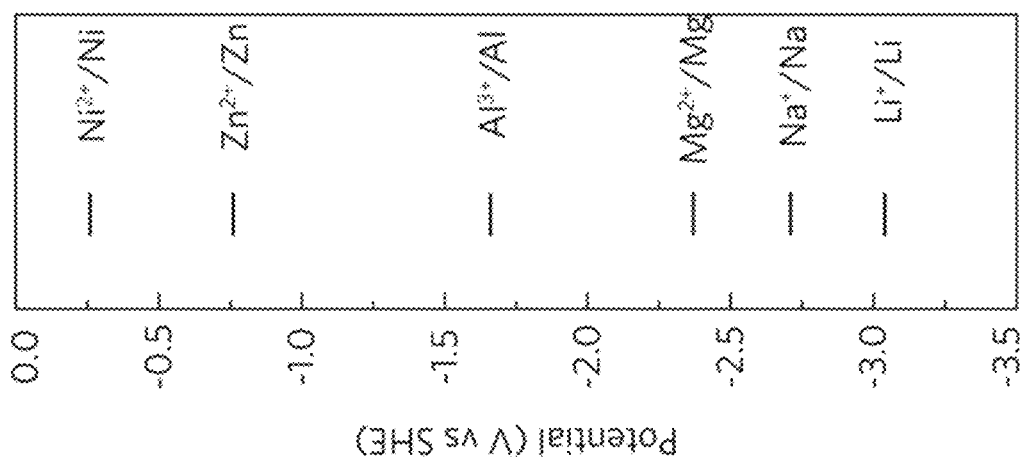
FIG. 12A is, according to some embodiments, a diagram showing standard reduction potentials of common metallic redox pairs.

Second, it was desired to select the gating metallic species such that it would have satisfactory deposition/dissolution kinetics for a fast gating response. FIG. 12A is a diagram showing standard reduction potentials of common metallic redox pairs; and FIG. 12B is a plot of current as a function of potential for 1.0 M $Zn(NO_3)_2$ in dimethyl sulfoxide, 1.0 M $Ni(NO_3)_2$ in dimethyl sulfoxide, and 5 mM anthraquinone in dimethyl sulfoxide with 0.1 M tetrabutylammonium hexafluorophosphate supporting salt under $CO_2$ atmosphere. Redox couples such as $Li^+/Li^0$, $Na^+/Na^0$, $Mg^{2+}/Mg^0$, and $Zn^{2+}/Zn^0$ generally fall into the category of redox couples that have satisfactory deposition/dissolution kinetics for a fast gating response. However, metallic Li, Na and Mg are often plagued with high (electro)chemical reactivity due to their low redox potentials (FIG. 12A), making them difficult for use with many practical gaseous environments. Also, $Ni^{2+}/Ni^0$ generally showed poor electrochemical kinetics, as manifested from the large potential difference between plating and stripping. On the other hand, Zn is uniquely positioned for gas gating applications with advantageous features of good air stability, low cost, and environmental benignity.

Figure 6E:
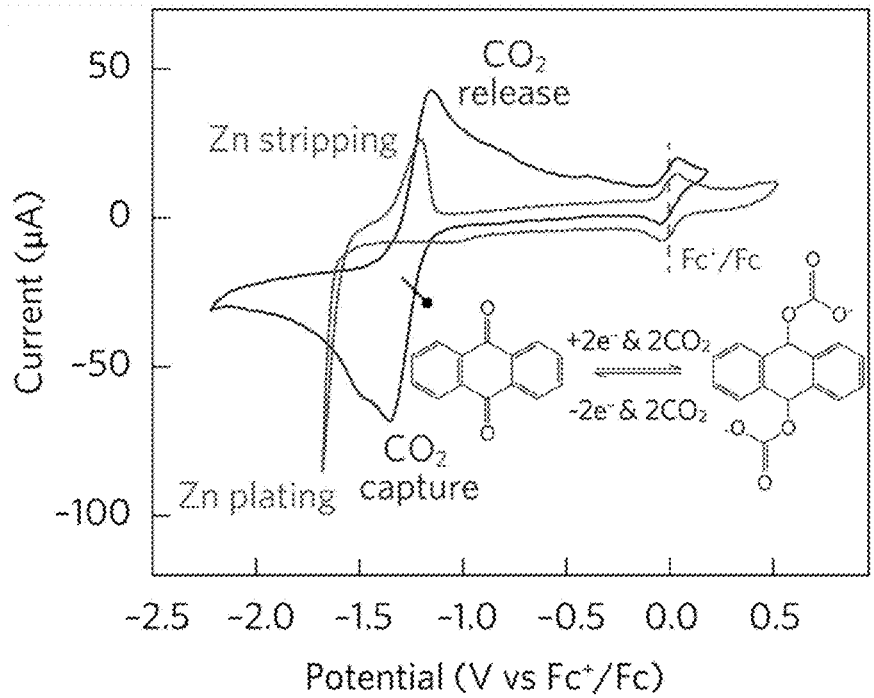
FIG. 6E is a plot, according to some embodiments, of current as a function of voltage.

Generally, when the gating membrane is coupled with another electrochemical process (for species capture) sharing the same electrolyte, the redox potential of the other electrochemical process (e.g., species capture) should be more positive than $Zn^{2+}/Zn^0$ to avoid being interfered with by the presence of $Zn^{2+}$ in the electrolyte. This was true for the quinone-based $CO_2$ capture/release process demonstrated in this study, as can be seen from the cyclic voltammetry (CV) in FIG. 6E. In this study, 1.0 M $Zn(NO_3)_2$ in dimethyl sulfoxide and 5 mM anthraquinone in dimethyl sulfoxide with 0.1 M tetrabutylammonium hexafluorophosphate supporting salt were tested under $CO_2$ atmosphere. Glassy carbon (Ø3 mm) was used as the working electrode, Pt wire was used as the counter electrode, Ag wire was used as a pseudo-reference electrode, and 1 mM ferrocene (Fc) was used as an internal reference. The scan rate was 50 mV/s. The inset of FIG. 6E shows the reversible reaction between anthraquinone and $CO_2$. This study showed that the Zn deposition potential was appreciably lower than the reduction potential of anthraquinone under a $CO_2$ atmosphere. In fact, the redox potential of $Zn^{2+}/Zn^0$ falls more negative than most practically-relevant gas-involved electrochemical processes, such as electrochemically-mediated gas capture and organic electrosynthesis, rendering this gas gating membrane mechanism widely applicable.

Third, homogeneous electrodeposition with high reversibility is another desirable property for effective gas gating. Aqueous Zn chemistry commonly employed in battery research unfortunately suffers from low efficiency (<50% in typical alkaline solution) and dendritic deposition morphology, since metallic Zn is thermodynamically unstable in water. Therefore, a non-aqueous electrolyte was selected for use, which has rarely been studied in literature.

Figure 6F:
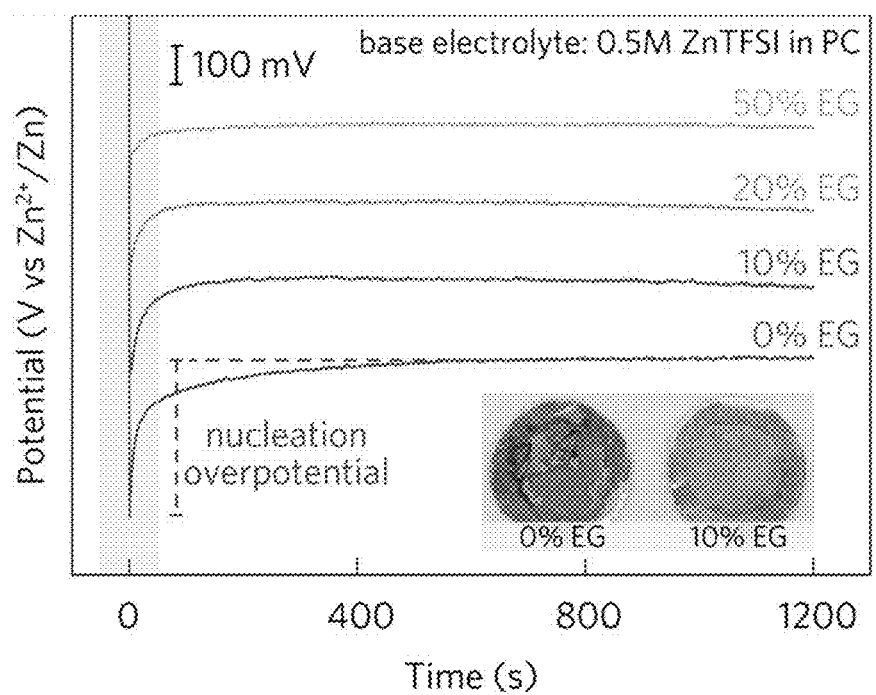
FIG. 6F is, according to some embodiments, a plot of potential as a function of time.
Figure 13A:
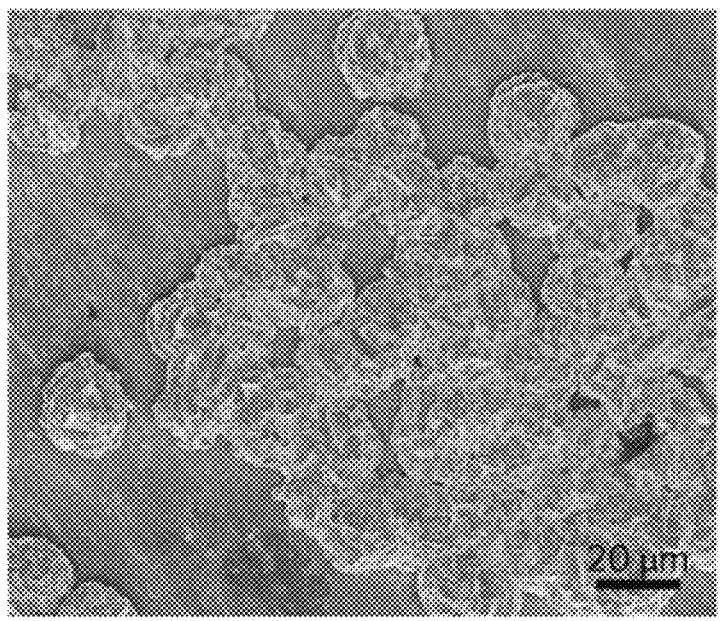
FIGS. 13A-13C are, according to certain embodiments, SEM images of Zn deposition morphology on an Au-coated aluminum foil.
Figure 13B:
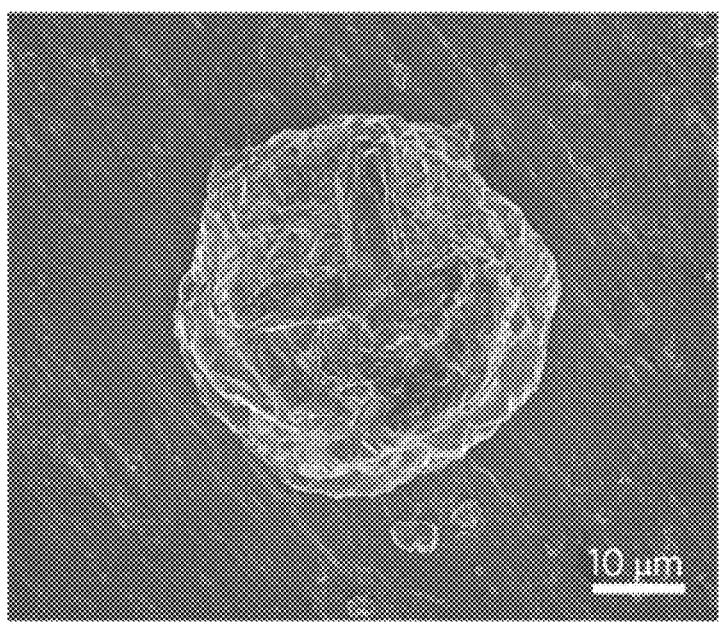
Figure 13C:
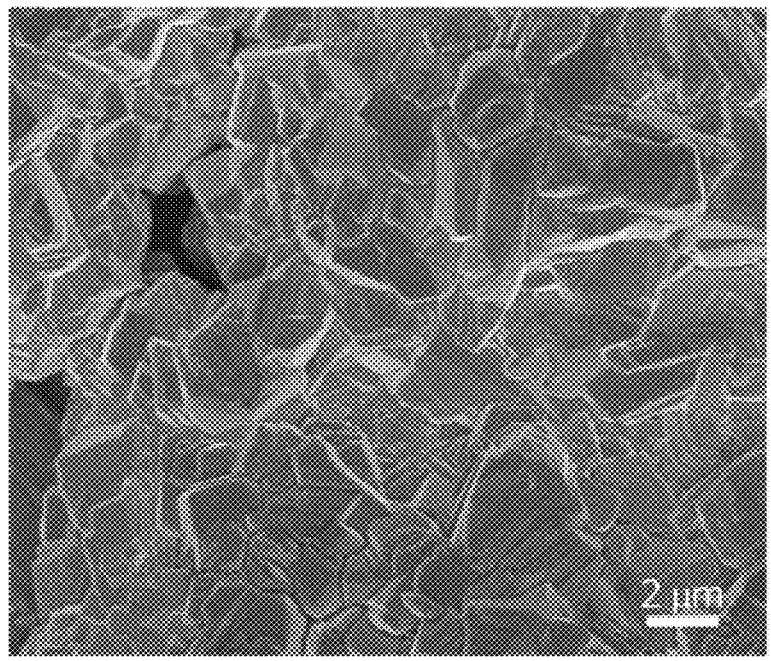
Figure 14:
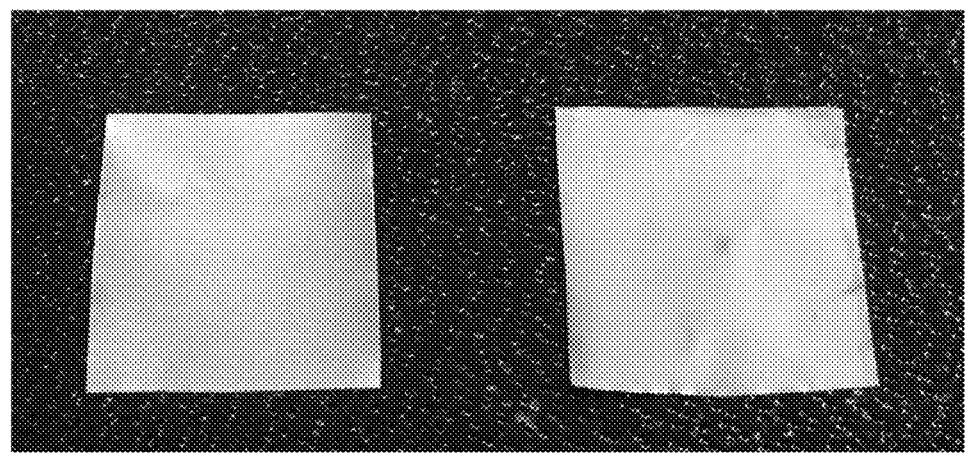
FIG. 14 is, according to certain embodiments, a photo image showing a pristine copper foil (left) and the copper foil after Zn deposition using aqueous electrolyte (right)

In this study, propylene carbonate (PC) was selected as the electrolyte solvent due to its wide electrochemical stability window and low vapor pressure. The Zn plating morphology was first studied on Au-coated aluminum foil (Au film was 100 nm thick) using 0.5 M zinc bis(trifluoromethanesulfonyl)imide (ZnTFSI) in PC. The deposition was carried out at a current density of 2 mA $cm^{-2}$ for 30 min. However, as seen from the scanning electron microscopy (SEM) images, Zn grew into large aggregates that only sparsely covered the substrate (FIGS. 13A-13C), which stood in stark contrast to the continuous thin film obtained in aqueous electrolyte, as shown in FIG. 14, where pristine copper foil is shown on the left, and the copper foil after Zn deposition using aqueous electrolyte is shown on the right. The deposition was carried out in 1.0 M aqueous solution of $ZnSO_4$ at a current density of 2 mA $cm^{-2}$ for 15 min. Such highly localized deposition behavior might be attributed to the relatively large interfacial energy between metallic Zn and PC. According to the classical nucleation theory, the Gibbs energy for nucleation is the sum of the bulk and the surface free energy. High interfacial energy would therefore result in low nucleation density and aggregated deposition morphology to minimize the surface area. This hypothesis was corroborated by the large nucleation overpotential observed for Zn deposition in PC electrolyte, which is defined as the magnitude of the voltage spike at the onset of galvanostatic deposition (FIG. 6F). It was found that ethylene glycol (EG) could be employed as an electrolyte additive to effectively reduce the interfacial energy. In this study, Zn was deposited on Au-coated aluminum foil in 0.5 M ZnTFSI PC electrolyte with different amounts of EG additive. The deposition was carried out at a current density of 0.5 mA $cm^{-2}$, and slurry-coated Zn powder was used as the counter electrode to minimize the polarization contribution from the counter electrode. For better visual comparison, the profiles were shifted vertically. The inset of FIG. 6F shows the photo image of deposition without EG and with 10% EG as additive. This study showed that the nucleation overpotential decreased continuously with increasing amount of EG, and the addition of merely 10 vol % EG resulted in the formation of a highly uniform Zn film (FIG. 6F).

Figure 6G:
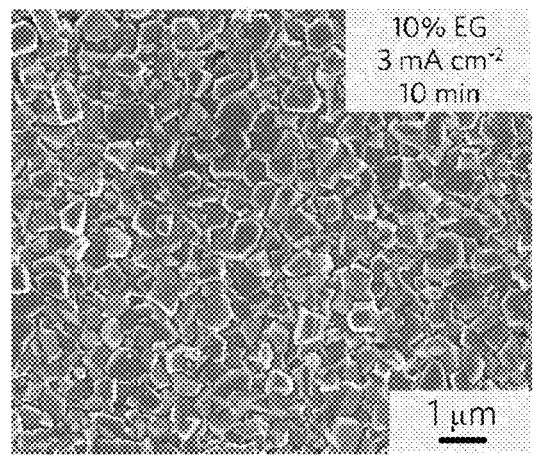
FIG. 6G is, according to certain embodiments, a top view image of Zn deposited on an AAO membrane.
Figure 6H:
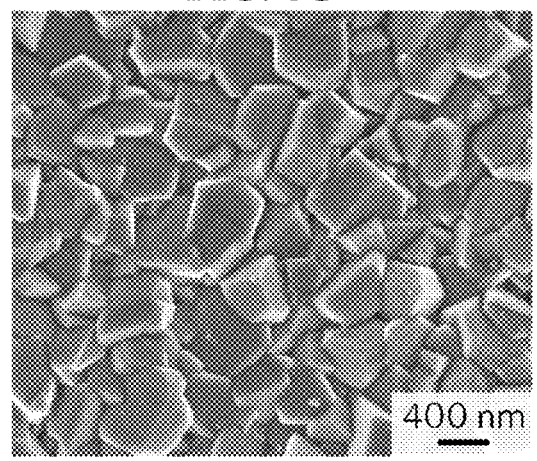
FIG. 6H is, according to some embodiments, a top view image of Zn deposited on an AAO membrane.
Figure 6I:
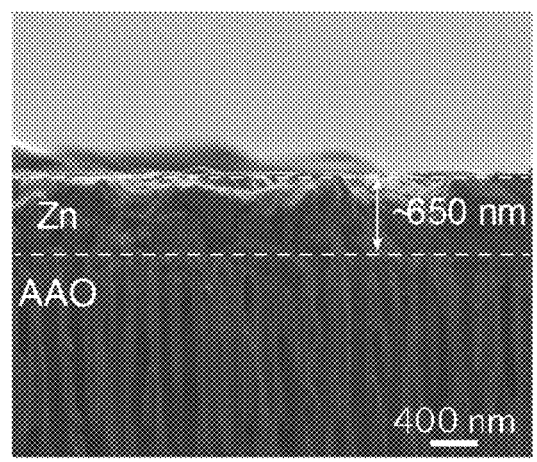
FIG. 6I is, according to certain embodiments, a side view image of Zn deposited on an AAO membrane.
Figure 15A:
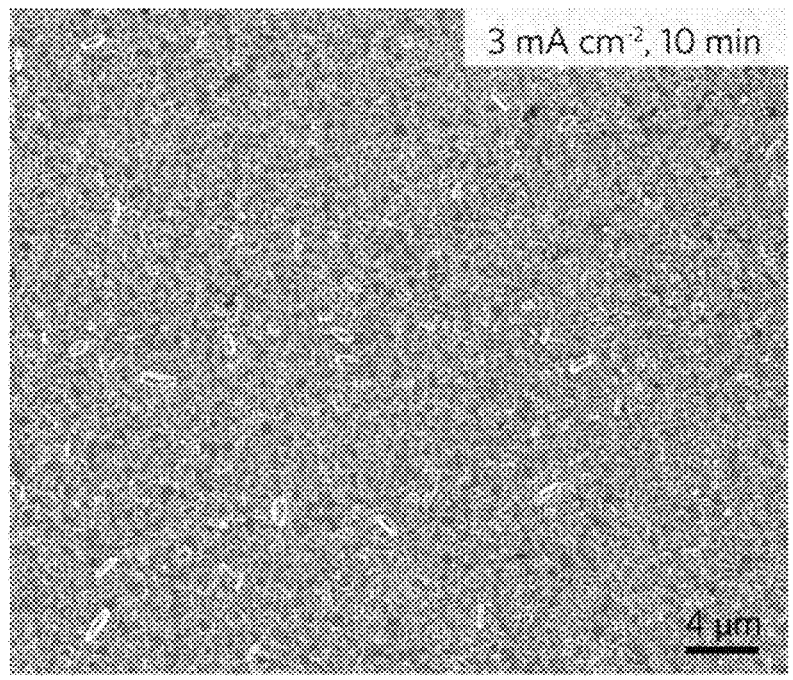
FIGS. 15A-15B are, according to some embodiments, low-magnification SEM images of Zn deposition on an Au-coated AAO membrane.
Figure 15B:
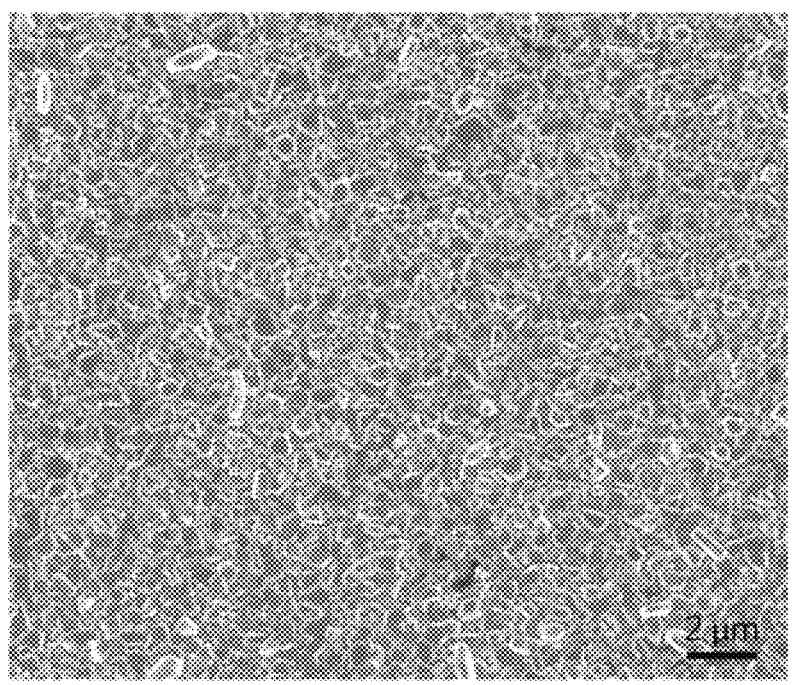
Figure 16A:
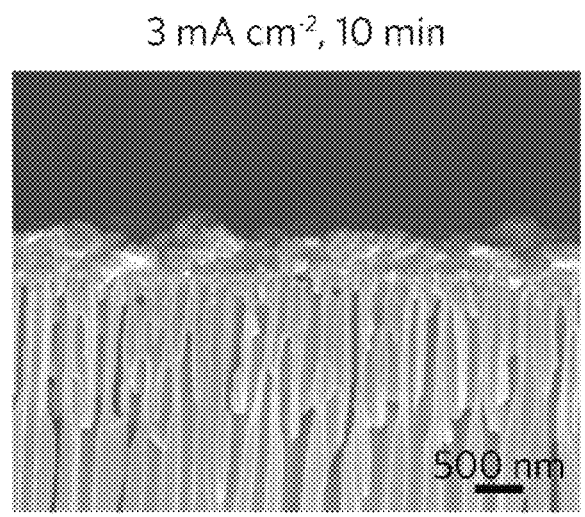
FIG. 16A is, according to certain embodiments, an SEM image of Zn deposited on Au-coated AAO membrane.
Figure 16B:
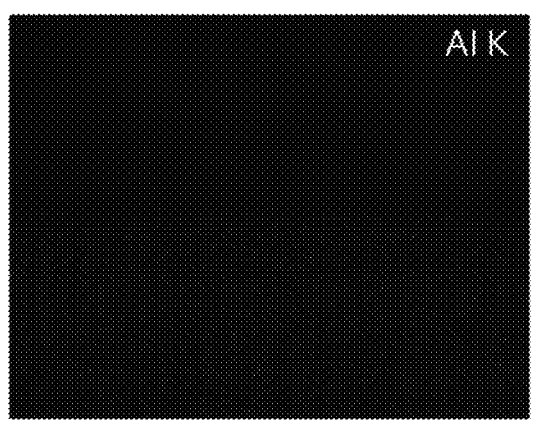
FIGS. 16B-16E are, according to certain embodiments, energy-dispersive X-ray elemental mappings of the Zn deposited Au-coated AAO membrane shown in FIG. 16A.
Figure 16C:
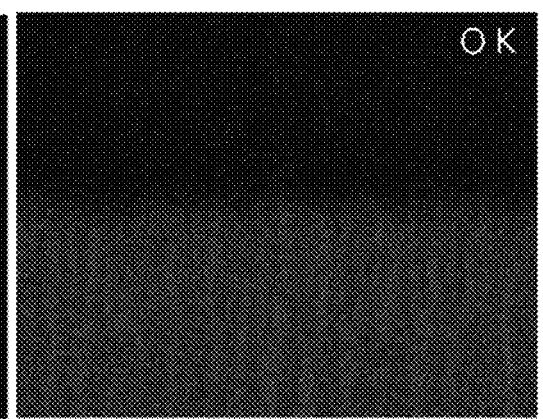
Figure 16D:
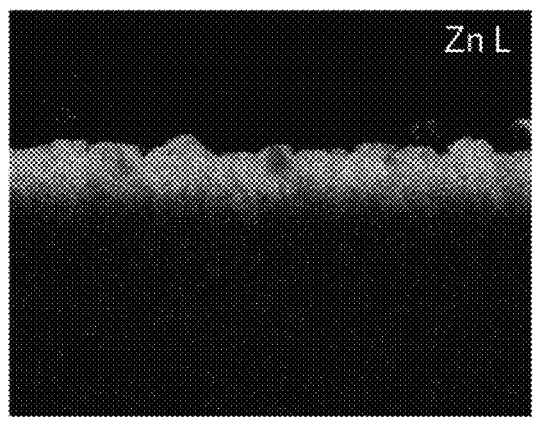
Figure 16E:
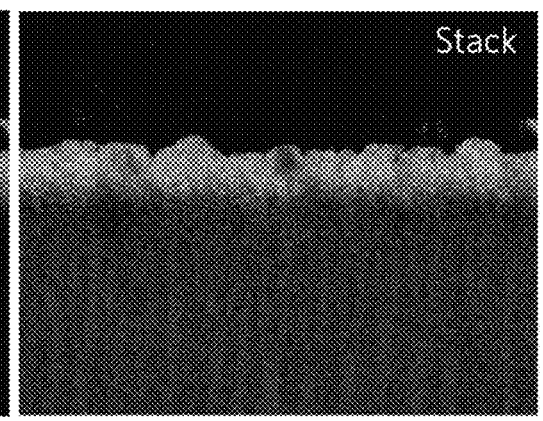
Figure 17A:
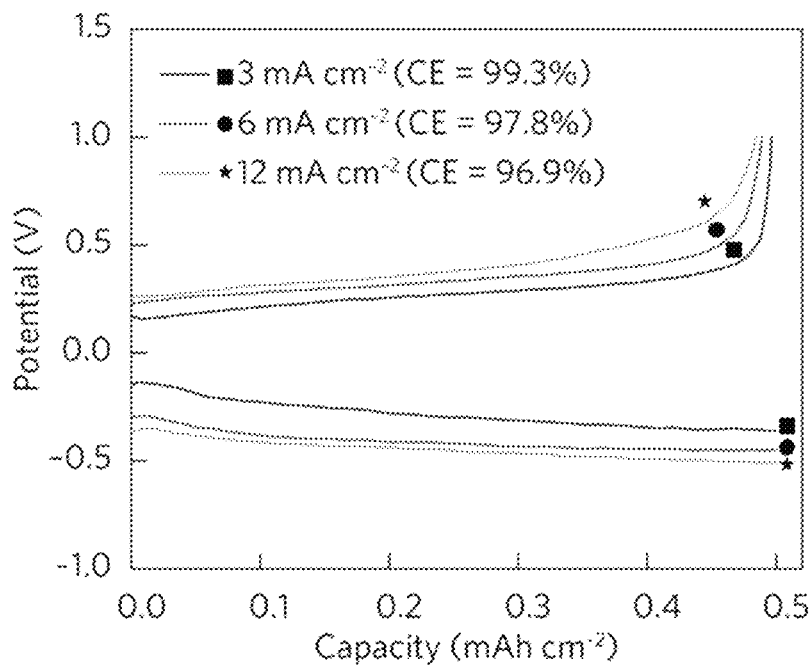
FIG. 17A is, according to certain embodiments, a plot showing Zn deposition/dissolution voltage profiles at different current densities and the corresponding CE.
Figure 17B:
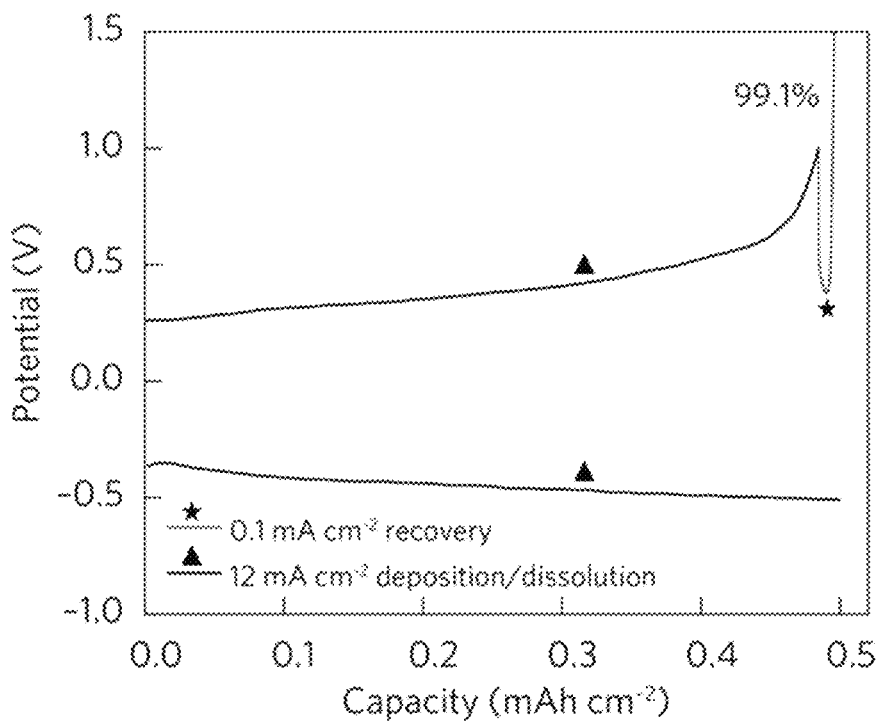
FIG. 17B is, according to certain embodiments, a plot showing a voltage profile of Zn deposition/dissolution at a current density of 12 mA cm$^{-2}$, followed by a low-current dissolution step.
Figure 18A:
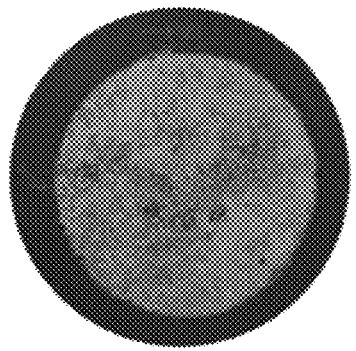
FIGS. 18A-18C are, according to some embodiments, photo images of Zn deposited on AAO membranes at different deposition capacities.
Figure 18B:
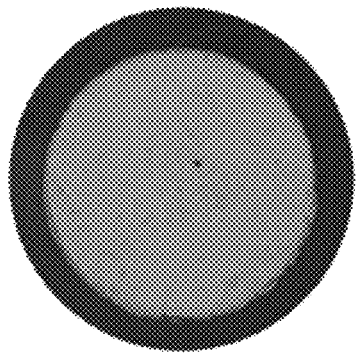
Figure 18C:
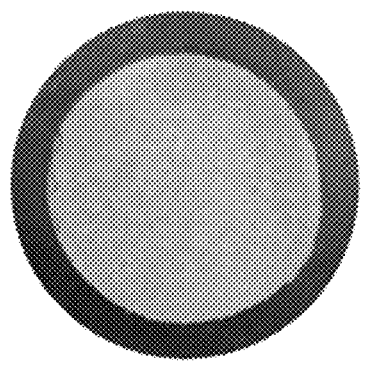
Figure 18D:
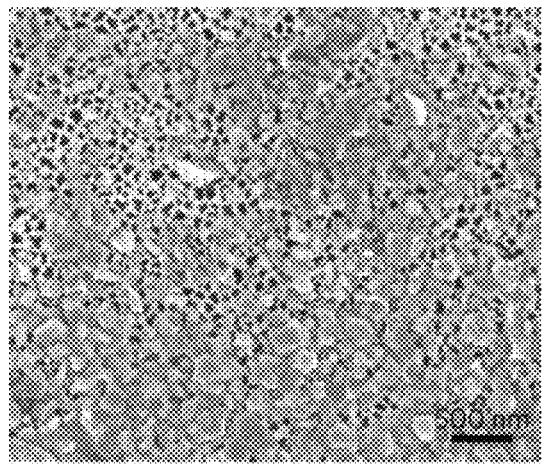
FIGS. 18D-18F are, according to certain embodiments, SEM images of the Zn deposited on AAO membranes from FIGS. 18A-18C.
Figure 18E:
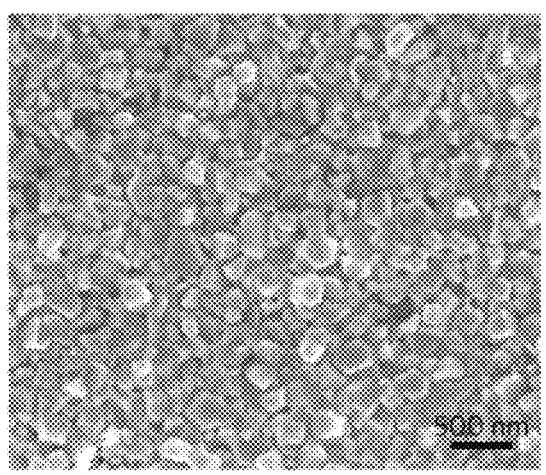
Figure 18F:
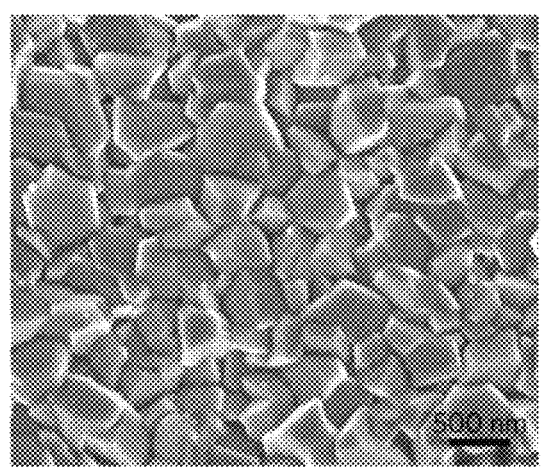

FIGS. 6G-6H show top-view SEM images of Zn deposits on an AAO membrane obtained in a 0.5 M ZnTFSI PC electrolyte with 10% EG additive at a high current density of 3 mA $cm^{-2}$ for 10 minutes. A compact Zn film consisting of uniform, crystalline Zn polyhedrons was observed, and the homogeneity persisted over the whole deposition area (FIGS. 15A-15B). Side-view SEM images and the corresponding energy-dispersive X-ray elemental mappings of Zn deposition on Au-coated AAO membrane indicated a tight coverage of Zn film on the surface of AAO (FIG. 6I and FIGS. 16A-16E). The thickness of the film at a deposition capacity of 0.5 mAh $cm^{-2}$ was around 650 nm, which agreed exceptionally well with the theoretical value of a dense Zn layer (655 nm). Such deposition morphology was highly desirable for effective gas gating. The Zn cycling Coulombic efficiency (CE), which is defined as the ratio between dissolution and deposition capacity, is also important for reversible gas gating. Unprecedented CE can be achieved using this PC-based electrolyte, with the value measured to be 99.3% at a high cycling current of 3 mA $cm^{-2}$ (FIGS. 17A-17B). The slightly reduced CE at even higher currents was mainly attributed to the early hitting of the cut-off potential rather than side reactions. Therefore, a low-current dissolution step following extremely high-current cycling (12 mA $cm^{-2}$) still effectively recovered >99% of the deposited Zn, which indicated that Zn cycling in the electrolyte system was mainly limited by kinetics, not side reactions (FIGS. 17A-17B). The depositions were carried out in 0.5 M ZnTFSI PC electrolyte with 10% EG additive at a capacity of 0.5 mAh $cm^{-2}$.

Ex Situ Testing of the Electrochemically-Mediated Gating Membrane

One advantage of the electrochemically-mediated gating mechanism is its ability to modulate the membrane permeability continuously. A denser Zn film and more complete pore coverage was observed on an AAO membrane with increasing deposition capacity, which in turn resulted in decreasing permeability (FIGS. 18A-18F). To verify the capability of continuous-state tuning, membranes with different amount of Zn deposited were first evaluated ex situ in both liquid and gas phase.

Figure 19A:
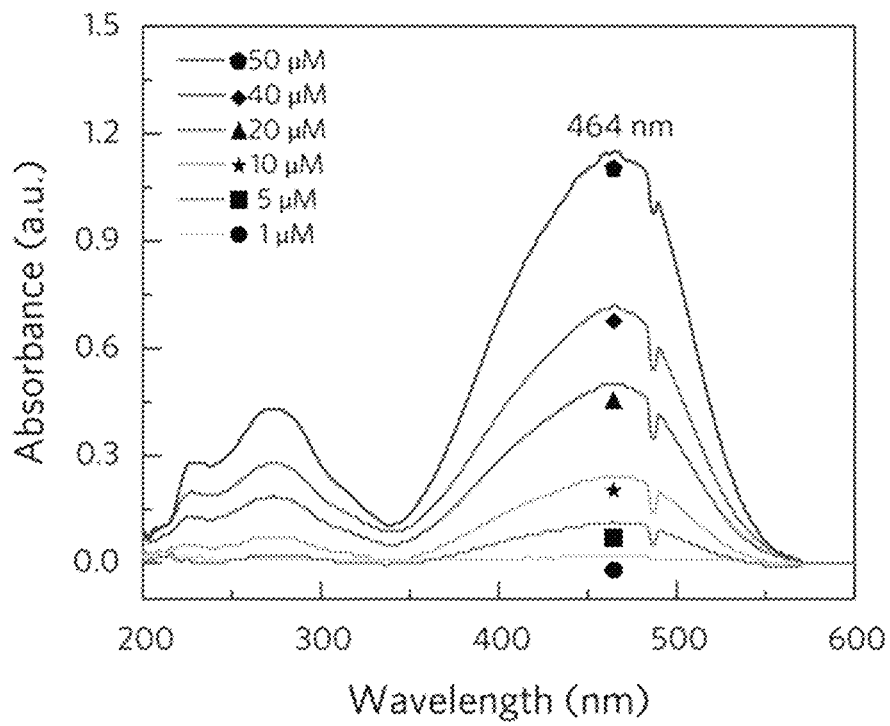
FIG. 19A is, according to certain embodiments, a plot of UV-Vis spectra of aqueous solutions of methyl orange at different concentrations.
Figure 19B:
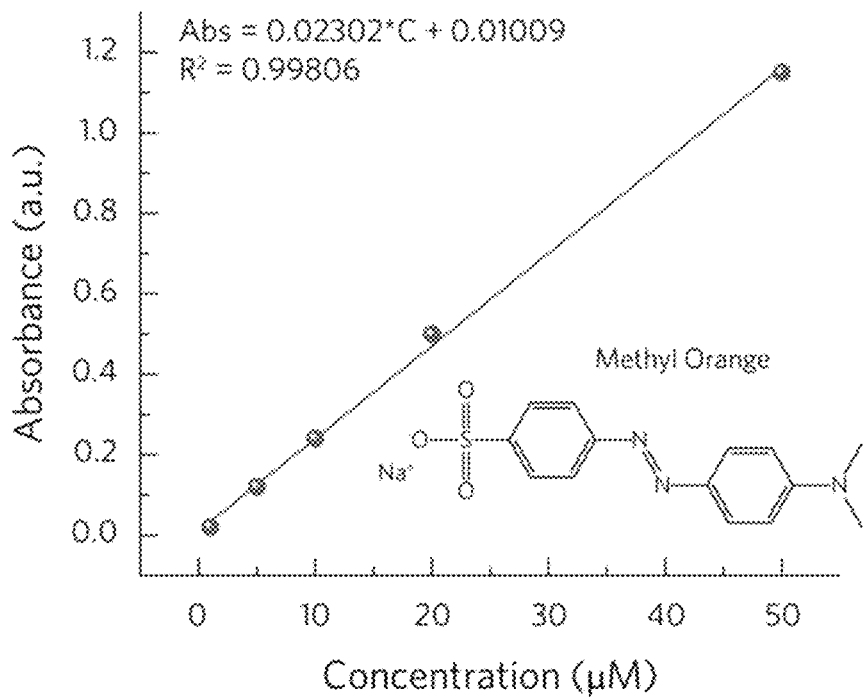
FIG. 19B is, according to some embodiments, a concentration calibration curve based on absorbance at 464 nm.

Liquid-phase diffusion experiments were conducted in an H-cell configuration using methyl orange dye as a tracker. 1 mM methyl orange and pure water were separated by the membranes, and aliquots were taken from the permeate chamber to determine the cross-over concentration via UV-vis spectroscopy (FIGS. 19A-19B). The corresponding calibration curve shown in FIG. 19B was based on the absorbance at 464 nm.

Figure 7A:
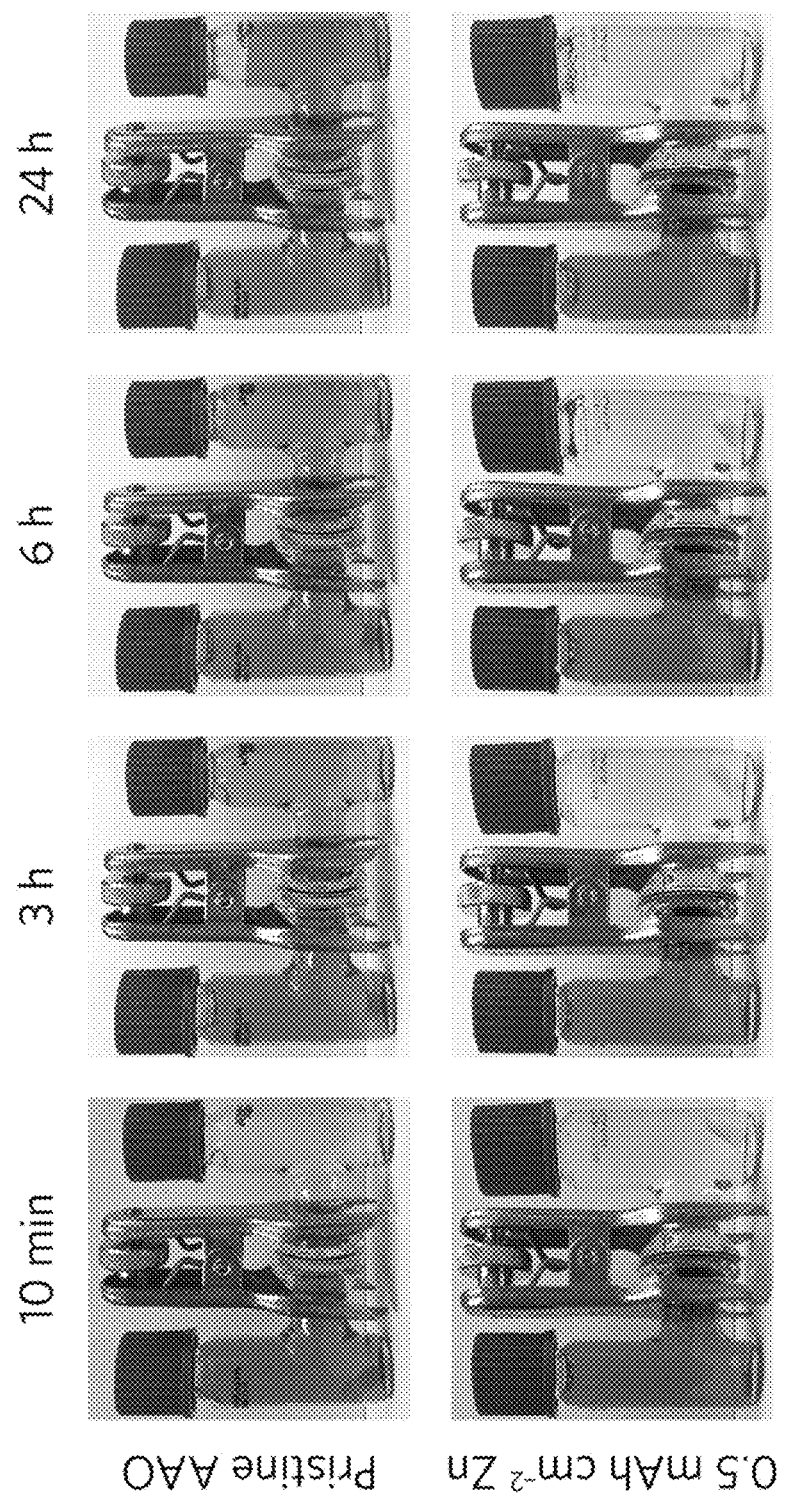
FIG. 7A is, according to certain embodiments, a set of photo images showing liquid-state diffusion tests at different time points for pristine AAO and 0.5 mAh cm$^{-2}$ Zn gated AAO.
Figure 7B:
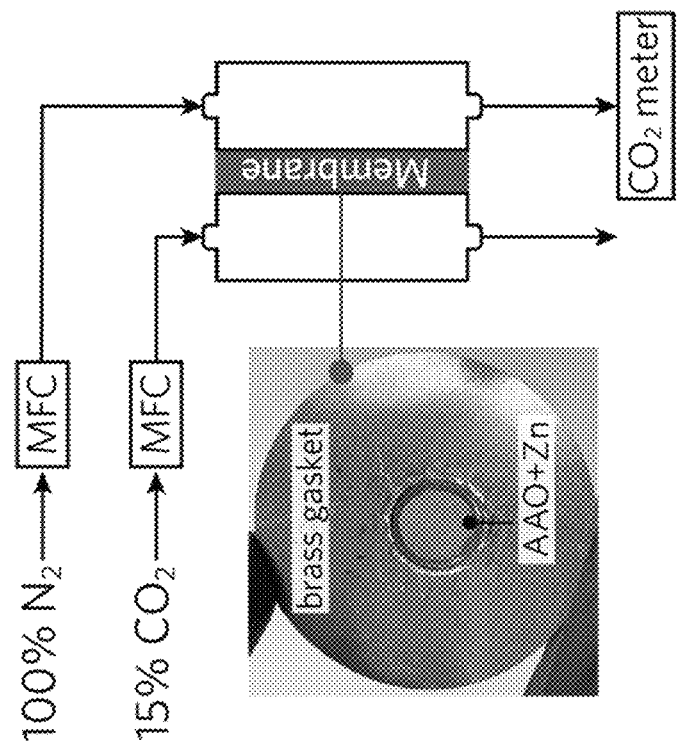
FIG. 7B shows, according to some embodiments, crossover dye concentration in a permeate chamber as a function of time for pristine AAO, and AAO gated with 0.1, 0.3, and 0.5 mAh cm$^{-2}$ Zn.
Figure 7C:
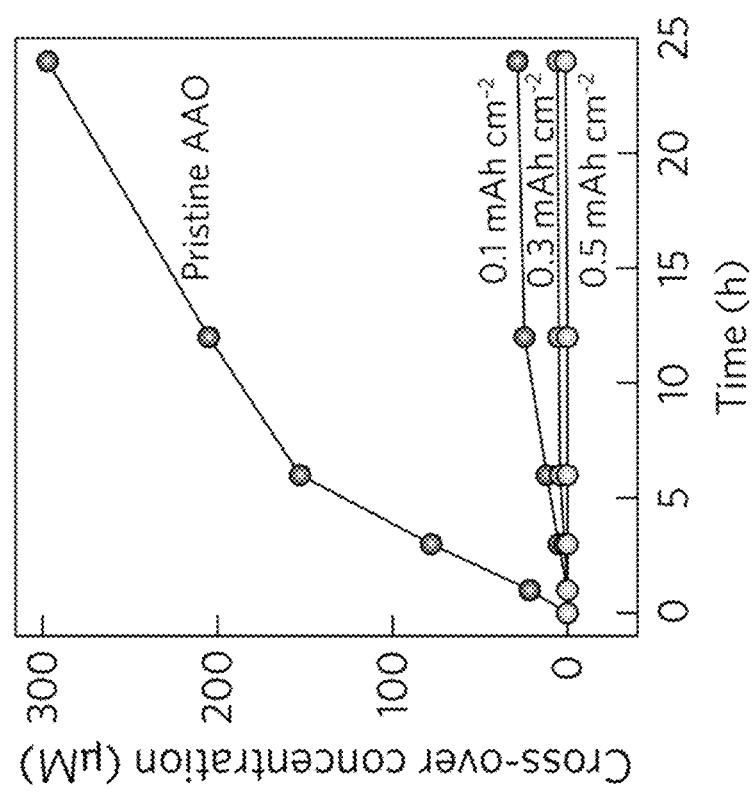
FIG. 7C is, according to certain embodiments, a schematic illustrating a setup for ex situ gas-phase testing of an electrochemically-mediated gating membrane.

FIG. 7A is a set of photo images showing the liquid-state diffusion tests at different time points for pristine AAO and 0.5 mAh $cm^{-2}$ Zn gated AAO, and FIG. 7B shows the cross-over dye concentration in the permeate chamber as a function of time for pristine AAO, and AAO gated with 0.1, 0.3, and 0.5 mAh $cm^{-2}$ Zn. FIG. 7C is a schematic illustrating the setup for ex situ gas-phase testing of the electrochemically-mediated gating membrane. Membranes with different amount of Zn deposited were mounted on brass gaskets, and the concentration of $CO_2$ permeated through the membranes was determined using in-line $CO_2$ detector.

Figure 20:
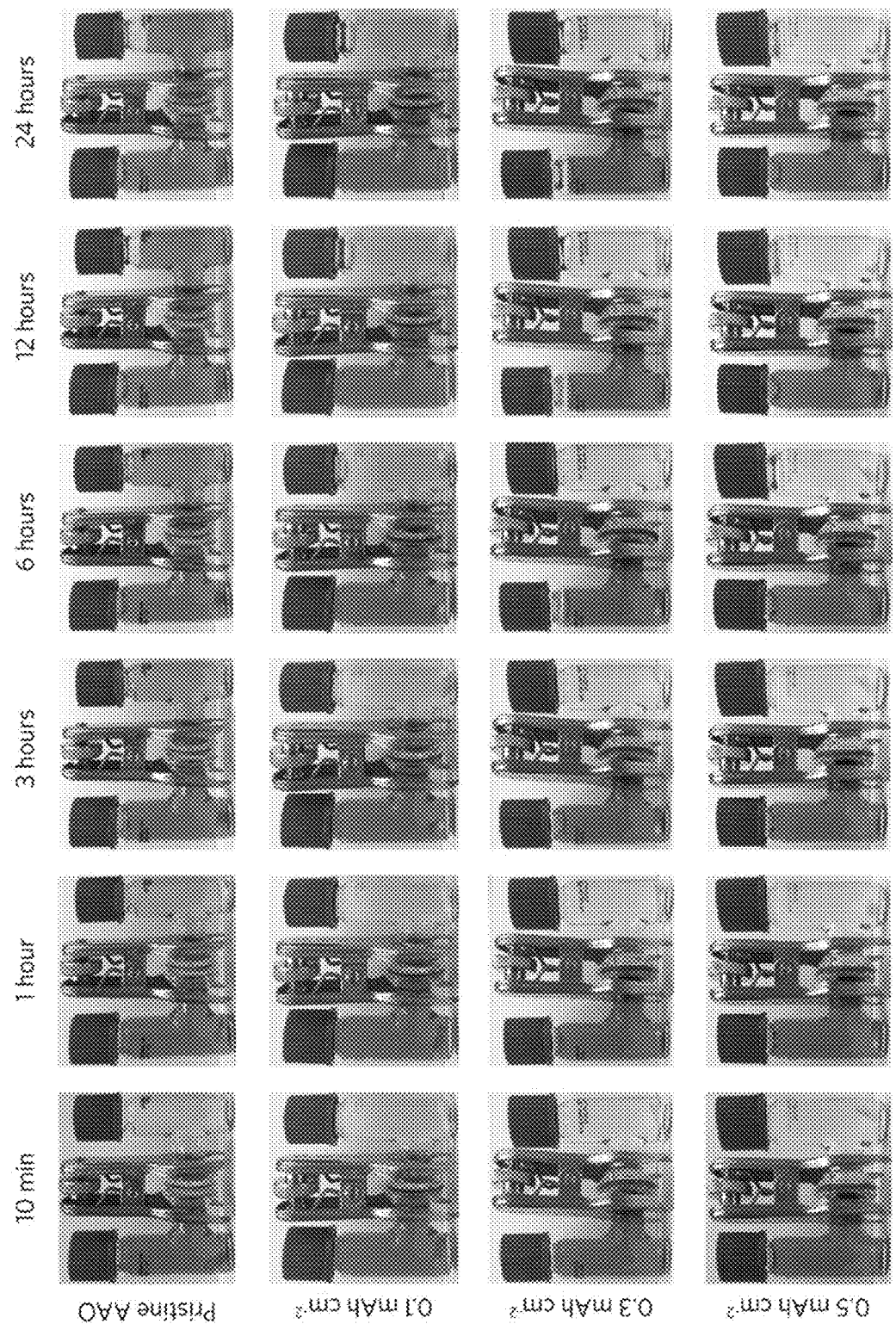
FIG. 20 is, according to certain embodiments, a set of photo images showing liquid-state diffusion tests at different time points.

As can be clearly seen from FIG. 7A and FIG. 20, the dye rapidly diffused through the membrane at open state (pristine AAO), while the cross-over rate decreased gradually with increasing Zn capacity until color change was barely visible over 24 hours for 0.5 mAh $cm^{-2}$ Zn gated membrane. Quantitatively, the cross-over concentration after 24 hours was 297 µM for pristine AAO, but was 28.7, 5.6, and 1.1 µM for 0.1, 0.3 and 0.5 mAh $cm^{-2}$ Zn gated AAO, respectively (FIG. 7B). Thus, even a low deposition capacity of 0.1 mAh $cm^{-2}$ (2 min deposition at 3 mA $cm^{-2}$ current) could already slow down the dye molecule diffusion by an order of magnitude, and 0.5 mAh $cm^{-2}$ Zn effectively afforded a 300× reduction in membrane permeability.

Figure 7D:
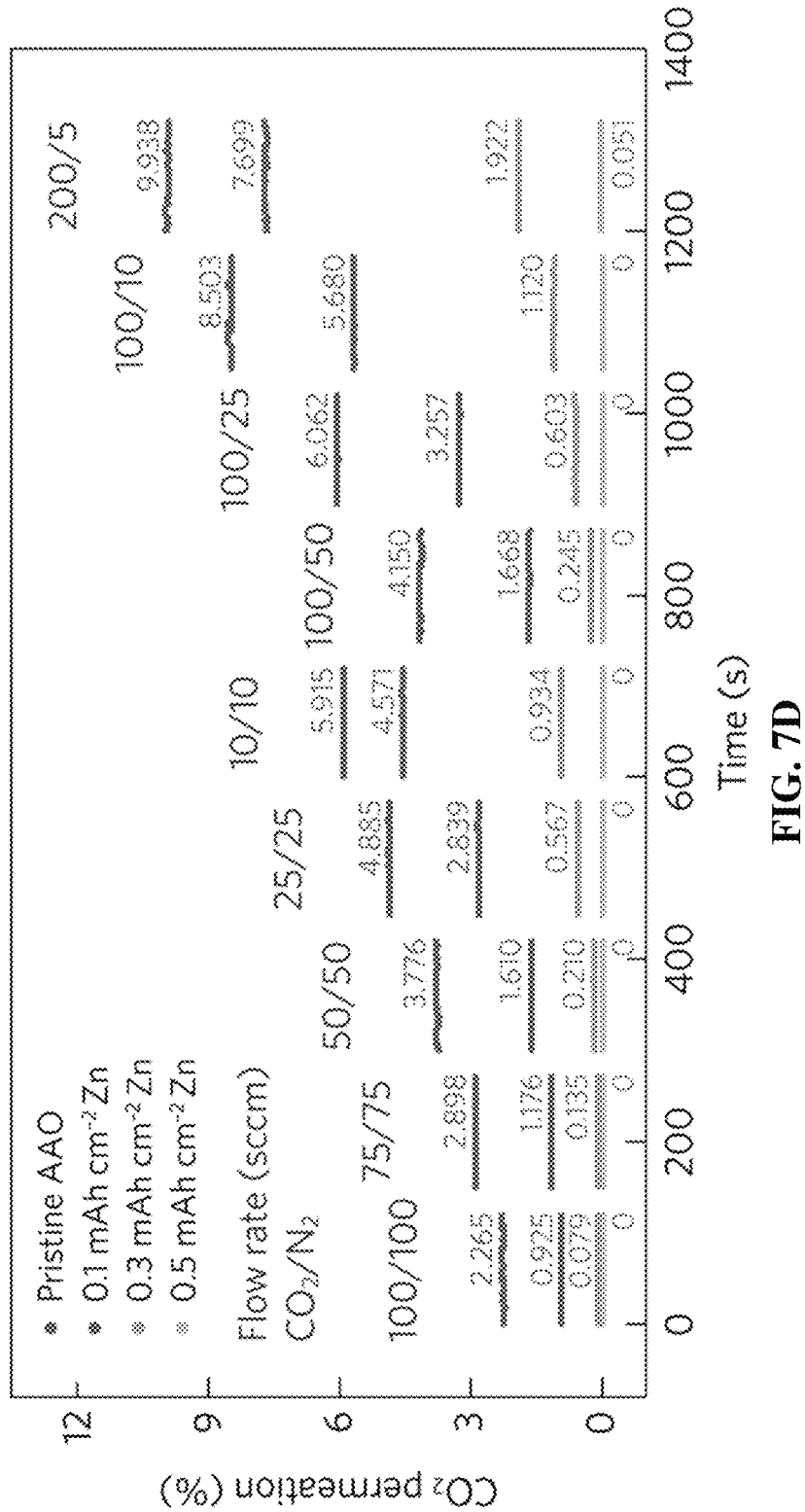
FIG. 7D is, according to some embodiments, a plot showing $CO_2$ concentrations in an $N_2$ sweep stream under different gas flow conditions.
Figure 22A:
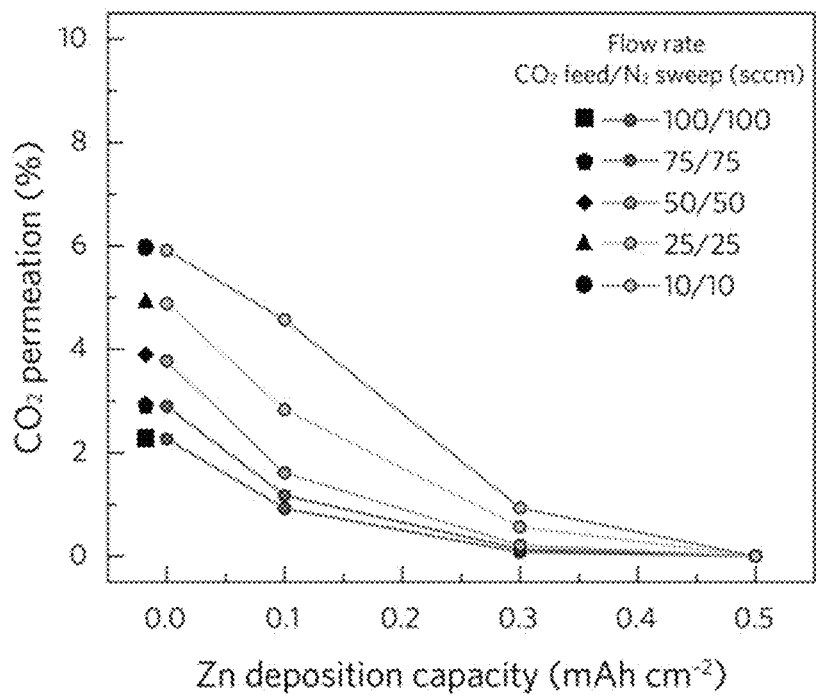
FIG. 22A is, according to some embodiments, a plot of $CO_2$ permeation as a function of Zn deposition capacity during ex situ gas phase testing when a 15% $CO_2$ feed stream and an $N_2$ sweep stream were under the same flow rates.
Figure 22B:
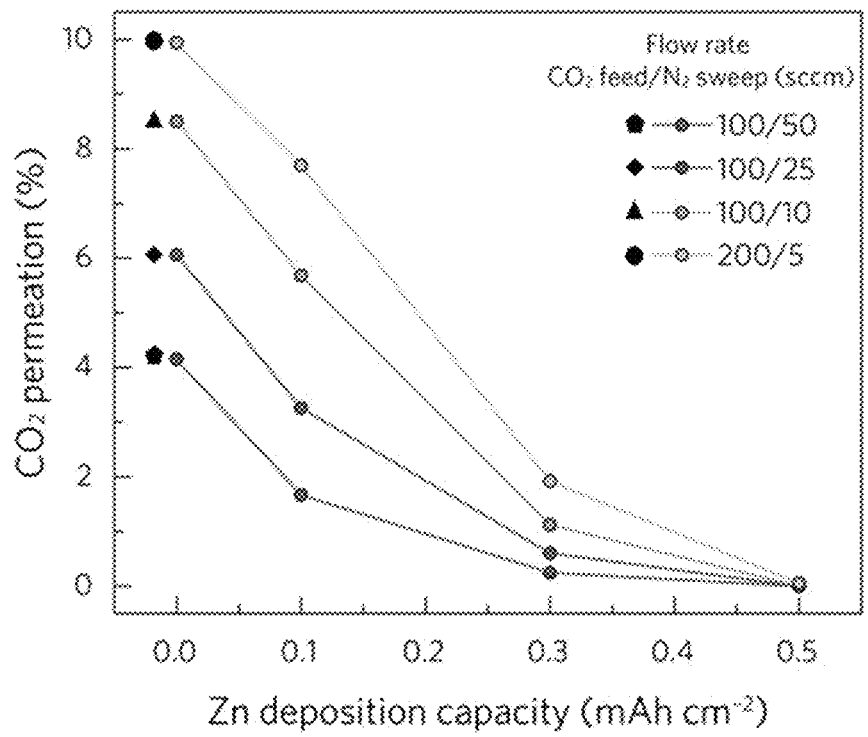
FIG. 22B is, according to certain embodiments, a plot of $CO_2$ permeation as a function of Zn deposition capacity during ex situ gas phase testing when a 15% $CO_2$ feed stream and an $N_2$ sweep stream were under different flow rates.

Gas-phase gating, which is more demanding on the compactness of the gating metal layer, was also studied ex situ using $CO_2$ permeation as an example. In this experimental setup, 15% $CO_2$ (balance $N_2$) was passed via a mass flow controller (MFC) over one side of the membrane, which contained different amounts of deposited Zn, and the permeated $CO_2$ was swept by pure $N_2$ towards an in-line gas analyzer to accurately determine the concentrations (FIG. 7C). Detailed configuration of the gas cell is provided as FIGS. 21A-21C. FIG. 21A shows the configuration of the gas cell device used in all of the gas-phase experiments in this study. The exact setup of the active membrane components differed in different experiments, with information given separately. The brass sample holder disc for gating membrane mounting is shown in the schematic. FIG. 21B shows the dimensions of the gas flow chamber, and FIG. 21C an image of the gas cell device. The permeation flux for all membranes increased with increasing flow rate difference between $CO_2$ feed stream and $N_2$ sweep stream, which corresponded to a higher transmembrane pressure (FIG. 7D and FIGS. 22A-22B). In these ex situ experiments, the gas flow conditions were tested for pristine AAO, and AAO gated with 0.1, 0.3, and 0.5 mAh $cm^{-2}$ Zn. FIG. 22A shows the testing when the 15% $CO_2$ feed stream and $N_2$ sweep stream were under the same flow rates, and FIG. 22B shows the testing when they were under different flow rates. The flow rates of the 15% $CO_2$ (balance $N_2$) feed stream and the $N_2$ sweep stream are indicated in the plot in FIG. 7D (sccm=standard cubic centimeters per minute). Consistent with liquid-phase experiments, the gas permeability of the membrane also decreased continuously with increasing Zn capacity under all the flow conditions tested. No $CO_2$ permeation was detected for 0.5 mAh $cm^{-2}$ Zn gated AAO unless subjected to an extreme transmembrane pressure (200 sccm feed and 5 sccm sweep), which also translated into a two orders of magnitude reduction in gas permeability compared to open-state membrane.

The success of the above ex situ experiments in both liquid and gas phase strongly demonstrated the effectiveness and wide tunability of this electrochemically-mediated gating membrane.

In Situ Testing of the Electrochemically-Mediated Gas Gating Membrane

Figure 8A:
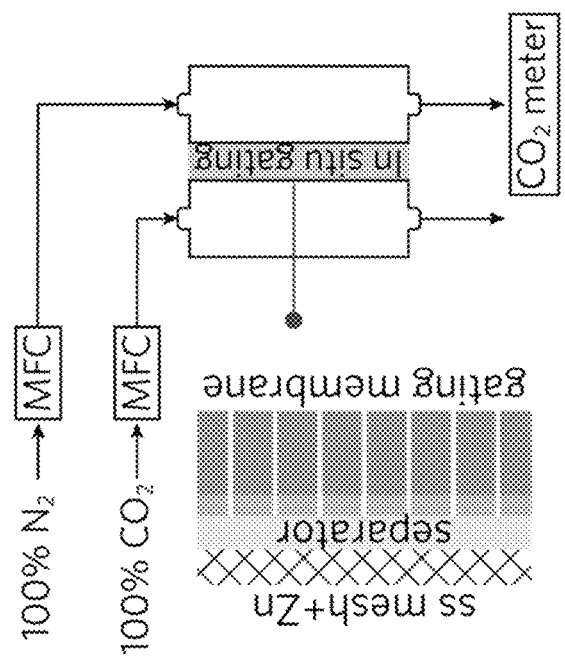
FIG. 8A is, according to certain embodiments, a schematic illustrating a setup for in situ testing of an electrochemically-mediated gas gating membrane.
Figure 23:
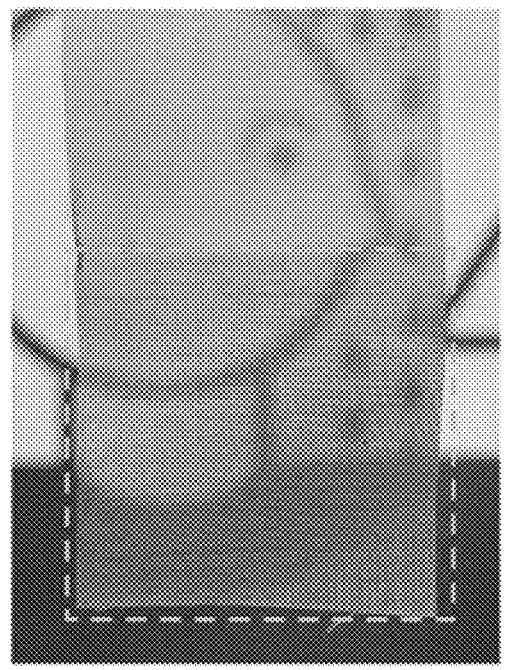
FIG. 23 is, according to some embodiments, a photo image showing a Zn deposited stainless-steel mesh counter electrode used for in situ testing of an electrochemically-mediated gas gating membrane.

In situ testing of the electrochemically-mediated gating membrane was conducted to further verify its ability to reversibility and dynamically control gas transport at the gas-liquid interface. FIG. 8A is a schematic illustrating the setup. The setup was similar to ex situ testing, but the membrane was coupled with a mesh counter electrode with pre-deposited Zn (FIG. 8A and FIG. 23). In this setup, the mesh counter electrode was selected because it had little impedance to gas flow. Zn deposition was carried out at a current density of 0.5 mA $cm^{-2}$ for 10 hours using 0.5 M $ZnSO_4$ in EG as the electrolyte. The testing employed a "zero-gap" design, where the electrodes were in close contact with the electrolyte-imbibed separator with no air gap in between. At open state, $CO_2$ was transported through the electrolyte-imbibed separator via dissolution-diffusion and outgas into the sweep stream.

Figure 8B:
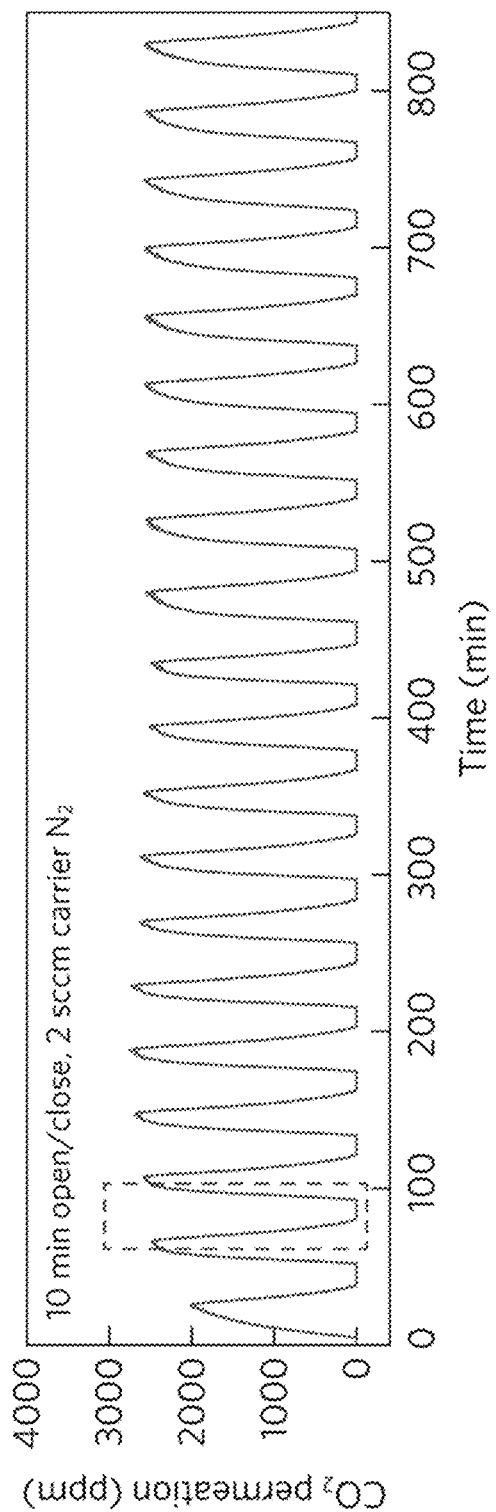
FIG. 8B is, according to certain embodiments, a plot of $CO_2$ permeation as a function of time showing permeated $CO_2$ concentration in response to reversible gating.
Figure 8C:
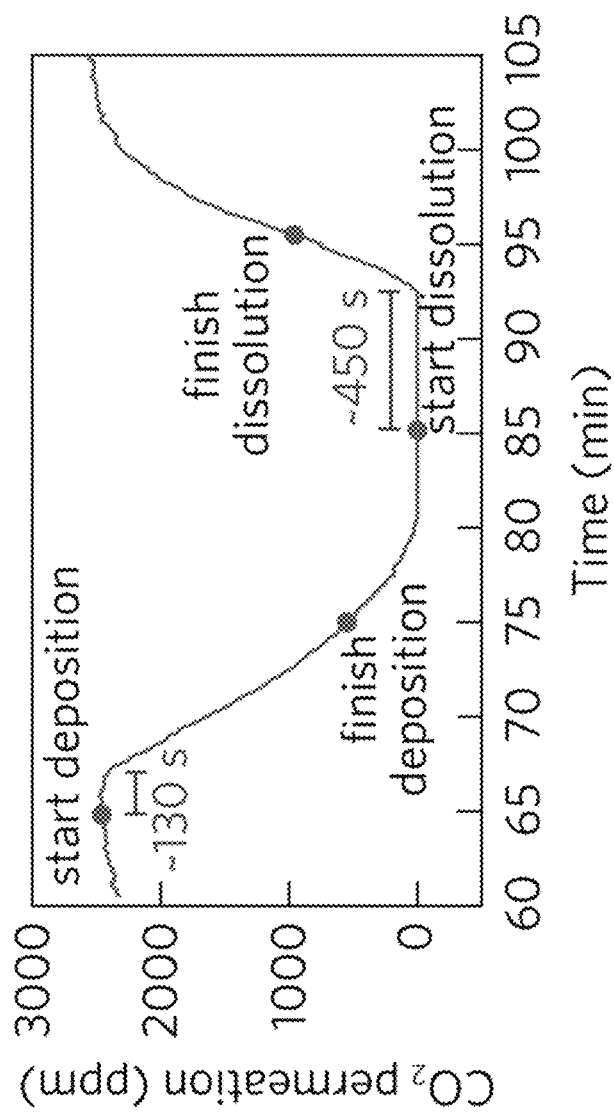
FIG. 8C is, according to some embodiments, a plot of $CO_2$ permeation as a function of time showing the detailed gating response of one single deposition/dissolution cycle marked with the dashed line in FIG. 8B.
Figure 8D:
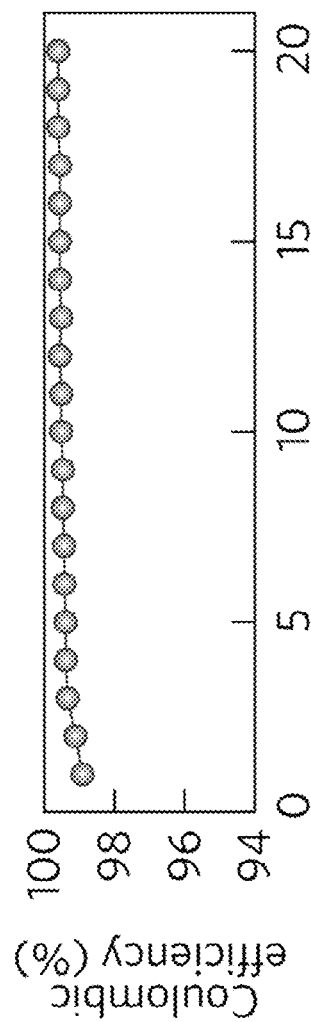
FIG. 8D is, according to certain embodiments, a plot of coulombic efficiency as a function of cycle number.
Figure 8E:
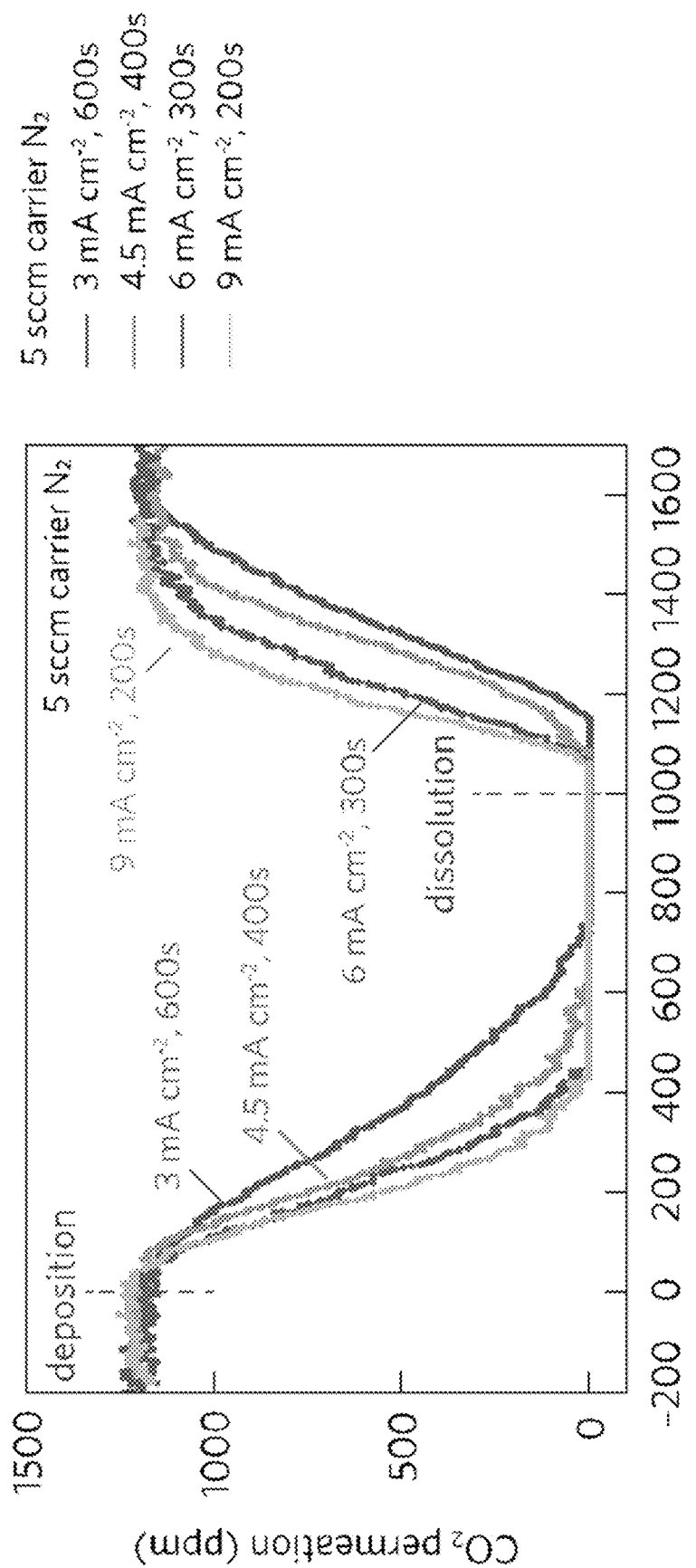
FIG. 8E is, according to some embodiments, a plot of $CO_2$ permeation as a function of time, showing gating responses under different Zn cycling current densities.
Figure 24A:
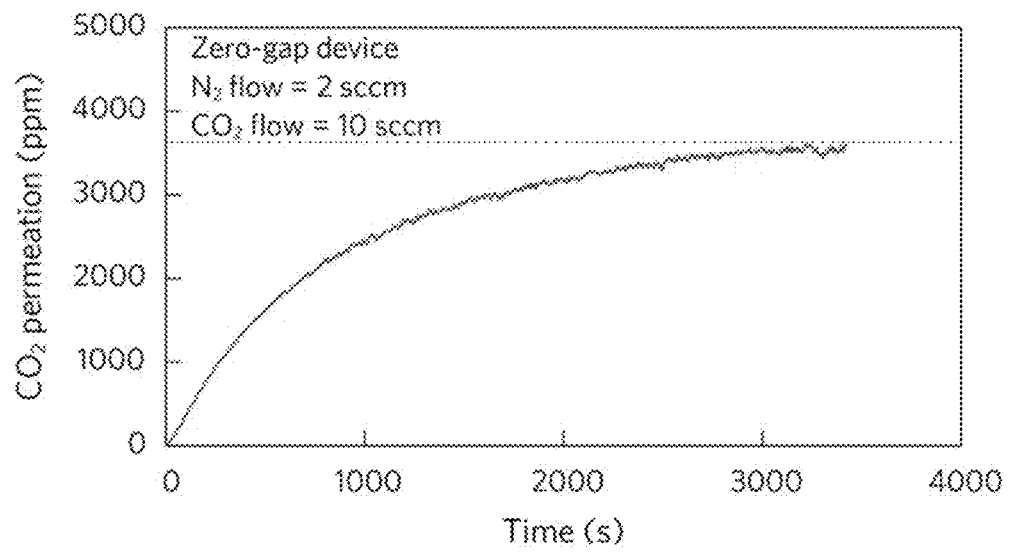
FIG. 24A is, according to certain embodiments, a plot of steady-state $CO_2$ cross-over concentration using a 10 sccm 100% $CO_2$ feed stream and a 2 sccm $N_2$ sweep stream.
Figure 24B:
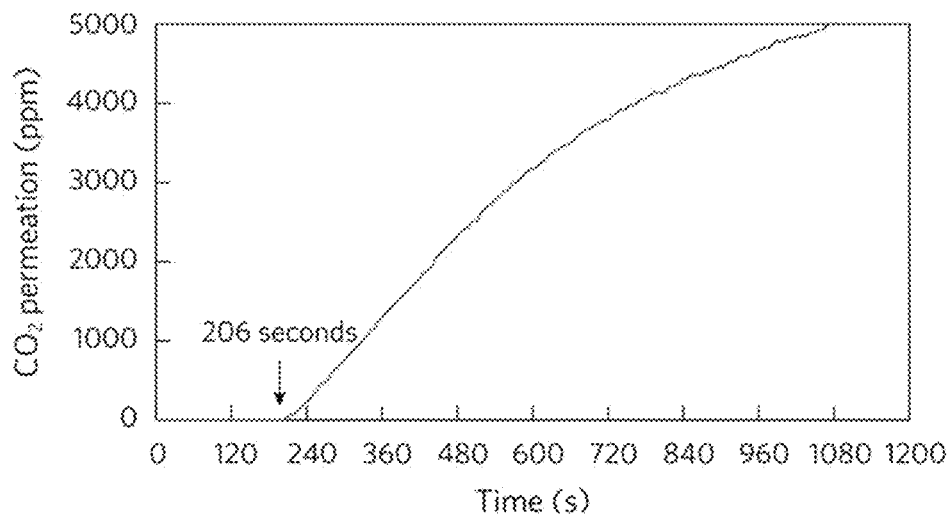
FIG. 24B is, according to certain embodiments, a plot of $CO_2$ permeation as a function of time showing a characterization on the detector response time.
Figure 25:
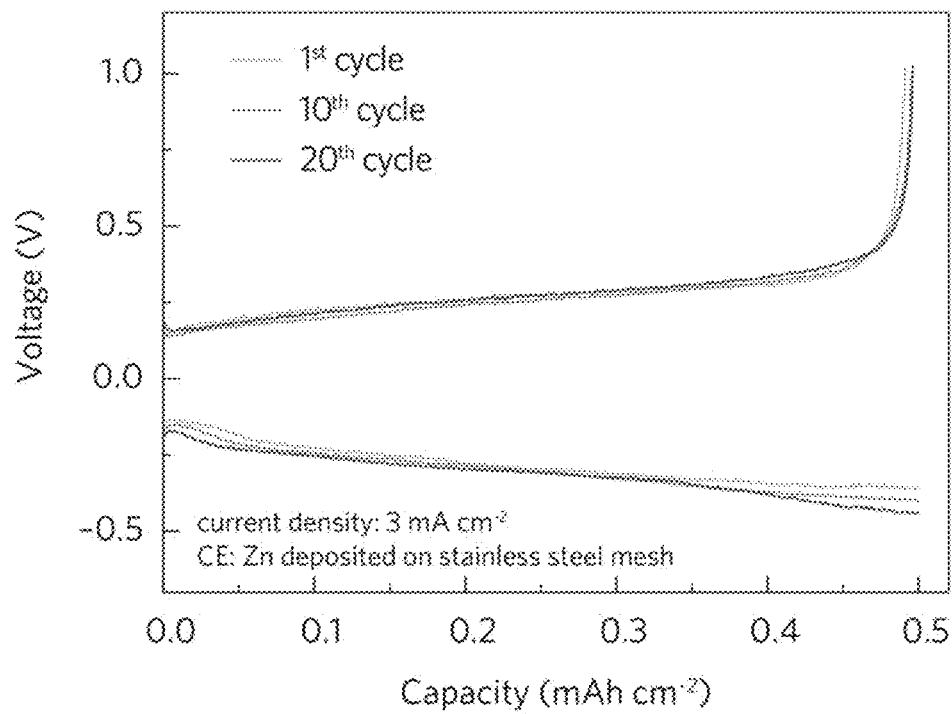
FIG. 25 is, according to some embodiments, a plot of voltage as a function of capacity showing a Zn deposition/dissolution voltage profile at a 1st, $10^{th}$, and $20^{th}$ cycle during in situ gas cell testing.

FIG. 8B shows the sweep stream $CO_2$ concentration in response to reversible gating (10 min deposition/dissolution at 3 mA $cm^{-2}$, with 10 min rest in between), where consistent gate open and close behavior was observed over 20 cycles. Looking at an individual cycle, the permeated $CO_2$ concentration kept decreasing with increasing Zn deposition until finally no cross-over can be detected, followed by a gradual restore to the open-state value with Zn dissolution (FIG. 8C). The discrepancy between the onset of deposition/dissolution and the $CO_2$ signal response was believed to have been due to system dispersion and headspace volume of the flow chamber. FIG. 24A shows the steady-state $CO_2$ cross-over concentration using 10 sccm 100% $CO_2$ feed stream and 2 sccm $N_2$ sweep stream. Since the testing employed a zero-gap design, meaning that the electrodes were in close contact with the electrolyte-imbibed separator with no air gap in between, $CO_2$ cross-over can only occur via dissolution-diffusion through the electrolyte. Therefore, the cross-over concentration was much lower compared to the values in ex situ gas-phase experiments. FIG. 24B shows the characterization on the detector response time. At time zero, 1% $CO_2$ was supplied through the inlet of the sweep stream at a flow rate of 2 sccm, and the detector showed $CO_2$ response starting from 206 seconds. This lag time is due to flow dispersion of the gas testing device, as well as the headspace volume (flow chamber and tubing to detector). The lag time can consistently explain the response of the gating membrane during in situ switching, where $CO_2$ permeation started to decrease ~130 seconds after the onset of Zn deposition, and the $CO_2$ reading only reached 0 ppm ~5 minutes after complete deposition (FIG. 8C). Moreover, the in situ Zn cycling demonstrated an outstanding CE (averaged>99.5%, FIG. 8D) and stable voltage profiles at $1^{st}$, $10^{th}$, and $20^{th}$ cycle during in situ gas cell testing (FIG. 25), and both were strong evidence of the high reversibility of the gating membrane. Importantly, the gating kinetics were easily tuned by varying the cycling current, while still maintaining a remarkable gating on/off ratio (FIG. 8E). In these studies, the deposition capacity was kept constant (0.5 mAh cm$^{-2}$).

Electrochemical Properties of the Redox-Active Quinone-Based $CO_2$ Sorbent

The development of high-efficiency $CO_2$ separation technologies is crucial to greenhouse gas mitigation, petroleum, chemical, and heavy industries, as well as specialty applications such as life support in confined spaces. One emerging strategy involves electrochemical cycles to capture/release $CO_2$, with quinones being a representative example. Electrochemically-reduced quinones can bind to electrophilic $CO_2$ to form stable adducts, while the oxidation of the adducts regenerates the sorbents to release $CO_2$. As a proof-of-concept, a quinone-based $CO_2$ concentrator was demonstrated herein, where the utilization of gas gating membranes could prevent the undesirable cross-talk between the dilute and the concentrated gas streams, and in turn, significantly improve the separation efficiency.

Figure 9A:
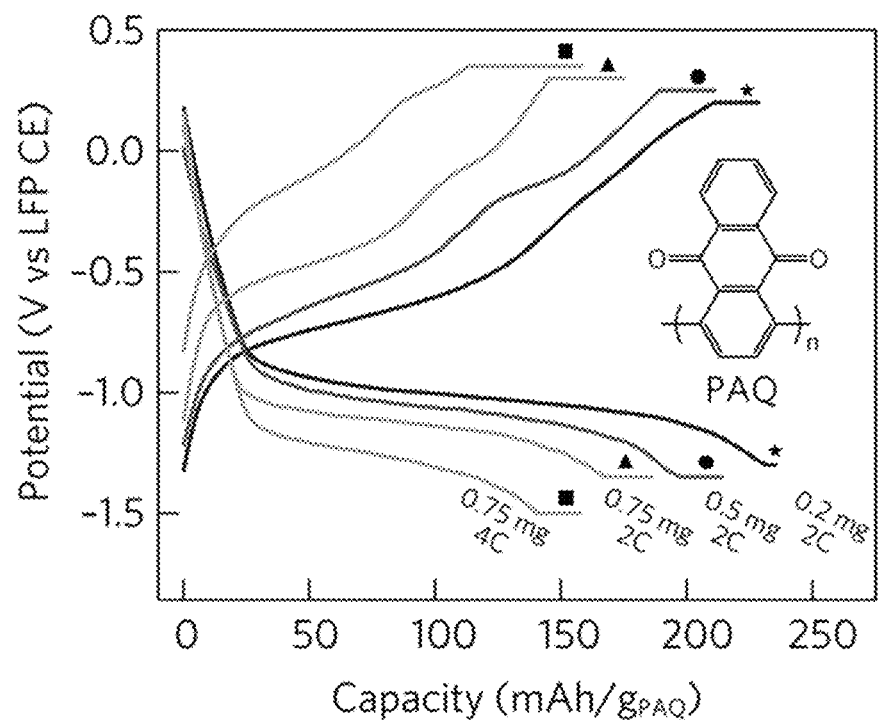
FIG. 9A is, according to certain embodiments, a plot showing $CO_2$ capture-release voltage profiles of electrodes with different areal mass loadings and cycling rates.
Figure 9B:
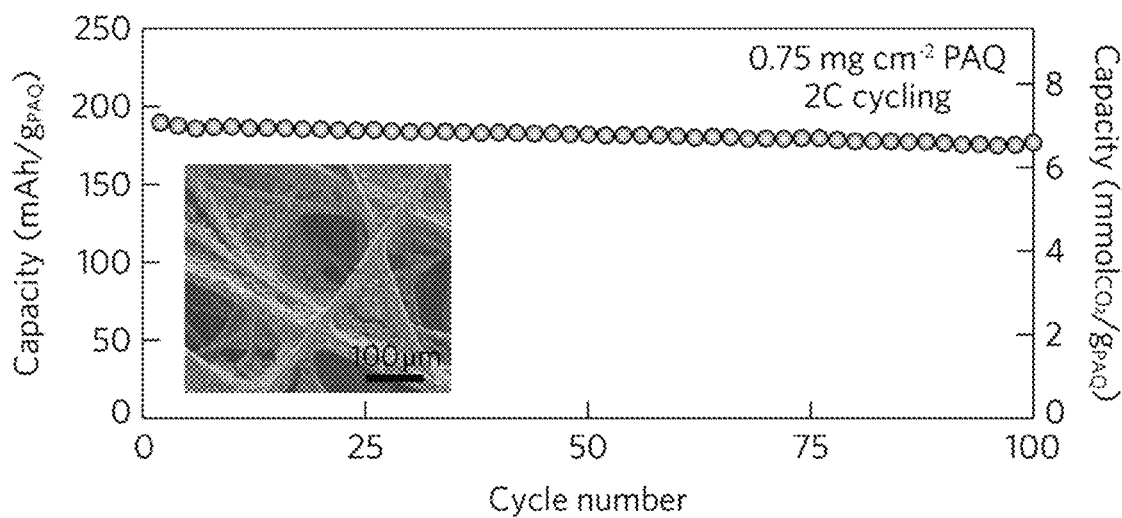
FIG. 9B is, according to certain embodiments, a plot showing the cycling stability of certain electrodes.

A poly(1,4-anthraquinone) (PAQ)-carbon nanotube (CNT) composite was selected as the electrode, due to its reduced solubility compared to the molecular counterpart (theoretical capacity=260 mAh g$^{-1}$, or 9.7 mmol $CO_2$ g$^{-1}$). To facilitate liquid-phase $CO_2$ mass transfer, PAQ was casted on a porous carbon felt 50 μm in thickness and paired with $LiFePO_4$ (LFP) counter electrode (the PAQ-LFP electrode pair is termed the "$CO_2$ cell" hereafter). The electrolyte was 0.1 M LiTFSI+0.5 M ZnTFSI in PC with 10% EG. As seen from the capture-release voltage profiles, polarization increased with increasing PAQ mass loading and/or cycling rates, together with decreased capacity utilization (FIG. 9A). Therefore, 0.75 mg cm$^{-2}$ loading with 30-min capture/release (0.4 mA cm$^{-2}$ current) was identified as an optimal cycling condition, under which satisfactory carbon capture capacity was achieved while preserving good electrochemical kinetics and stability (FIG. 9B). In this study, each capture/release step was 30 min following a constant current (CC)-constant voltage (CV) protocol. The inset of FIG. 9B shows the SEM image of the PAQ electrode.

Figure 9C:
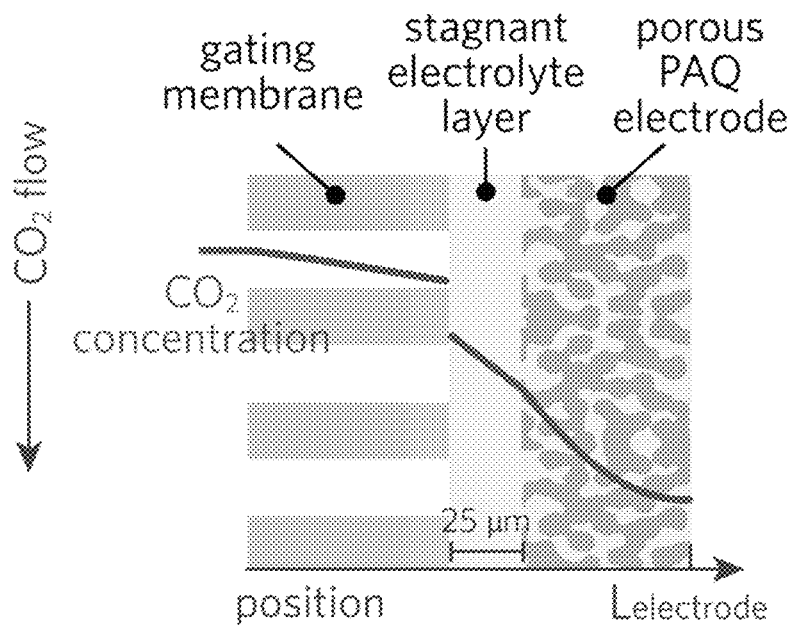
FIG. 9C is, according to some embodiments, a schematic illustrating a diffusion model for a limiting current density calculation.
Figure 9D:
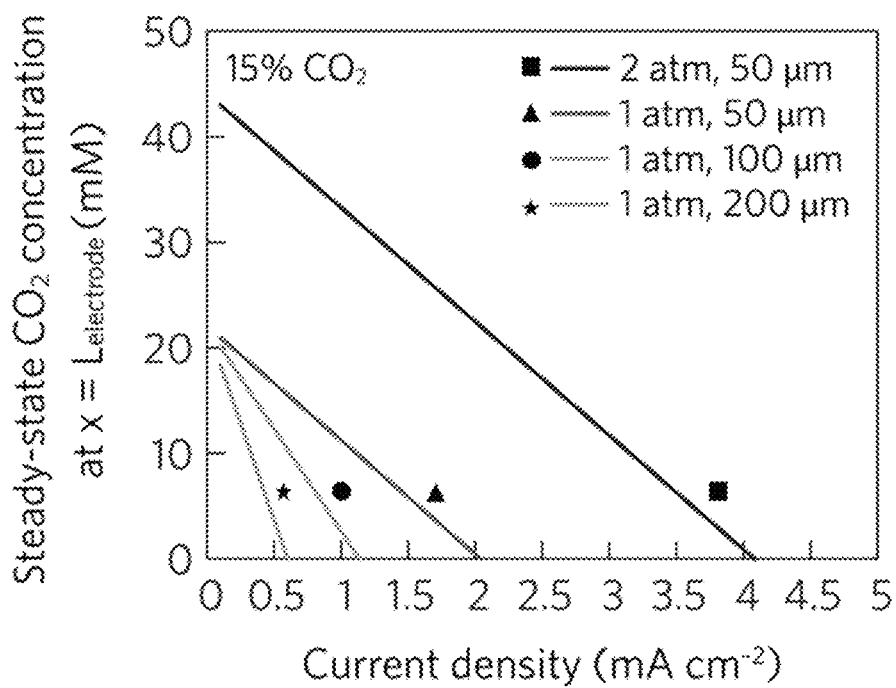
FIG. 9D is, according to certain embodiments, a plot of steady-state $CO_2$ concentration as a function of current density.

To prevent this system from operating beyond the mass transfer limit, the limiting current density of the $CO_2$ cell was estimated based on the diffusion model described in FIG. 9C (See Supplementary Method 1 below). The limiting current is defined as the current when steady-state $CO_2$ concentration reaches zero at the depth of the PAQ electrode. 15% $CO_2$ was used in the calculation, which is the approximate concentration expected in most carbon capture applications. The limiting current decreased with decreasing gas pressure and/or increasing electrode thickness, with the value being ~2 mA cm$^{-2}$ when using a 50 μm electrode under 1 atm pressure (FIG. 9D). Thus, the identified PAQ cycling condition did not exceed the limiting current, yet was close enough to take sufficient advantage of kinetics. The gap between the two also allowed a smaller gas-liquid contact area than the size of the $CO_2$ cell, which can reduce gating energy consumption.

Figure 9E:
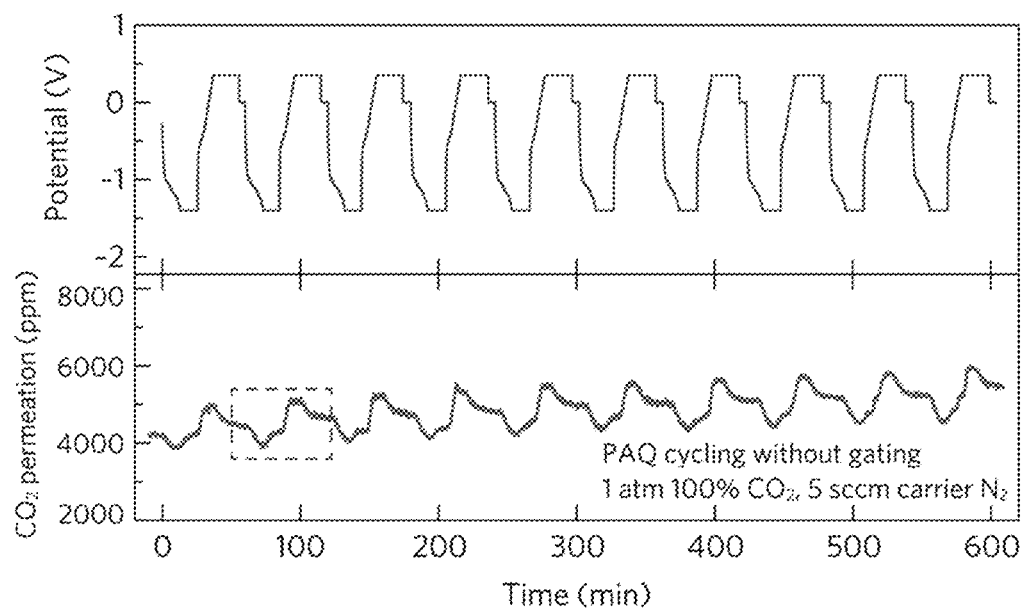
FIG. 9E is, according to certain embodiments, a plot showing $CO_2$ permeation in response to electrochemical cycling of the $CO_2$ cell, and the corresponding voltage profiles.
Figure 9F:
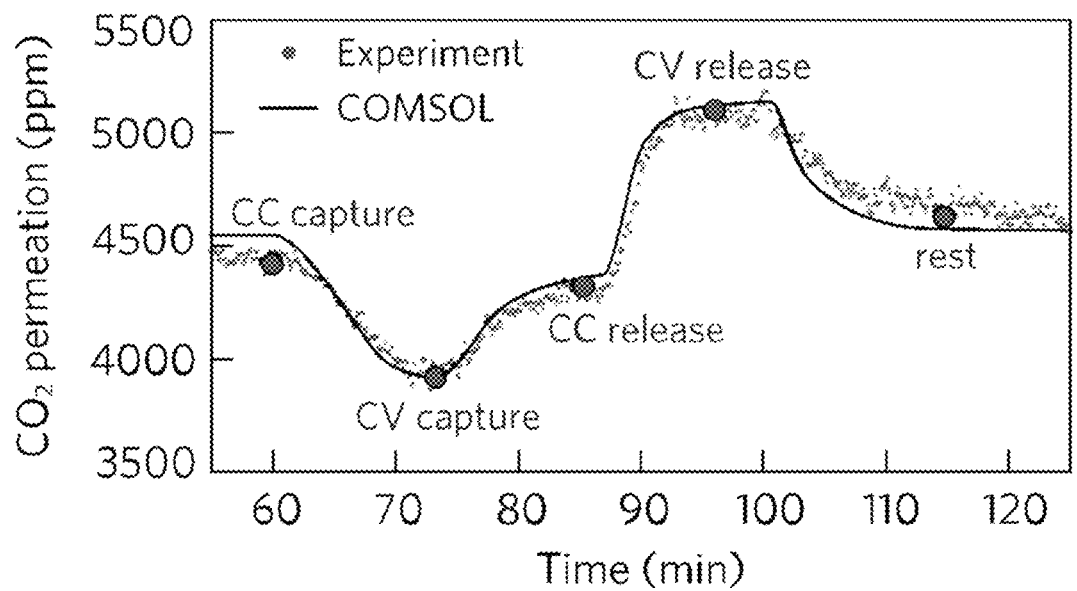
FIG. 9F is, according to some embodiments, a plot of $CO_2$ permeation as a function of time.

When the $CO_2$ cell was tested by flowing $CO_2$ at one side and $N_2$ at the other, a cyclic fluctuation of the permeated $CO_2$ concentration was observed. FIG. 9E shows the $CO_2$ permeation in response to electrochemical cycling of the $CO_2$ cell, and the corresponding voltage profiles. In this study, the same device as gating membrane testing was used. 1 atm 100% $CO_2$ was flowing on one side of the $CO_2$ cell and 1 atm 5 sccm $N_2$ was flowing on the other, carrying permeated $CO_2$ to the detector. FIG. 9F shows the detailed $CO_2$ permeation behavior during one capture-release cycle marked with a dashed line in FIG. 9E. During capture, $CO_2$ in the electrolyte was being actively consumed, resulting in a reduction in permeation When the cell reached the cut-off voltage for CC capture, CV capture started with decaying capture rate, resulting in a gradual restore in $CO_2$ permeation. The subsequent CC release generated $CO_2$ at a constant rate, leading to a sharp concentration spike and the release rate decayed during CV release until permeation returned to its background value (~4500 ppm) (FIG. 9F). This behavior was verified through a COMSOL transport model simulation, where the simulation predictions match closely with the experimental results.

Nevertheless, a significant $CO_2$ permeation background existed (4500 ppm for the cycle shown in FIG. 9F) when the cell was operated without the gating mechanism, due to spontaneous $CO_2$ diffusion down the concentration gradient. In real separation scenario, since the cell has access to both the dilute feed stream and the concentrated product stream, $CO_2$ would have a much higher tendency to be released back into the feed unless enough differential pressure were created across the cell, which could severely compromise the separation efficiency.

High-Efficiency Electrochemical $CO_2$ Separation Enabled by Gas Gating Membranes Integrating the $CO_2$ cell with this electrochemically-mediated gas gating membranes offers an exciting opportunity to overcome the abovementioned barrier in separation efficiency. By sandwiching the $CO_2$ cell between two gating membranes at opposite on/off states (termed the "gating cell" hereafter), the system can only access one gas stream at a time to circumvent undesirable cross-talks caused by chemical potential difference.

Figure 10A:
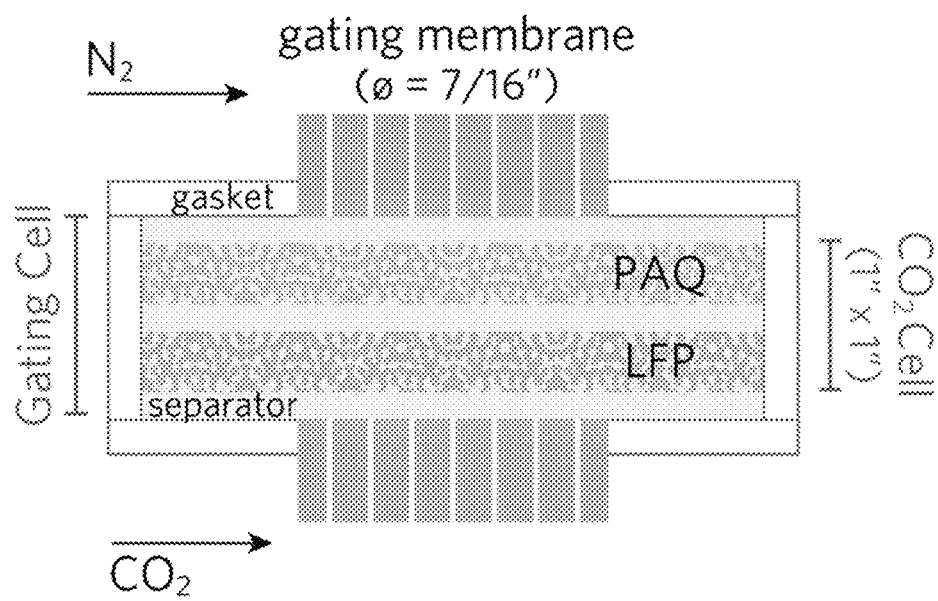
FIG. 10A is, according to certain embodiments, a cross-sectional schematic of an integrated $CO_2$ separation system.
Figure 10B:
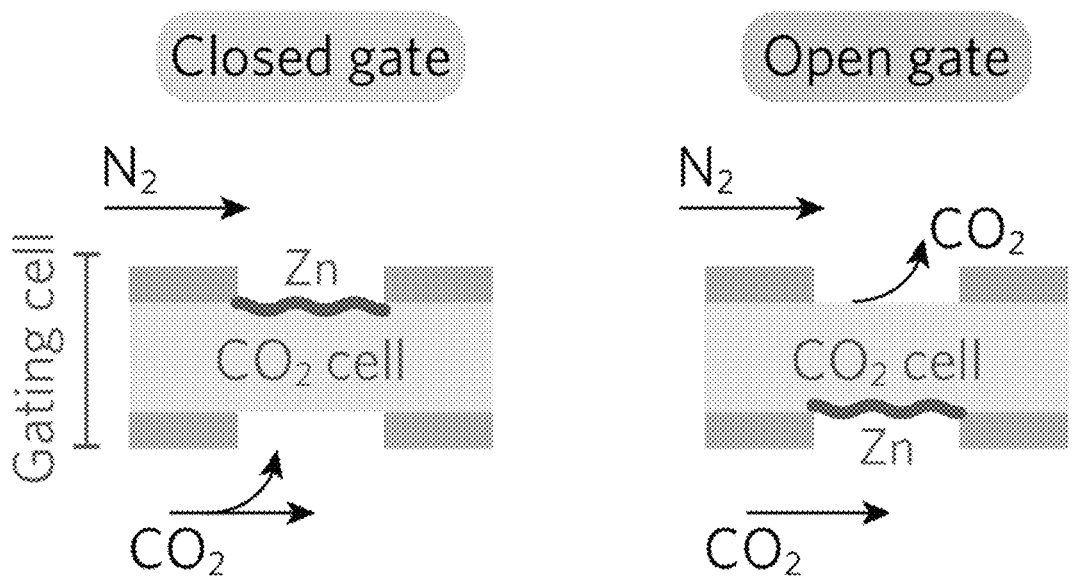
FIG. 10B is, according to some embodiments, a set of schematic illustrations showing "closed" and "open" configurations.
Figure 26A:
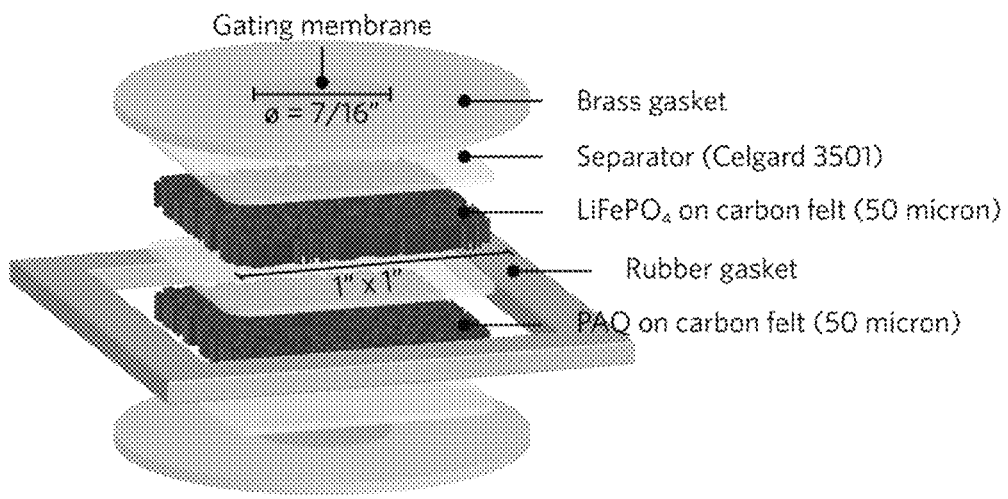
FIG. 26A is, according to certain embodiments, a schematic showing the configuration of an integrated $CO_2$ gas separation system.
Figure 26B:
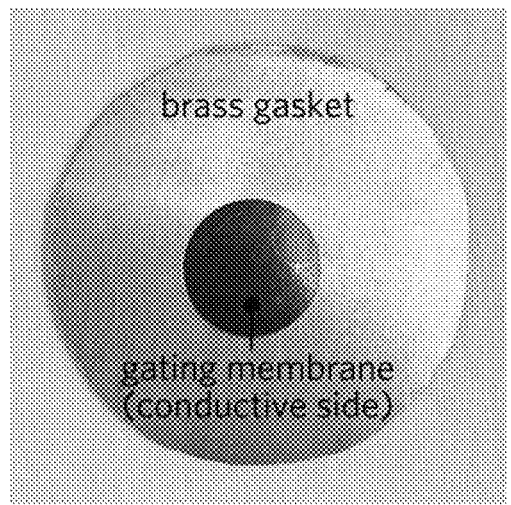
FIG. 26B is, according to some embodiments, a photo image of a gating membrane mounted on a brass gasket using epoxy glue.
Figure 26C:
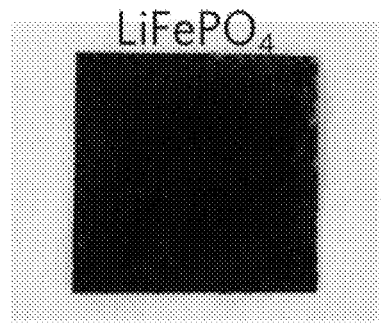
FIG. 26C is, according to certain embodiments, a photo image of an LFP electrode.
Figure 26D:
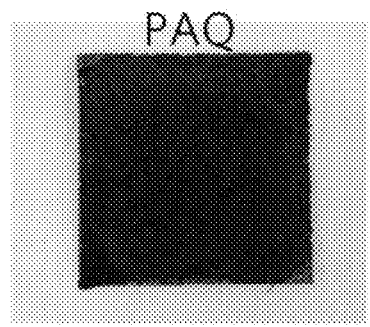
FIG. 26D is, according to some embodiments, a photo image of a PAQ electrode.
Figure 26E:
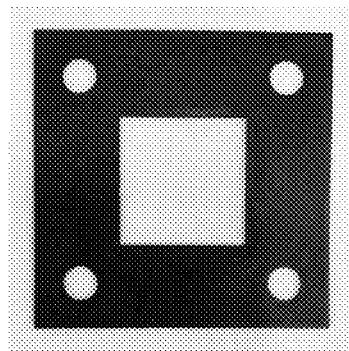
FIG. 26E is, according to certain embodiments, a photo image of a rubber gasket used to confine a $CO_2$ cell within a gating cell.

FIG. 10A is a cross-sectional schematic illustrating the configuration of the integrated $CO_2$ separation system and detailed information is provided as FIG. 26A-26E. The following design aspects were noted for high separation efficiency. (1) A "zero-gap" design was used where the $CO_2$ cell and the gating cell were in tight contact without headspace or gas bubbles to avoid gas-channeling. FIG. 26A shows the gating membranes with a 1 cm$^2$ circular active area were mounted on brass gaskets. PAQ and LFP electrodes (1"×1") were sandwiched between the gating membranes. The components were separated by electrolyte-imbibed polypropylene separators and confined with rubber gaskets without headspace gas. The conductive side of the gating membrane faced the $CO_2$ cell. FIG. 26B is a photo image of the gating membrane mounted on a brass gasket using epoxy glue. FIGS. 26C-26D show photo images of the LFP and PAQ electrode, respectively. FIG. 26E is a photo image of the rubber gasket used to confine the $CO_2$ cell between the gating cell. (2) Minimum electrolyte was added such that the capture capacity of the $CO_2$ cell dominated over the physical $CO_2$ solubility of the electrolyte (See Supplementary Method 2 below). (3) The gating cell area (1 cm$^2$) was smaller than the $CO_2$ cell (6.45 cm$^2$) based on limiting current estimation to reduce gating energy consumption. (4) The thickness of all components was reduced whenever possible to facilitate mass transfer. In real operation, the device works by directionally pumping dilute $CO_2$ into a concentrated product. However, due to the limitation of this detection method, a $N_2$ sweep was used in place of the product stream in order to monitor $CO_2$ capture/release with a gas sensor. In this example, the gating cell is described as being "closed" when the system is facing the feed stream to capture $CO_2$, and as "open" when the system is facing the $N_2$ sweep stream to release $CO_2$ (FIG. 10B). Thus, under this testing condition, metrics defining high efficiency separation included no $CO_2$ cross-over with gate closed and a high concentration spike during $CO_2$ release at open gate.

Figure 10C:
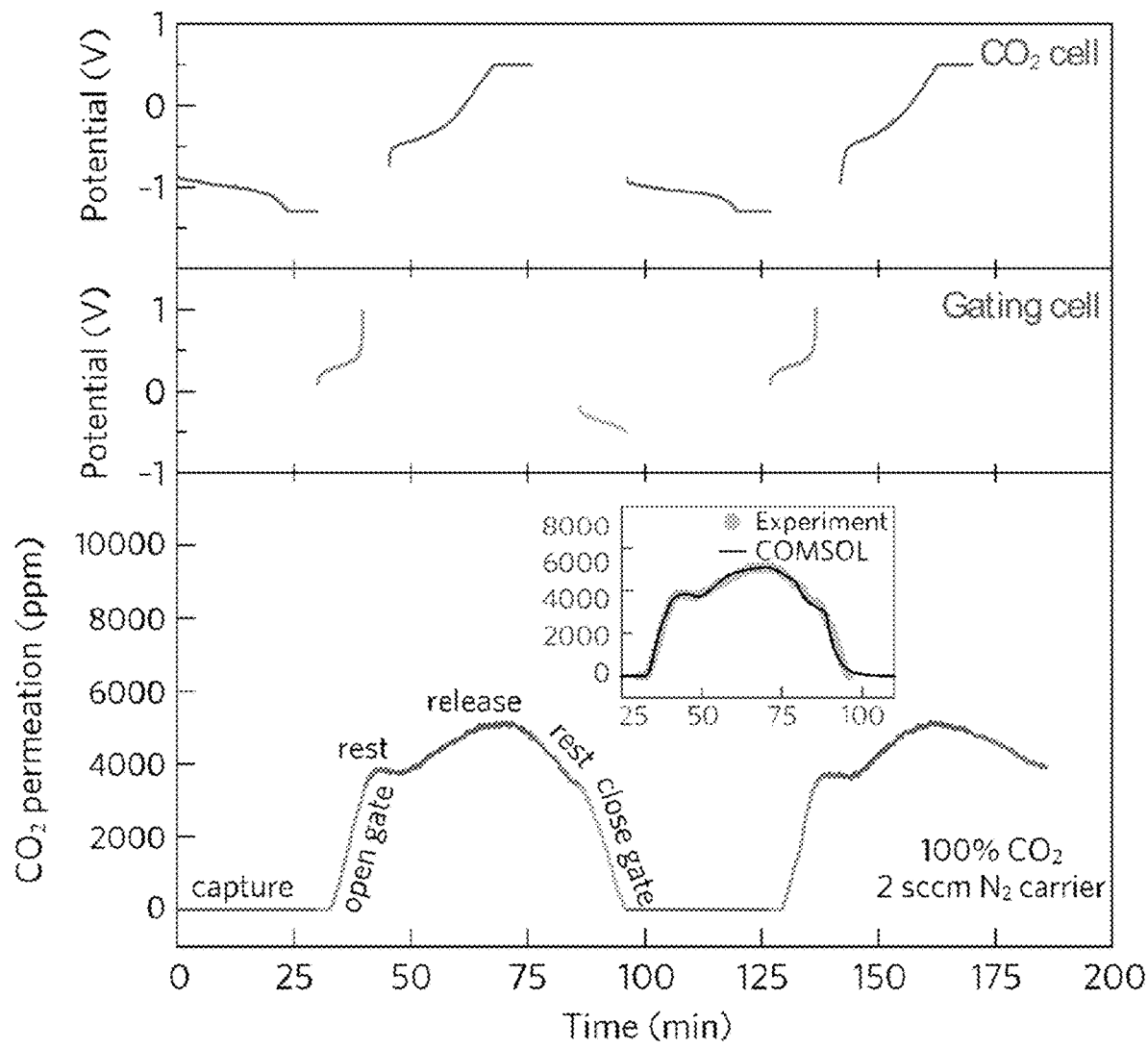
FIG. 10C is, according to certain embodiments, a set of plots showing $CO_2$ permeation during operation of an integrated $CO_2$ separation system, and the corresponding voltage profiles of the $CO_2$ cell and the gating cell.
Figure 10D:
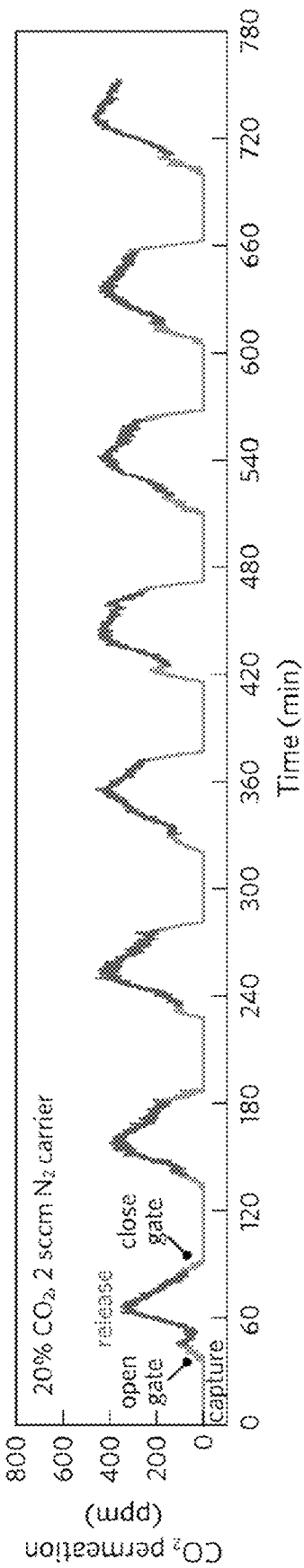
FIG. 10D is, according to certain embodiments, a plot of $CO_2$ permeation as a function of time.
Figure 11A:
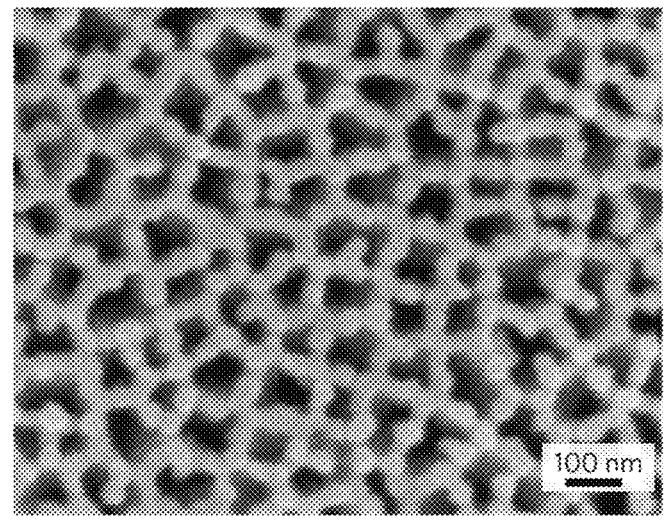
FIG. 11A is, according to some embodiments, an SEM image of an Au-coated AAO membrane.
Figure 11B:
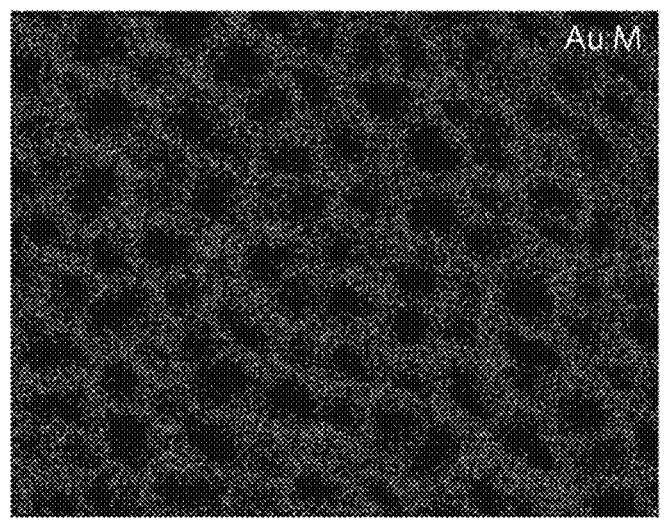
FIG. 11B is, according to certain embodiments, an energy-dispersive X-ray elemental mapping of the Au-coated AAO membrane shown in FIG. 11A.
Figure 27A:
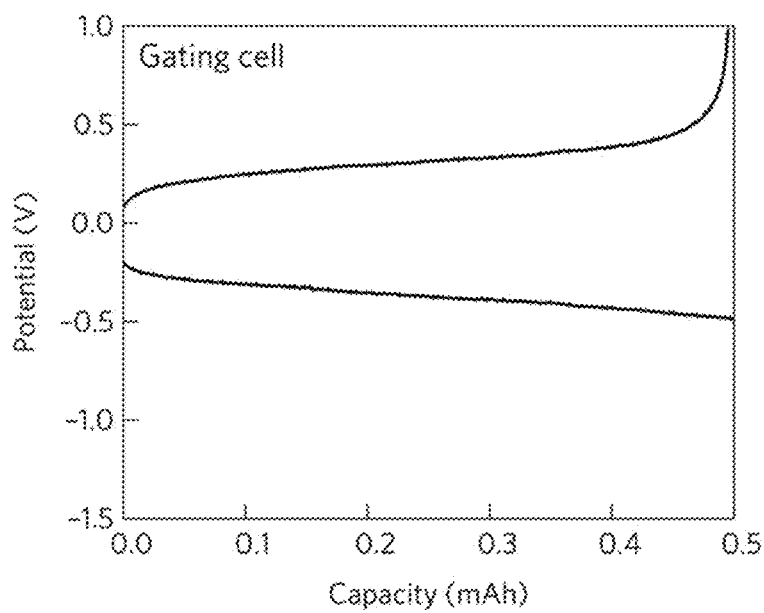
FIG. 27A is, according to certain embodiments, a plot of potential as a function of capacity showing a typical voltage profile of a gating cell in an integrated $CO_2$ separation system.
Figure 27B:
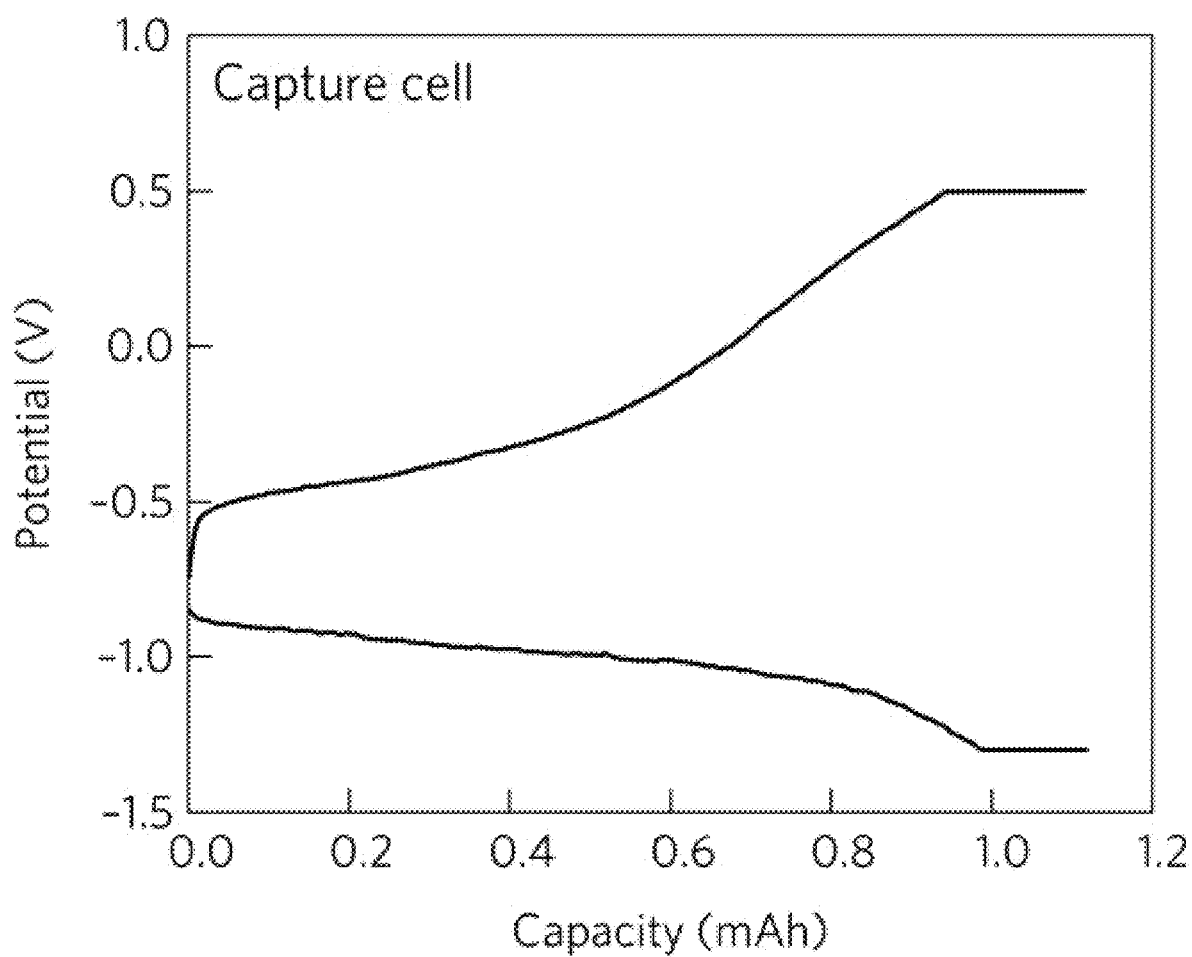
FIG. 27B is, according to some embodiments, a plot of potential as a function of capacity showing a typical voltage profile of a $CO_2$ cell in an integrated $CO_2$ separation system.
Figure 27C:
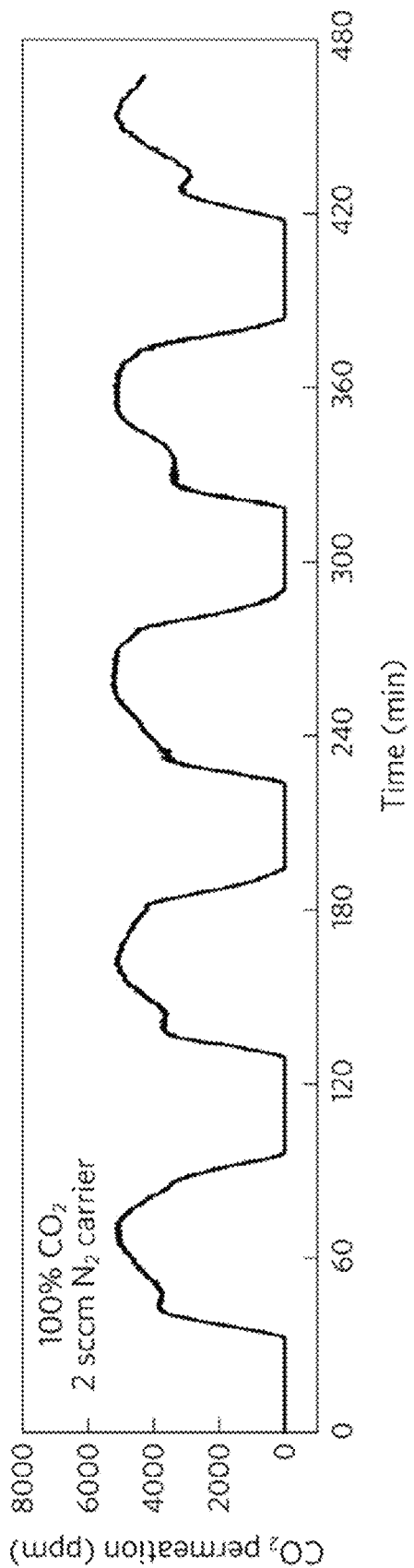
FIG. 27C is, according to certain embodiments, a plot of $CO_2$ permeation as a function of time showing a continuous capture-release cycling of an integrated $CO_2$ separation system with 100% $CO_2$ as the feed stream.

FIG. 10C shows the $CO_2$ permeation during the operation of the integrated $CO_2$ separation system, and the corresponding voltage profiles of the $CO_2$ cell and the gating cell. 1 atm 100% $CO_2$ was used as the feed stream first to maximize the measurement sensitivity, while 1 atm 2 sccm $N_2$ was used as the sweep stream. Indeed, no cross-over was detected when the gate was closed, confirming that the system was only accessing the feed stream during electrochemical $CO_2$ capture. For each capture-release cycle, the system started with a closed gate and the $CO_2$ cell was electrochemically reduced to capture $CO_2$ from the feed stream (30 min CC-CV capture). After the capture capacity was reached, the gating cell switched polarity and the gate was opened by shuttling Zn to the other side of the gating cell (Zn cycling at 3 mA $cm^{-2}$ for 10 min), during which a gradual permeation increase appeared due to $CO_2$ outgassing from the electrolyte. The permeation increased first followed by a gradual decrease, since $CO_2$ in the electrolyte cannot be replenished from the feed side. Subsequently, a distinct concentration spike was observed when the $CO_2$ cell was electrochemically oxidized to release the captured $CO_2$ from the quinones. As the captured $CO_2$ was released from the $CO_2$ cell, it resulted in a pronounced concentration spike (30 min CC-CV release). Finally, the $CO_2$ signal decayed back to zero by switching the gating cell polarity to close the gate, thus completing a capture-release cycle (Zn cycling at 3 mA $cm^{-2}$ for 10 min). Consistent behavior was observed over multiple cycles (FIGS. 27A-27C). FIG. 27A shows a typical voltage profile of the gating cell in the integrated $CO_2$ separation system, while FIG. 27B shows a typical voltage profile of the $CO_2$ cell in the integrated $CO_2$ separation system and FIG. 27C shows a continuous capture-release cycling of the integrated $CO_2$ separation system with 100% $CO_2$ as the feed stream. After qualitatively comparing the system efficiency by the ratio between the magnitude of the concentration spike and the permeation background, the value was ~0.39 for the integrated system while it was only ~0.19 without gating mechanism. Moreover, by lowering the feed concentration to more practical values (20% $CO_2$), transport to the product stream was dominated by the contribution from the $CO_2$ cell, as shown in the continuous capture-release cycling of the integrated $CO_2$ separation system in FIG. 10D. The results fulfilled the abovementioned metrics for high-efficiency separation. These phenomena were also observed in the corresponding COMSOL transport model simulation, which allow for prediction of system performance for different gas compositions and operation parameters (FIG. 10D).

Therefore, the realization of reversible, dynamic transport control at a gas-liquid interface uniquely enabled directional $CO_2$ pumping without the need for differential pressure. Combining multiple units operating at opposite polarities could afford an effectively continuous $CO_2$ capture-release process. Compared to conventional batch processes, this membrane-based "zero-gap" $CO_2$ separation device obviates the need for system blow-down between absorption and regeneration, which can simplify reactor design and improve energy efficiency for industrial carbon capture. Moreover, this novel gas separation process could also open unprecedented opportunities for niche applications, such as life support systems in manned space/marine missions and electrochemical gas compression.

CONCLUSIONS

Controlling transport behavior at gas-liquid interface is a largely under-researched topic albeit being crucial for emerging technologies. In this work, a novel gating mechanism capable of dynamically and continuously modulating gas transport at gas-liquid interface, driven by electrochemical metal deposition/dissolution on conductive porous membrane in rationally-formulated electrolyte is proposed. The gas gating membrane can operate with excellent on/off ratio, reversibility, kinetics and tunability as verified by both ex situ and in situ testing. Moreover, actuated only by electrochemistry, the gating membrane neither involves moving parts nor headspace, which are desirable for high gating efficiency and reliability. As a proof-of-concept, an electrochemically-mediated carbon dioxide concentrator was demonstrated by sandwiching a redox-active $CO_2$ sorbent electrode between two gating membranes. The gating mechanism effectively minimized cross-talks between feed and product streams, such that the integrated device could directionally pump $CO_2$ against concentration gradient without the need for differential pressure, making it versatile to diverse carbon capture applications. This concept of dynamically regulating mass transfer at gas-liquid interface could inspire novel applications in wide fields ranging from gas separations, miniaturized energy/medical devices to microscale gas-involved reactors and beyond.

Methods

Materials.

AO membranes were purchased from Whatman (Anodisc 6809-6012, 25 mm diameter, 100 nm pore size), and were rendered electrically conductive by depositing 100 nm Au on one side of the membrane via thermal evaporation. The electrolytes were prepared by dissolving the corresponding salts zinc bis(trifluoromethanesulfonyl)imide (Alfa Aesar), lithium bis(trifluoromethanesulfonyl)imide (Solvay), and/or tetrabutylammonium hexafluorophosphate (Sigma-Aldrich) in propylene carbonate (anhydrous, 99.7%, Sigma-Aldrich), ethylene glycol (anhydrous, 99.8%, Sigma-Aldrich) and/or dimethyl sulfoxide (Sigma-Aldrich). Propylene carbonate and ethylene glycol were dried over molecular sieves (4 Å, Sigma-Aldrich) before use. Ferrocene and anthraquinone were purchased from Sigma-Aldrich.

Characterizations.

EM images and energy-dispersive X-ray elemental mappings were taken with a Zeiss SUPRA 55-VP scanning electron microscope. Liquid-phase diffusion tests were carried out in 5 ml H-cells (Adams & Chittenden Scientific Glass). The two chambers were separated by AAO membrane with 0.5 $cm^2$ effective area. Methyl orange concentration in liquid-phase diffusion test was determined using a UV-vis spectrometer (Ocean Optics).

Electrochemical Zn Cycling.

Electrochemical measurements were conducted using a VersaSTAT4 potentiostat (Princeton Applied Research). To study the Zn deposition morphology, either Au-coated AAO or Au-coated aluminum foil was used as the substrate. The deposition was carried out in a pouch cell configuration with glass fiber separator (MilliporeSigma) and Zn foil (0.25 mm thick, Fisher Scientific) counter electrode. Zn foil was polished progressively down to 7000 grit sandpaper before use. For the study of nucleation overpotential, Zn dust (<10 μm, Sigma-Aldrich) counter electrode was used, which was fabricated by mixing 80% Zn dust, 10% carbon black (Super P, MTI Corp.) and 10% polyvinylidene fluoride (Sigma-Aldrich) in N-methylpyrrolidinone followed by slurry coating on aluminum foil.

Ex Situ and In Situ Gas Cell Measurements.

The gas-phase measurements were conducted using a house-machined device consisting of two gas flow chambers separated by the gating membrane, all held together with rubber gaskets and screws (detailed gas cell configuration shown as FIG. 21A). Membranes were mounted on brass holder discs using 5-minute epoxy glue (Devcon). $CO_2$ of different concentrations flowed through one gas chamber and $N_2$ sweep gas flowed through the other. The concentration of $CO_2$ in the $N_2$ stream was measured with an in-line $CO_2$ sensor (ExplorIR®-W 20% $CO_2$ sensor). The sensor had a measurement range of 0-20% $CO_2$ and an accuracy of ±70 ppm.

For in situ testing of the gas gating membrane, the membrane was coupled with a stainless-steel mesh (316 stainless-steel, 100 mesh, McMaster-Carr) counter electrode with pre-deposited Zn, and the two electrodes were separated by glass fiber separator.

Testing of the $CO_2$ Cell.

To obtain the PAQ-CNT composite, PAQ was dissolved in chloroform (1 mg mL$^{-1}$) using probe sonicator (Cole-Parmer Ultrasonic Processor, pulser mode: on 5 s—off 3 s, 60% amplitude). Subsequently, CNT was added into the solution (1 mg mL$^{-1}$) and the mixture was sonicated for another 20 min to afford a homogeneous dispersion. The PAQ-CNT ink was then drop-casted on 50 μm carbon felt (Fibre Glast Carbon Fiber Veil). The LFP counter electrode was prepared by mixing 95% LFP (MTI Corp.), 2.5% carbon black and 2.5% polyvinylidene fluoride in N-methylpyrrolidinone followed by drop-casting on 50 μm carbon felt (mass loading 8 mg cm$^{-2}$). The PAQ electrode and the LFP electrode were separated with a 25 μm polypropylene separator (Celgard 3501). The electrochemical cycling of the $CO_2$ cell was carried out using constant current followed by constant voltage until the current decays to 20% the value of the constant current cycling. The electrolyte used was 0.1 M LiTFSI+0.5 M ZnTFSI in PC with 10% EG additive.

Testing of the Integrated $CO_2$ Separation System.

Zn was pre-deposited on one of the AAO membranes (0.6 mAh cm$^{-2}$, 0.5 mAh cm$^{-2}$ Zn cycling capacity plus 20% extra to compensate Coulombic loss). The size of the PAQ electrode was 1" by 1" with an active material mass loading of 0.75 mg cm$^{-2}$. The size of the LFP electrode was 1" by 1" with an active material mass loading of 8 mg cm$^{-2}$. The AAO membranes and the electrodes were separated with 25 μm polypropylene separators and confined tightly using gaskets. $CO_2$ (100% or 20%) was used as the feed stream and $N_2$ was used as a sweep stream for detection purpose. A complete capture and release cycle started with 30 min of CC-CV $CO_2$ capture with gate closed. Once the capture capacity was reached, the polarity of the gating cell was switched at 3 mA cm$^{-2}$ for 10 min, followed by 5 min rest. Subsequently, $CO_2$ was released from the PAQ electrode by 30 min of CC-CV oxidation, followed by 10 min rest. Finally, the cycle was completed by switching the polarity of the gating cell again (3 mA cm$^{-2}$ for 10 min).

Supplementary Method 1.

Limiting current density determination of the PAQ electrode. A 1-D model was implemented to simulate the limiting current density of the PAQ electrode, defined as the current density when the steady-state $CO_2$ concentration reaches zero at the depth of the electrode.

The following geometry was defined:
Thickness of the gas boundary layer=1 μm,
Thickness of a stagnant electrolyte layer=25 μm.
The following parameters were used:
Gas-phase $CO_2$ diffusivity=$0.2\times10^{-4}$ m$^2$/s,
Henry's law constant of $CO_2$ in PC solvent=80 atm,
$CO_2$ diffusivity in PC solvent=$1.2\times10^{-9}$ m$^2$/s,
PAQ electrode porosity=0.5,
PAQ electrode tortuosity=2.

Supplementary Method 2.

Electrolyte $CO_2$ solubility vs the $CO_2$ cell capacity.
Separator porosity (Celgard 3501, 25 μm)=55%
PAQ and LFP electrode porosity (50 μm)=50%
Area of the $CO_2$ cell=6.45 cm$^2$
Total pore volume=3×6.45 cm$^2$×25 μm×55%+2×6.45 cm$^2$×50 μm×50%~60 μL
Henry's law constant of $CO_2$ in PC solvent=80 atm,
PC density=1.2 g cm$^{-3}$
PC molecular weight=102.09 g mol$^{-1}$
PC molar concentration=1.2 g cm$^{-3}$/102.09 g mol$^{-1}$~11.75 M
$CO_2$ solubility in PC (100% $CO_2$, 1 atm)=1 atm/80 atm×11.75 M~0.147 M
$CO_2$ dissolved in electrolyte (100% $CO_2$, 1 atm)=0.147 M×60 μL~0.0088 mmol $CO_2$
Difference in dissolved $CO_2$ between 20% and 100% $CO_2$ at 1 atm=0.0088×80% mmol~0.007 mmol $CO_2$
$CO_2$ capture capacity of PAQ under 2 C cycling condition ~7.5 mmol g$^{-1}$
Total capacity of the PAQ electrode=0.75 mg cm$^{-2}$×6.45 cm$^2$×7.5 mmol g$^{-1}$=0.036 mmol $CO_2$ While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    transporting a fluid through a first electronically conductive porous solid such that a species from the fluid is captured by a medium adjacent to the first electronically conductive porous solid;
    altering an electrical potential applied between the first electronically conductive porous solid and a second electronically conductive porous solid such that the fluid permeability of the first electronically conductive porous solid is reduced and the fluid permeability of the second electronically conductive porous solid is increased; and
    releasing the species from the medium such that the species is transported through the second electronically conductive porous solid.

2. The method of claim 1, wherein the fluid comprises a gas.

3. The method of claim 1, wherein the species comprises an acid gas and/or a hydrocarbon gas.

4. The method of claim 1, wherein at least one of the first electronically conductive porous solid and the second electronically conductive porous solid comprises a metal.

5. The method of claim 4, wherein the metal is coated on an electronically insulating porous solid.

6. The method of claim 1, wherein altering the electrical potential applied between the first electronically conductive porous solid and the second electronically conductive porous solid such that the fluid permeability of the first electronically conductive porous solid is reduced comprises altering the electrical potential such that a material is deposited over pores of the first electronically conductive porous solid.

7. The method of claim 6, wherein the material deposited over pores of the first electronically conductive porous solid comprises a metal and/or a metal oxide.

8. The method of claim 6, wherein the deposition of material over pores of the first electronically conductive porous solid comprises deposition of colloidal particles over pores of the first electronically conductive porous solid.

9. The method of claim 6, wherein the deposition of material over pores of the first electronically conductive porous solid comprises precipitation of the material over pores of the first electronically conductive porous solid.

10. The method of claim 1, wherein altering the electrical potential applied between the first electronically conductive porous solid and a second electronically conductive porous solid such that the fluid permeability of the second electronically conductive porous solid is increased comprises altering the electrical potential such that material is removed from pores of the second electronically conductive porous solid.

11. The method of claim 1, wherein the medium comprises a sequestration material.

12. The method of claim 11, wherein the sequestration material captures the species via a non-electrochemical mechanism.

13. The method of claim 12, wherein the non-electrochemical mechanism comprises adsorption, absorption, and/or a non-electrochemical chemical reaction.

14. The method of claim 11, wherein releasing the species from the medium comprises exposing the medium to a stimulus.

15. The method of claim 14, wherein the stimulus comprises a change in temperature and/or a change in pressure.

16. The method of claim 11, wherein the sequestration material comprises a zeolite, a metal-organic framework, a resin, and/or an electrolyte.

17. The method of claim 1, wherein the medium comprises a first electrode and a second electrode.

18. The method of claim 17, further comprising applying a first medium electrical potential between the first electrode and the second electrode of the medium such that the species from the fluid is electrochemically captured by the medium.

19. The method of claim 18, further comprising applying a second medium electrical potential between the first electrode and the second electrode of the medium, the second medium electrical potential having a polarity that is the opposite of the polarity of the first medium electrical potential, such that the species captured by the medium is released by the medium.

20. A device, comprising:
a first electronically conductive porous solid;
a second electronically conductive porous solid electronically coupled to the first electronically conductive porous solid; and
a medium between the first electronically conductive porous solid and the second electronically conductive porous solid;
wherein the device is configured such that:
when an electrical potential is applied to the first and second electronically conductive porous solids with a first polarity, a fluid permeability of the first electronically conductive porous solid is reduced, and
when an electrical potential is applied to the first and second electronically conductive porous solids with a second polarity opposite the first polarity, the fluid permeability of the second electronically conductive porous solid is reduced.

21. The device of claim 20, wherein the device is configured such that:
when the electrical potential is applied to the first and second electronically conductive porous solids with the first polarity, a fluid permeability of the second electronically conductive porous solid is increased, and
when the electrical potential is applied to the first and second electronically conductive porous solids with the second polarity opposite the first polarity, the fluid permeability of the first electronically conductive porous solid is increased.

22. The device of claim 20, wherein at least one of the first electronically conductive porous solid and the second electronically conductive porous solid comprises a metal.

23. The device of claim 22, wherein the metal is coated on an electronically insulating porous solid.

24. The device of claim 20, wherein the device is configured such that when the electrical potential is applied to the first and second electronically conductive porous solids with the first polarity, a material is deposited at an interface between the medium and the first electronically conductive porous solid.

25. The device of claim 24, wherein the material deposited at the interface between the medium and the first electronically conductive porous solid comprises a metal and/or a metal oxide.

26. The device of claim 24, wherein the material deposited at the interface between the medium and the first electronically conductive porous solid comprises a colloidal particle.

27. The device of claim 20, wherein the device is configured such that when an electrical potential is applied to the first and second electronically conductive porous solids in a second polarity opposite the first polarity, material is deposited at an interface between the medium and the second electronically conductive porous solid.

28. The device of claim 27, wherein the device is configured such that when the electrical potential is applied to the first and second electronically conductive porous solids in the second polarity opposite the first polarity, material is removed from an interface between the medium and the first electronically conductive porous solid.

29. The device of claim 20, wherein the medium comprises a sequestration material.

30. The device of claim 29, wherein the sequestration material comprises a zeolite, a metal-organic framework, a resin, and/or an electrolyte.

31. The device of claim 30, wherein the medium comprises a metal salt dissolved in a solvent.

32. The device of claim 20, wherein the medium comprises a first electrode and a second electrode.

33. The device of claim 32, wherein the medium is configured such that when a medium electrical potential is applied between the first electrode and the second electrode of the medium, a species is captured by the medium.

34. The device of claim 33, wherein the medium is configured such that, when a second medium electrical potential is applied between the first electrode and the second electrode of the medium, the second medium electrical potential having a polarity that is opposite the polarity of the first medium electrical potential applied between the first electrode and the second electrode of the medium, the species is released by the medium.

* * * * *